US012626967B2

(12) United States Patent
Onuki

(10) Patent No.: US 12,626,967 B2
(45) Date of Patent: May 12, 2026

(54) TEMPERATURE RAISING DEVICE

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 744 days.

(21) Appl. No.: 18/110,912

(22) Filed: Feb. 17, 2023

(65) Prior Publication Data

US 2023/0282900 A1 Sep. 7, 2023

(30) Foreign Application Priority Data

Feb. 22, 2022 (JP) ................................. 2022-025658

(51) Int. Cl.
H01M 10/615 (2014.01)
H01M 10/42 (2006.01)
(Continued)

(52) U.S. Cl.
CPC ..... H01M 10/615 (2015.04); H01M 10/4264 (2013.01); H01M 10/63 (2015.04);
(Continued)

(58) Field of Classification Search
CPC .......... H01M 10/615; H01M 10/4264; H01M 10/63; H01M 10/651; H01M 2220/20; H05B 1/023; H05B 3/0004; B60L 58/27
See application file for complete search history.

(56) References Cited

U.S. PATENT DOCUMENTS 5,990,661 A 11/1999 Ashtiani et al.
6,078,163 A 6/2000 Horie et al.
(Continued)

FOREIGN PATENT DOCUMENTS

JP 11-329516 11/1999
JP 2004-166358 6/2004
(Continued)

OTHER PUBLICATIONS

Japanese Notice of Allowance for Japanese Patent Application No. 2022-025658 dated Nov. 21, 2023.

*Primary Examiner* — Lorne E Meade
(74) *Attorney, Agent, or Firm* — Amin, Turocy & Watson, LLP

(57) ABSTRACT

A temperature raising device includes a parallel circuit including a capacitor connected in parallel to a battery that is a temperature raising target, and an alternating current (AC) generation circuit connected to the parallel circuit. When capacitance of the capacitor is denoted by $C_P$, an inductance component of the battery is denoted by $L_S$, and a resistance component of the battery is denoted by $R_S$, $C_P$ satisfies Inequality (1) and an angular frequency $\omega$ of the AC generation circuit satisfies Eq. (2).

$$C_P < \frac{2L_S}{R_S^2} \tag{1}$$

$$\omega = \sqrt{\frac{2L_S - C_P R_S^2}{2C_P L_S^2}} \tag{2}$$

19 Claims, 44 Drawing Sheets

(51) Int. Cl.

| | | |
|---|---|---|
| *H01M 10/63* | (2014.01) | |
| *H01M 10/651* | (2014.01) | |
| *H05B 1/02* | (2006.01) | |
| *H05B 3/00* | (2006.01) | |
| *B60L 58/27* | (2019.01) | |

(52) U.S. Cl.
CPC .......... *H01M 10/651* (2015.04); *H05B 1/023* (2013.01); *H05B 3/0004* (2013.01); *B60L 58/27* (2019.02); *H01M 2220/20* (2013.01)

(56) References Cited

U.S. PATENT DOCUMENTS

| | | | | |
|---|---|---|---|---|
| 8,823,317 | B2 | 9/2014 | Xu et al. | |
| 9,327,611 | B2 * | 5/2016 | Nishi .................. | H01M 10/657 |
| 12,074,305 | B2 * | 8/2024 | Onuki ................. | H01M 10/615 |
| 2012/0021263 | A1 | 1/2012 | Nishi et al. | |
| 2022/0021045 | A1 | 1/2022 | Onuki | |

FOREIGN PATENT DOCUMENTS

| | | |
|---|---|---|
| JP | 4081855 | 4/2008 |
| JP | 2015-133776 | 7/2015 |
| JP | 2022-019201 | 1/2022 |
| WO | 2011/004464 | 1/2011 |

* cited by examiner

TEMPERATURE RAISING DEVICE

CROSS-REFERENCE TO RELATED APPLICATION

Priority is claimed on Japanese Patent Application No. 2022-025658, filed Feb. 22, 2022, the content of which is incorporated herein by reference.

BACKGROUND

Field of the Invention

The present invention relates to a temperature raising device.

Description of Related Art

From the viewpoint of reducing automobile exhaust gas and/or $CO_2$ emissions, interest in electric vehicles is increasing and the use of lithium-ion secondary batteries is being considered for in-vehicle applications. Because a secondary battery such as a lithium-ion secondary battery has high performance in a specific temperature range, a device for raising the temperature may be attached. For example, there is technology for raising the temperature by connecting a coil, a capacitor, and an alternating current (AC) generation circuit in series with a secondary battery and causing an AC current to flow through the secondary battery (Japanese Patent No. 4081855).

Also, capacitors are generally provided in an input portion of an inverter and an input/output portion of a converter. When a resonant current is intentionally generated for raising the temperature of the secondary battery, it is desirable to arrange the secondary battery in the vicinity of the capacitor.

Meanwhile, resonant currents may occur unintentionally and accidentally. For example, if a frequency of the resonant current is close to an operating frequency of a power control unit (PCU) such as an inverter, resonance occurs in a normal operation. A reactor may be provided so that the resonant current due to such a capacitor and an inductance component is suppressed (Japanese Unexamined Patent Application, First Publication No. 2004-166358).

SUMMARY

As in Japanese Unexamined Patent Application, First Publication No. 2004-166358, in a measure to establish a difference between the resonance frequency and the operating frequency by adding the reactor to increase the inductance or increase the capacitance of the input capacitor, because the resonance frequency is lowered and the magnification of the current flowing through the secondary battery with respect to the input current is lowered, there is room for improvement in energy efficiency. Accordingly, in the related art, an unintended resonant current may be generated or the temperature rise efficiency may not be sufficient.

The present invention has been made in consideration of such circumstances, and an objective of the present invention is to provide a temperature raising device capable of raising a temperature of a secondary battery more efficiently while suppressing the generation of an unintended resonant current.

A temperature raising device according to the present invention adopts the following configurations.

(1): According to an aspect of the present invention, there is provided a temperature raising device including: a parallel circuit including a capacitor connected in parallel to a battery that is a temperature raising target; and an alternating current (AC) generation circuit connected to the parallel circuit, wherein, when capacitance of the capacitor is denoted by $C_P$, an inductance component of the battery is denoted by $L_S$, and a resistance component of the battery is denoted by $R_S$, $C_P$ satisfies Inequality (1) and an angular frequency $\omega$ of the AC generation circuit satisfies Eq. (2).

$$C_P < \frac{2L_S}{R_S^2} \tag{1}$$

$$\omega = \sqrt{\frac{2L_S - C_P R_S^2}{2C_P L_S^2}} \tag{2}$$

(2): According to another aspect of the present invention, there is provided a temperature raising device including: a parallel circuit including a capacitor connected in parallel to a battery that is a temperature raising target; and an AC generation circuit connected to the parallel circuit, wherein, when capacitance of the capacitor is denoted by $C_P$, an inductance component of the battery is denoted by $L_S$, and a resistance component of the battery is denoted by $R_S$, $C_P$ satisfies Inequality (1) and an angular frequency $\omega$ of the AC generation circuit satisfies Inequality (47).

$$C_P < \frac{2L_S}{R_S^2} \tag{1}$$

$$\omega < \sqrt{\frac{2L_S - C_P R_S^2}{C_P L_S^2}} \tag{47}$$

(3): In the above-described aspect (1) or (2), the AC generation circuit includes a generation circuit configured to generate a ripple current, and the ripple current generated by the generation circuit flows through the parallel circuit.

(4): In the above-described aspect (3), the generation circuit includes: a first rectification element; a first switching element connected in parallel to the first rectification element; a second rectification element connected in series with the first rectification element; and a second switching element connected in parallel to the second rectification element.

(5): In the above-described aspect (4), the temperature raising device further includes an amplitude adjustment circuit configured to adjust an amplitude of the ripple current.

(6): In the above-described aspect (5), the amplitude adjustment circuit adjusts the amplitude of the ripple current by changing a duty ratio between the first switching element and the second switching element.

(7): In the above-described aspect (2), the AC generation circuit includes a generation circuit configured to generate a ripple current, the ripple current generated by the generation circuit flows through the parallel circuit, the temperature raising device further includes an amplitude adjustment circuit configured to adjust an amplitude of the ripple current, and the amplitude adjustment circuit adjusts the amplitude of the ripple current by changing a frequency of the ripple current.

(8): In any one of the above-described aspects (1) to (7), the battery includes a first battery; and a second battery connected in series with the first battery, the capacitor includes a first capacitor connected in parallel to the first battery; and a second capacitor connected in parallel to the second battery, the AC generation circuit includes a first generation circuit connected to a first parallel circuit including the first battery and the first capacitor and configured to generate a first ripple current; and a second generation circuit connected to a second parallel circuit including the second battery and the second capacitor and configured to generate a second ripple current, and the temperature raising device further includes a phase adjustment circuit configured to provide a phase difference between the first ripple current and the second ripple current.

(9): In any one of the above-described aspects (1) to (8), the temperature raising device further includes a first current limiting element connected between the battery and the capacitor; and a second current limiting element connected between the capacitor and the AC generation circuit and having a rated capacity different from that of the first current limiting element.

(10): In any one of the above-described aspects (1) to (9), the temperature raising device further includes a current cutoff element connected between the battery and the capacitor.

(11): In any one of the above-described aspects (1) to (10), a ratio of an electric current of the inductance component to an electric current input to the parallel circuit by the AC generation circuit exceeds 1.

According to the above-described aspects (1) to (11), it is possible to raise a temperature of a secondary battery more efficiently while suppressing the generation of an unintended resonant current.

BRIEF DESCRIPTION OF THE DRAWINGS

FIG. 1 is a diagram showing an example of a configuration of an electric vehicle equipped with a power storage system including a temperature raising device.

DESCRIPTION OF EMBODIMENTS

Figure 2:
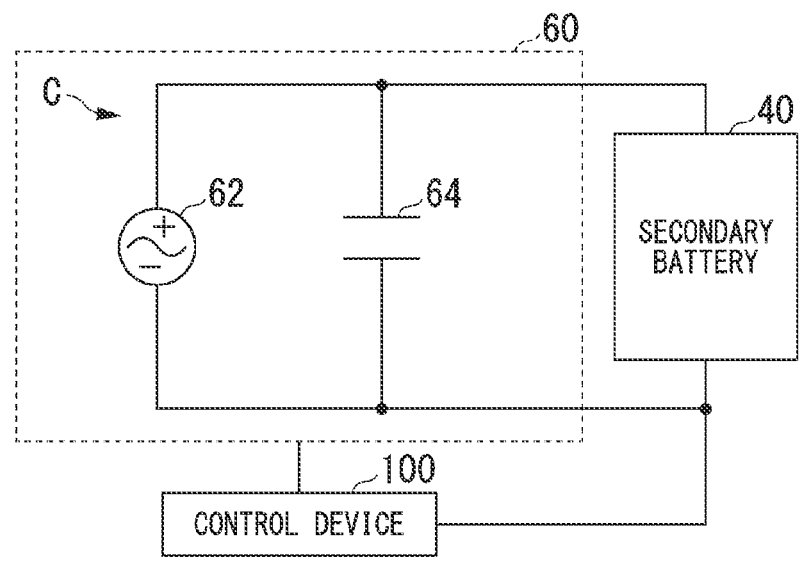
FIG. 2 is a diagram showing an example of a schematic configuration of a temperature raising device.

Hereinafter, embodiments of a temperature raising device of the present invention will be described with reference to the drawings. A temperature raising device for raising a temperature of a secondary battery mounted in a vehicle will be described below. However, in place of (or in addition to) this temperature raising device, the present invention may be applied to a primary battery, a capacitor, a fuel cell, and other devices and equipment in which they are mounted.

First Embodiment

Figure 1:
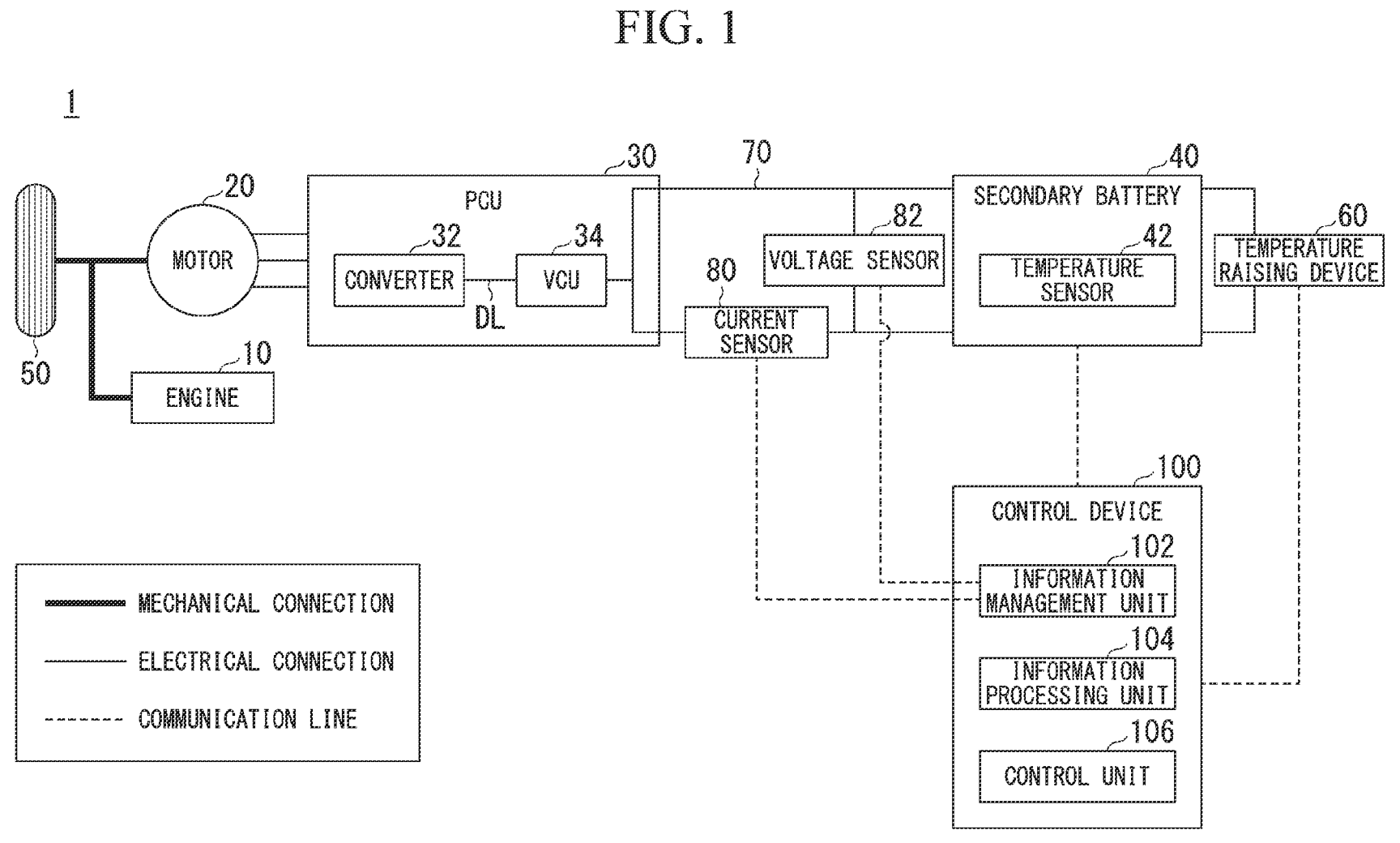

FIG. 1 is a diagram showing an example of a configuration of an electric vehicle equipped with a power storage system 1 including the temperature raising device. The electric vehicle in which the power storage system 1 is mounted is, for example, a vehicle such as a two-, three-, or four-wheeled vehicle, and a drive source thereof is an electric motor or a combination of an electric motor and an internal combustion engine such as a diesel engine or a gasoline engine. The electric motor operates with electric power that is supplied when a secondary battery is discharged. In the following description, an example in which an electric vehicle is a hybrid vehicle using an engine and an electric motor as a drive source will be described.

As shown in FIG. 1, for example, an engine 10, a motor 20, a power control unit (PCU) 30, a secondary battery 40, a drive wheel 50, a temperature raising device 60, a current sensor 80, a voltage sensor 82, a control device 100, and the like are mounted in the power storage system 1.

The engine 10 is an internal combustion engine that outputs motive power by burning fuel such as gasoline. The engine 10 is a reciprocating engine including, for example, a cylinder and a piston, an intake valve, an exhaust valve, a fuel injection device, a spark plug, a connecting rod, a crankshaft, and the like. Also, the engine 10 may be a rotary engine.

The motor 20 is, for example, a three-phase AC power generator. The motor 20 is, for example, a traveling electric motor. The motor 20 outputs motive power to the drive wheel 50 using electric power that is supplied. Also, the motor 20 generates electric power using kinetic energy of the vehicle when the vehicle is decelerating. The motor 20 performs driving and regeneration of the vehicle. The regeneration is a power generation operation by the motor 20. Also, the motor 20 may include an electric motor for the power generation. The electric motor for the power generation generates electric power using, for example, motive power output by the engine 10.

The PCU 30 includes, for example, a converter 32 and a voltage control unit (VCU) 34. Although these constituent elements are a single unitary configuration as the PCU 30, this is only an example and these constituent elements may be in a decentralized arrangement.

The converter 32 is, for example, an AC-direct current (DC) converter. A DC side terminal of the converter 32 is connected to the VCU 34 via a DC link DL. The converter 32 converts an AC current generated by the motor 20 into a DC current and outputs the DC current to the DC link DL or converts a DC current supplied via the DC link DL into an AC current and supplies the AC current to the motor 20.

The VCU 34 is, for example, a DC-DC converter. The VCU 34 boosts electric power supplied from the secondary battery 40 and outputs the boosted power to the converter 32.

The secondary battery 40 is a battery capable of being iteratively charged and discharged such as, for example, a lithium-ion battery. The secondary battery 40 is connected to the PCU 30 by the power line 70. The secondary battery 40 includes, for example, a plurality of battery blocks, which are electrically connected in series with each other. A positive terminal and a negative terminal of each of the battery blocks are connected to the PCU 30. Also, the secondary battery 40 may include a DC-AC converter (not shown), a DC-DC converter (not shown), or the like.

A temperature sensor 42 that detects a temperature of the secondary battery 40 and a current sensor that detects a current output by the secondary battery 40 are provided in the secondary battery 40 (or a housing in which the secondary battery 40 is stored).

The temperature raising device 60 raises the temperature of the lithium-ion battery. Details of the temperature raising device 60 will be described below.

The current sensor 80 is attached to the power line 70. The current sensor 80 detects a current at a prescribed measurement point in the power line 70. The voltage sensor 82 detects a voltage between terminals of the secondary battery 40. For example, the voltage sensor 82 includes a plurality of voltage sensors, each of which may detect a voltage between terminals of a different battery block.

The control device 100 includes, for example, an information management unit 102, an information processing unit 104, and a control unit 106. The information management unit 102, the information processing unit 104, and the control unit 106 may be implemented, for example, by a hardware processor such as a central processing unit (CPU) executing a program (software) stored in a storage device (not shown). Also, some or all of the above constituent elements may be implemented by hardware (including a circuit: circuitry) such as a large-scale integration (LSI) circuit, an application-specific integrated circuit (ASIC), a field-programmable gate array (FPGA), or a graphics processing unit (GPU) or may be implemented by software and hardware in cooperation. The storage device may be implemented by a non-volatile storage device such as a read-only memory (ROM), an electrically erasable programmable read-only memory (EEPROM), or a hard disk drive (HDD) and a volatile storage device such as a random-access memory (RAM) or a register.

The information management unit 102 acquires a detection result of the current sensor 80, a detection result of the voltage sensor 82, a state of the secondary battery 40, a detection result of the temperature sensor 42, and the like. The information management unit 102 manages acquired information and a processing result of its own device. For example, the information management unit 102 causes the storage device to store the above-described information.

The information processing unit 104 estimates a state of charge (SOC) and other states of the secondary battery 40 on the basis of the information acquired by the information management unit 102. The other states include abnormalities and operating states of the secondary battery 40 and the like.

On the basis of an instruction of the control device 100, the control unit 106 controls a charging circuit (not shown) of the secondary battery 40 so that the secondary battery 40 is charged or controls a discharging circuit (not shown) of the secondary battery 40 or a load connected to the secondary battery 40 so that the secondary battery 40 is discharged. The control unit 106 controls the temperature raising device 60 on the basis of the temperature of the secondary battery 40 or the SOC of the secondary battery 40.

FIG. 2 is a diagram showing an example of a schematic configuration of the temperature raising device 60. The temperature raising device 60 includes, for example, a parallel circuit C connected to both ends of the secondary battery 40 and in which the AC power supply 62 and the capacitor 64 are connected in parallel. The AC power supply 62 sets an AC voltage and an AC current on the basis of control of the control device 100 and causes the set AC voltage and the set AC current to be applied to the capacitor 64 and the secondary battery 40.

Figure 3:
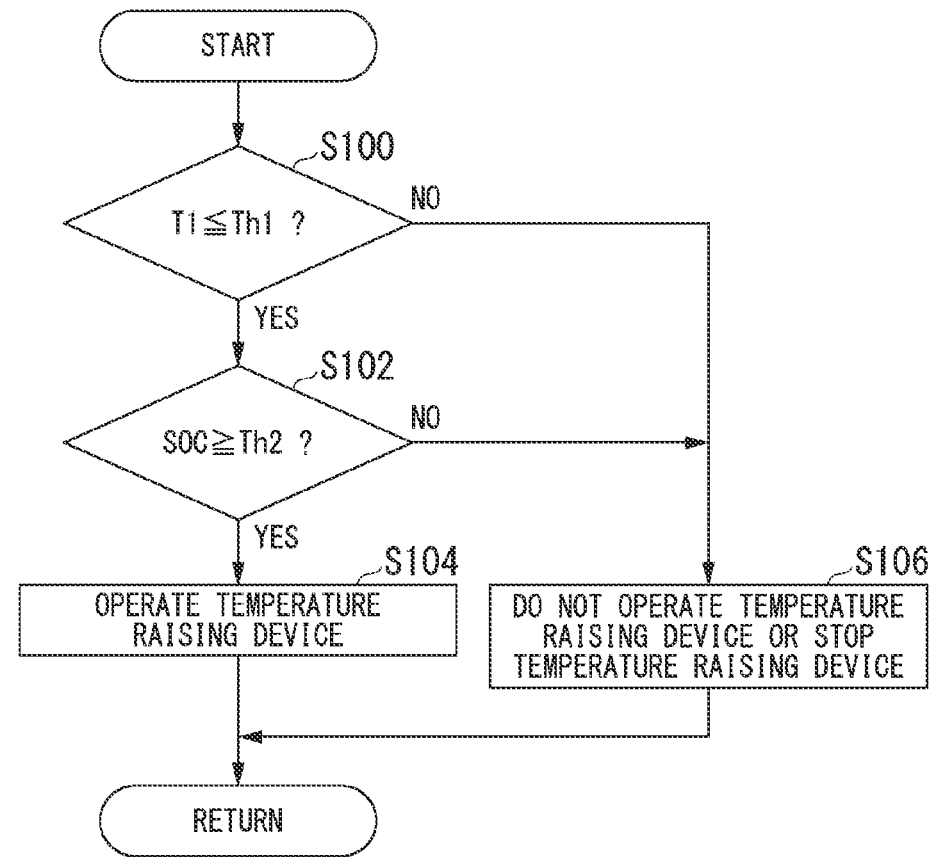
FIG. 3 is a flowchart showing an example of a flow of a process executed by a control unit of a control device.

FIG. 3 is a flowchart showing an example of a flow of a process executed by the control unit 106 of the control device 100. First, the control unit 106 acquires a temperature of the secondary battery 40 from the temperature sensor 42 and determines whether or not an acquired temperature T1 is less than or equal to a threshold value Th1 (step S100). When the acquired temperature T1 is less than or equal to the threshold value Th1, the control unit 106 acquires the SOC of the secondary battery 40 estimated by the information processing unit 104 and determines whether or not the acquired SOC is greater than or equal to a threshold value Th2 (step S102).

When the acquired SOC is greater than or equal to the threshold value Th2, the control unit 106 operates the temperature raising device 60 (step S104). The operation involves supplying electric power to the capacitor 64 and the secondary battery 40. The method of operating the temperature raising device 60 will be described below.

When the acquired temperature T1 is not less than or equal to the threshold value Th1 or when the acquired SOC is not greater than or equal to the threshold value Th2, the control unit 106 does not operate the temperature raising device 60 (step S106). When the temperature raising device 60 is operating, the operation is stopped.

As described above, the control unit 106 controls the temperature raising device 60 on the basis of the temperature and the SOC of the secondary battery 40.

Comparative Example

Figure 4:
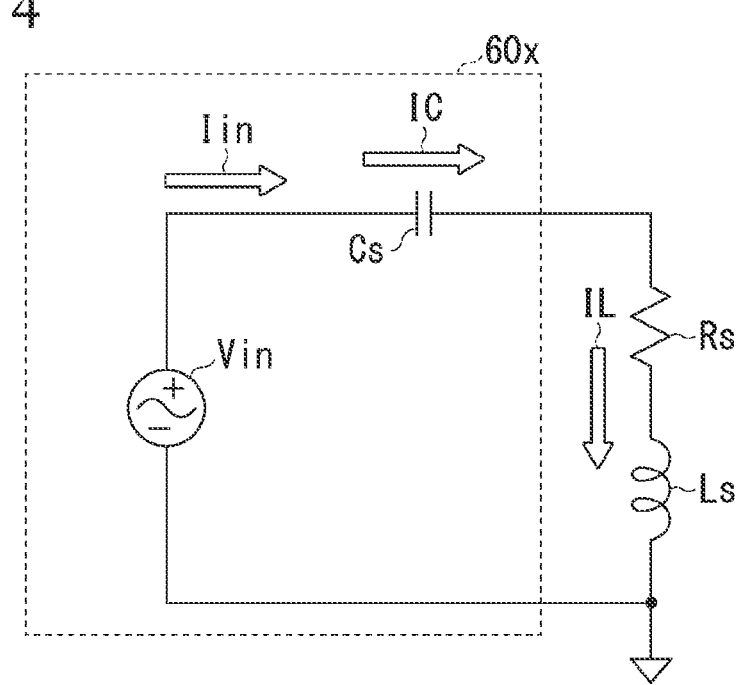
FIG. 4 is a diagram showing a configuration of a temperature raising device according to a comparative example.

FIG. 4 is a diagram showing a configuration of a temperature raising device 60x and a secondary battery 40 according to a comparative example. In the temperature raising device 60x, a capacitor Cs is connected in series with a resistor Rs and a coil Ls and the capacitor Cs and the coil Ls constitute an LC series circuit. In the case of the LC series circuit as shown in FIG. 4, an input current Iin, a current IC, and a current IL are the same. Thus, in the temperature raising device 60x, it is necessary to cause a current having the same amount as the current IL to flow according to an AC generation circuit Vin. Accordingly, when the current IL is increased to increase a heat generation amount, the burden on the AC generation circuit Vin increases.

(Configuration of First Embodiment)

In the first embodiment, a capacitor is added to make a configuration that resonates with the inductance of the secondary battery 40 in a high-frequency band and a large AC current is obtained with a small AC voltage. In this first embodiment, a large heat generation amount can be obtained with a small current by performing a resonating process and a current-carrying process in the circuit at a frequency at which a resistance component value is increased.

Figure 5:
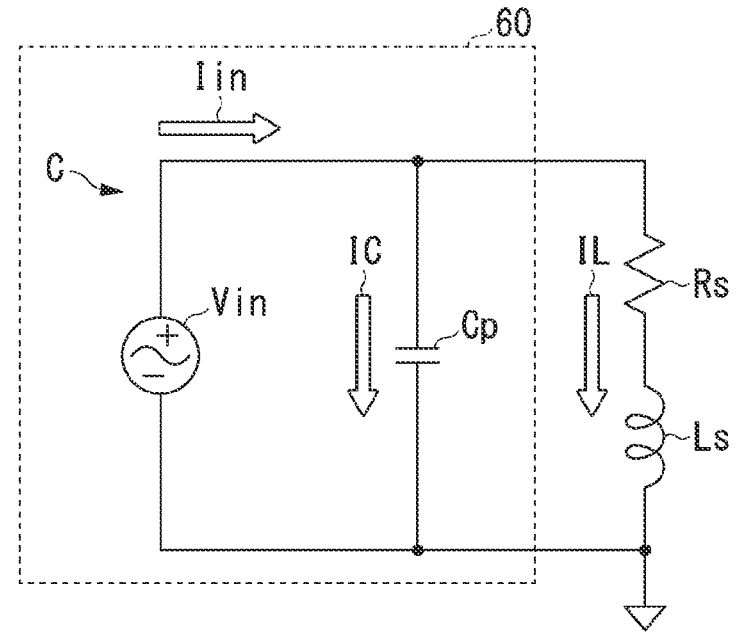
FIG. 5 is a diagram showing a configuration of an equivalent circuit of the temperature raising device according to a first embodiment.

FIG. 5 is a diagram showing a configuration of an equivalent circuit of the temperature raising device 60 and the secondary battery 40 according to the first embodiment. In the temperature raising device 60, for example, the capacitor Cp is connected in parallel to the resistor Rs and the coil Ls, and the capacitor Cp and the coil Ls constitute an LC parallel circuit. The resistor Rs and the coil Ls are virtual components that represent characteristics of the secondary battery that is a temperature raising target. In the case of the LC parallel circuit as shown in FIG. 5, it is possible to obtain a large current IL with a small input current Iin. However, for this purpose, it is necessary to satisfy Inequality (1).

$$C_P < \frac{2L_S}{R_S^2} \tag{1}$$

A condition in which the amplitude of the current IL becomes larger than the input current Iin (=IL+IC) is that capacitance $C_P$ of the capacitor connected in parallel is less than a prescribed value derived in accordance with Inequality (1) from $R_S$ denoting a series resistance component of the secondary battery and $L_S$ denoting a series inductance component. The ratio (i.e., magnification) of the current IL to the input current Iin becomes maximum at an angular frequency $\omega$ shown in Eq. (2).

$$\omega = \sqrt{\frac{2L_S - C_P R_S^2}{2C_P L_S^2}} \tag{2}$$

The magnification of the current IL for the current Iin is expressed as in Eq. (3).

$$\frac{|IL|}{|Iin|} = \frac{2L_S/R_S}{\sqrt{(4L_S - C_P R_S^2)C_P}} \tag{3}$$

Figure 6:
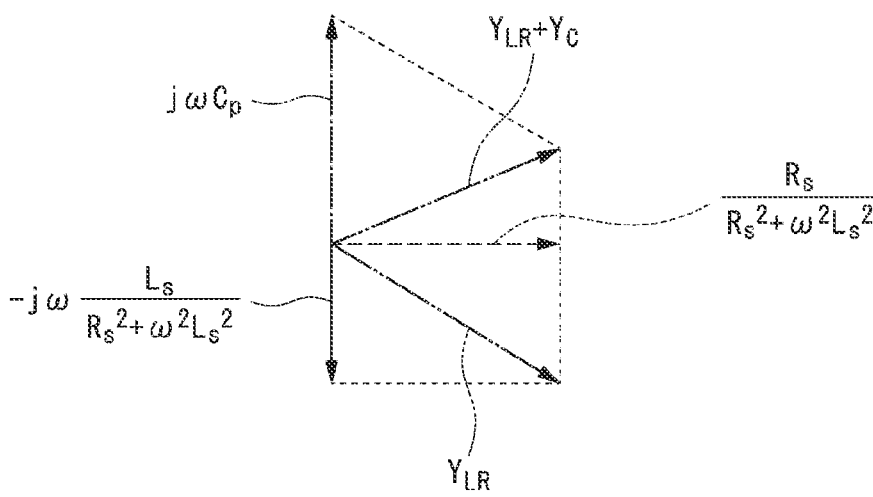
FIG. 6 is a diagram showing an admittance plane.
Figure 6:
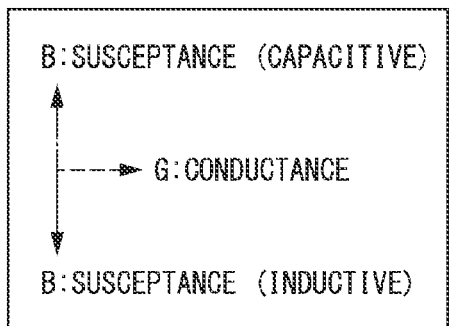

Hereinafter, a relational equation will be described in detail. FIG. 6 is a diagram showing an admittance plane. A real part of the admittance is conductance G, and an imaginary part is capacitive susceptance B and inductive susceptance B. If the admittance of a series circuit of $R_S$ and $L_S$ is denoted by $Y_{LR}$ and the admittance of $C_P$ is denoted by $Y_C$, the admittances are expressed as Eqs. (4) and (5).

$$Y_{LR} = \frac{R_S}{R_S^2 + \omega^2 L_S^2} - j\omega \frac{L_S}{R_S^2 + \omega^2 L_S^2} \tag{4}$$

$$Y_C = j\omega C_P \tag{5}$$

Because the synthetic admittance as seen from the ripple power supply is a sum of $Y_{LR}$ and $Y_C$, the synthetic admittance is expressed as in Eq. (6).

$$Y_{LR} + Y_C = \frac{R_S}{R_S^2 + \omega^2 L_S^2} + j\omega\left(C_P - \frac{L_S}{R_S^2 + \omega L_S^2}\right) \tag{6}$$

Also, the derivation process of Eqs. (4) to (6) is shown in Eqs. (7) to (11). Here. $Z_{LR}$ denotes the impedance of a series circuit of $R_S$ and $L_S$ and $Z_C$ denotes the impedance of $C_P$.

$$Z_{LR} = R_S + j\omega L_S \tag{7}$$

$$Y_{LR} = \frac{1}{Z_{LR}} = \frac{1}{R_S + j\omega L_S} \tag{8}$$

$$= \frac{1}{R_S + j\omega L_S}$$

-continued $$= \frac{R_S - j\omega L_S}{R_S^2 + \omega^2 L_S^2}$$

$$= \frac{R_S}{R_S^2 + \omega^2 L_S^2} - j\frac{\omega L_S}{R_S^2 + \omega^2 L_S^2}$$

$$Z_C = \frac{1}{j\omega C_P} \tag{9}$$

$$Y_C = \frac{1}{Z_C} = j\omega C_P \tag{10}$$

$$Y_{LR} = Y_C = \frac{R_S}{R_S^2 + \omega^2 L_S^2} + j\omega\left\{C_P - \frac{L_S}{R_S^2 + \omega^2 L_S^2}\right\} \tag{11}$$

A square of an absolute value of the admittance $Y_{LR}$ is shown in Eq. (12).

$$|Y_{LR}|^2 = \left(\frac{R_S}{R_S^2 + \omega^2 L_S^2}\right)^2 + \left(\frac{\omega L_S}{R_S^2 + \omega^2 L_S^2}\right) = \frac{R_S^2 + \omega^2 L_S^2}{(R_S^2 + \omega^2 L_S^2)^2} = \frac{1}{R_S^2 + \omega^2 L_S^2} \tag{12}$$

A square of an absolute value of the synthetic admittance $Y_{LR} + Y_C$ is shown in Eq. (13).

$$|Y_{LR} + Y_C|^2 = \left(\frac{R_S}{R_S^2 + \omega^2 L_S^2}\right)^2 + \omega^2\left\{C_P - \frac{L_S}{R_S^2 + \omega^2 L_S^2}\right\}^2 \tag{13}$$

$$= \frac{R_S^2 + \omega^2\{C_P(R_S^2 + \omega^2 L_S^2) - L_S\}^2}{(R_S^2 + \omega^2 L_S^2)^2}$$

$$= \frac{R_S^2 + \omega^2\{C_P^2(R_S^2 + \omega^2 L_S^2)^2 - 2C_P L_S(R_S^2 + \omega^2 L_S^2) + L_S^2\}}{(R_S^2 + \omega^2 L_S^2)^2}$$

$$= \frac{R_S^2 + \omega^2 L_S^2 + \omega^2 C_P^2(R_S^2 + \omega^2 L_S^2)^2 - 2\omega^2 C_P L_S(R_S^2 + \omega^2 L_S^2)}{(R_S^2 + \omega^2 L_S^2)^2}$$

$$= \frac{1 + \omega^2 C_P^2(R_S^2 + \omega^2 L_S^2) - 2\omega^2 C_P L_S}{(R_S^2 + \omega^2 L_S^2)}$$

Eq. (14) and Eq. (15) are shown with respect to a ratio between the square of the absolute value of the admittance $Y_{LR}$ and the square of the absolute value of the synthetic admittance $Y_{LR} + Y_C$.

$$\frac{|Y_{LR}|^2}{|Y_{LR} + Y_C|^2} = \frac{1}{(\omega C_P R_S)^2 + (\omega^2 C_P L_S - 1)^2} \tag{14}$$

$$= \frac{1}{\omega^2 C_P^2 R_S^2 + \omega^4 C_P^2 L_S^2 - 2\omega^2 C_P L_S + 1}$$

$$= \frac{1}{\omega^4 C_P^2 L_S^2 + \omega^2 C_P(C_P R_S^2 - 2L_S) + 1}$$

$$\left(\frac{|Y_{LR}|^2}{|Y_{LR} + Y_C|^2}\right)' = \left(\frac{1}{\omega^4 C_P^2 L_S^2 + \omega^2 C_P(C_P R_S^2 - 2L_S) + 1}\right)' \tag{15}$$

$$= -\left(\frac{1}{\omega^4 C_P^2 L_S^2 + \omega^2 C_P(C_P R_S^2 - 2L_S) + 1}\right)^2 (\omega^4 C_P^2 L_S^2 + \omega^2 C_P(C_P R_S^2 - 2L_S) + 1)'$$

$$= -\left(\frac{1}{\omega^4 C_P^2 L_S^2 + \omega^2 C_P(C_P R_S^2 - 2L_S) + 1}\right)^2 (4\omega^3 C_P^2 L_S^2 + 2\omega C_P^2 R_S^2 - 4\omega C_P L_S)$$

$$= \frac{-2\omega C_P(2\omega^2 C_P L_S^2 + C_P R_S^2 - 2L_S)}{\{\omega^4 C_P^2 L_S^2 + \omega^2 C_P(C_P R_S^2 - 2L_S) + 1\}^2}$$

Here, if $\omega$ satisfying $2\omega^2 C_P L_S{}^2 + C_P R_S{}^2 - 2L_S = 0$ is $\omega_0$, $\omega_0{}^2$ is expressed as Eq. (16).

$$\omega_0^2 = \frac{2L_S - C_P R_S^2}{2 C_P L_S^2} \tag{16}$$

From the relationship of Eq. (17), in the case of $C_P R_S{}^2 > 2L_S$, Eq. (18) is established.

$$\frac{|Y_{LR}|^2}{|Y_{LR} + Y_C|^2} = \frac{1}{\omega^4 C_P^2 L_S^2 + \omega^2 C_P (C_P R_S^2 - 2L_S) + 1} \tag{17}$$

$$\frac{|Y_{LR}|^2}{|Y_{LR} + Y_C|^2} < 1 \tag{18}$$

In the case of $C_P R_S{}^2 = 2L_S$, when $\omega = 0$, Eq. (19) is established.

$$\frac{|Y_{LR}|^2}{|Y_{LR} + Y_C|^2} = 1 \tag{19}$$

When $C_P R_S{}^2 < 2L_S$, there is $\omega$ associated with Eq. (20).

$$\left( \frac{|Y_{LR}|^2}{|Y_{LR} + Y_C|^2} \right)' = 0 \tag{20}$$

$\omega_0{}^2$ is expressed as Eq. (21).

$$\omega_0^2 = \frac{2L_S - C_P R_S^2}{2 C_P L_S^2} \tag{21}$$

When $\omega = \omega_0$, Expression (22) reaches an extreme value.

$$\frac{|Y_{LR}|}{|Y_{LR} + Y_C|} \tag{22}$$

It is necessary to establish $C_P R_S{}^2 < 2L_S$ so that Inequality (23) is established.

$$\frac{|Y_{LR}|^2}{|Y_{LR} + Y_C|^2} > 1 \tag{23}$$

Accordingly, it is only necessary to select the capacitor so that Inequality (24) is satisfied.

$$C_P < \frac{2L_S}{R_S^2} \tag{24}$$

Next, the angular frequency $\omega^2$ is expressed as in Inequalities (25).

$$\omega C_P \le 2\omega \frac{L_S}{R_S^2 + \omega^2 L_S^2} \tag{25}$$

$$C_P \le \frac{2L_S}{R_S^2 + \omega^2 L_S^2}$$

$$C_P (R_S^2 + \omega^2 L_S^2) \le 2L_S$$

$$\omega^2 \le \frac{2L_S - C_P R_S^2}{C_P L_S^2}$$

In $\omega = \omega_0$, Eq. (26) is given.

$$\begin{aligned}
\frac{|Y_{LR}|^2}{|Y_{LR} + Y_C|^2} &= \frac{1}{\omega_0^4 C_P^2 L_S^2 + \omega_0^2 C_P (C_P R_S^2 - 2L_S) + 1} \\[2mm]
&= \frac{1}{\left( \dfrac{2L_S - C_P R_s^2}{2 C_P L_S^2} \right)^2 C_P^2 L_S^2 + \dfrac{2L_s - C_P R_s^2}{2 C_P L_s^2} C_) (C_P R_S^2 - 2L_s) + 1} \\[2mm]
&= \frac{1}{\dfrac{(2L_S - C_P R_S^2)^2}{4 L_S^2} - \dfrac{(2L_S - C_P R_S^2)^2}{2 L_S^2} + 1} \\[2mm]
&= \frac{4 L_S^2}{(2L_S - C_P R_S^2)^2 - 2(2L_S - C_P R_S^2)^2 + 4 L_S^2} \\[4mm]
&= \frac{4 L_S^2}{4 L_S^2 - (2L_S - C_P R_S^2)^2} \\[4mm]
&= \frac{4 L_S^2}{4 L_S^2 - 4 L_S^2 + 4 L_S C_P R_S^2 - C_P^2 R_S^4}
\end{aligned} \tag{26}$$

-continued $$
= \frac{4L_S^2}{4L_S - C_P R_S^2} \frac{1}{C_P R_S^2}
$$

$$
= \frac{4L_S^2 / R_S^2}{(4L_S - C_P R_S^2) C_P}
$$

Accordingly: in $\omega = \omega_0$, Eq. (27) is given.

$$
\frac{|Y_{LR}|}{|Y_{LR} + Y_C|} = \frac{2L_S / R_S}{\sqrt{(4L_S - C_P R_S^2) C_P}} \tag{27}
$$

Here, Eq. (28) is defined.

$$
n^2 = \frac{L_S}{C_P R_S^2} \tag{28}
$$

The capacitance $C_P$ is expressed as in Eq. (29).

$$
C_P = \frac{L_S}{n^2 R_S^2} \tag{29}
$$

Accordingly. Eq. (30) can be shown.

$$
\frac{|Y_{LR}|}{|Y_{LR} + Y_C|} = \frac{2L_S / R_S}{\sqrt{\left(4L_S - \frac{L_S}{n^2 R_S^2} R_S^2\right) \frac{L_S}{n^2 R_S^2}}} \tag{30}
$$

$$
= \frac{2n^2}{\sqrt{4n^2 - 1}}
$$

Likewise, $\omega_0$ can be shown as Eq. (31).

$$
\omega_0 = \sqrt{\frac{2L_S - C_P R_S^2}{2C_P L_S^2}} \tag{31}
$$

$$
= \sqrt{\frac{2L_S - \frac{L_S}{n^2 R_S^2} R_S^2}{2\frac{L_S}{n^2 R_S^2} L_S^2}} = \sqrt{\frac{2n^2 R_S^2 - R_S^2}{2L_S^2}}
$$

$$
= \sqrt{n^2 - \frac{1}{2}} \frac{R_S}{L_S}
$$

Figure 7:
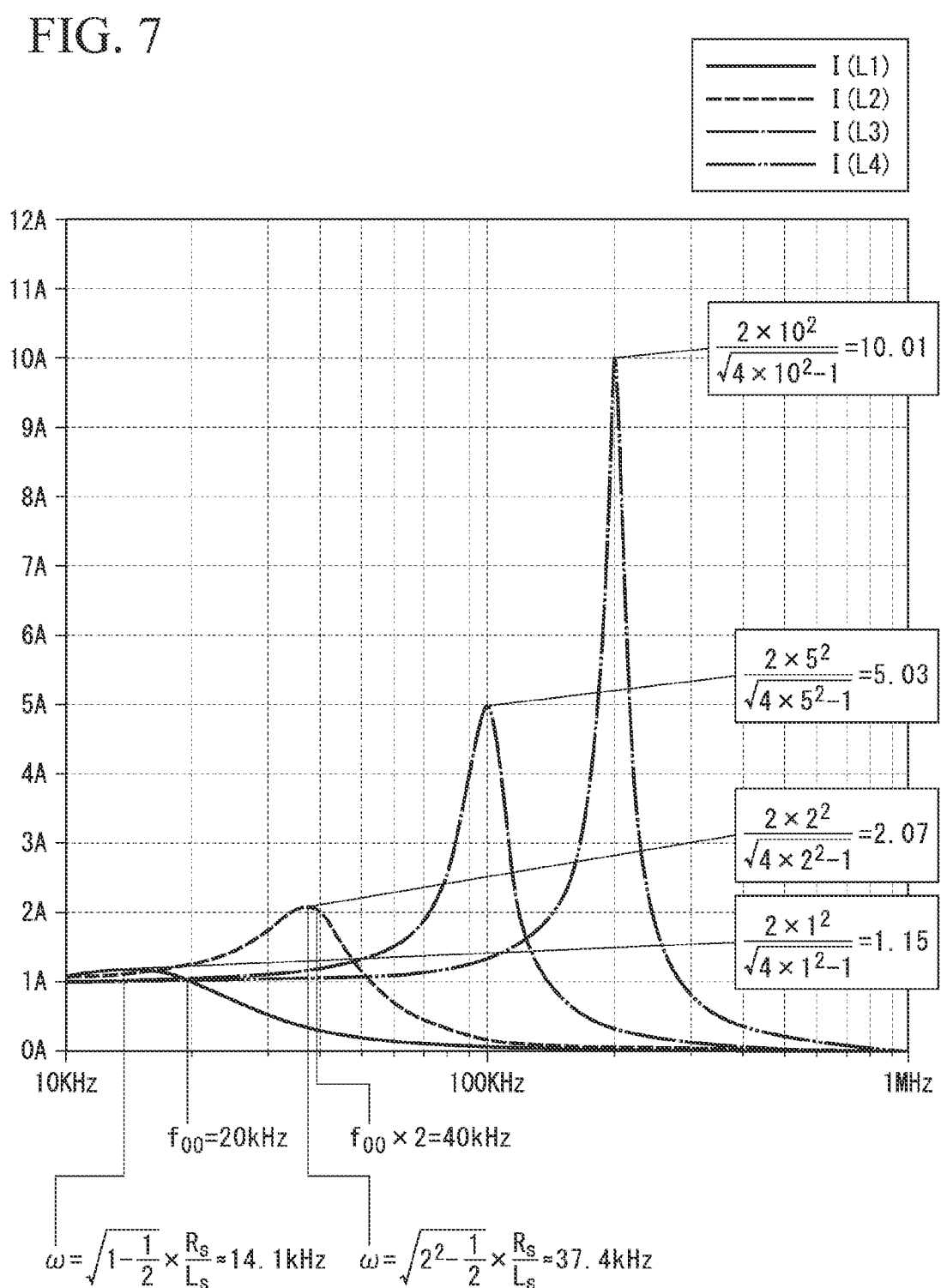
FIG. 7 is a diagram showing an amplitude of an electric current flowing through a coil when the capacitance of the capacitor is reduced stepwise.

Hereinafter, the principle of obtaining a current amplitude multiplied by n will be described. FIG. 7 is a diagram showing an amplitude of a current flowing through the coil Ls when the capacitance of the capacitor is reduced stepwise. The vertical axis represents a current [A] and the horizontal axis represents a frequency [Hz]. When the resistance component $R_S$ is 0.1[Ω], the inductance component (coil) $L_S$ is 796 [nH], and the input current Iin is 1 [A], an amplitude of the current flowing through the coil Ls in a range of a frequency from several tens of kilohertz [kHz] to 1 [MHz] is indicated by curves I(L1), I(L2), I(L3), and I(L4) in FIG. 7 with respect to each value (n=1, 2, 5, 10) related to the capacitance $C_P$.

Here, if the angular frequency $\omega_{00} = R_S/L_S$ is defined, its value is 125.66k [rad/s] and the frequency $f_{00}$ is $\omega_{00}/2\pi = 20$

[kHz]. From Eqs. (33), it can be seen that a current amplitude multiplied by approximately n can be obtained for the frequency $f_{00}$.

$$
C_P = \frac{C_P 00}{n^2} = \frac{L_S}{n^2 R_S^2} \tag{33}
$$

$$
\frac{|Y_{LR}|}{|Y_{LR} + Y_C|} = \frac{IL}{Iin} = \frac{2n^2}{\sqrt{4n^2 - 1}}
$$

$$
\omega_0 = \sqrt{n^2 - \frac{1}{2}} \frac{R_S}{L_S}
$$

Specifically, for each of n=1, 2, 5, 10, the magnification of the coil Ls for the input current Iin is obtained as shown in Eqs. (34) to (37).

$$
\frac{2 \times 1^2}{\sqrt{4 \times 1^2 - 1}} = 1.15 \tag{34}
$$

$$
\frac{2 \times 2^2}{\sqrt{4 \times 2^2 - 1}} = 2.07 \tag{35}
$$

$$
\frac{2 \times 5^2}{\sqrt{4 \times 5^2 - 1}} = 5.03 \tag{36}
$$

$$
\frac{2 \times 10^2}{\sqrt{4 \times 10 - 1}} = 10.01 \tag{37}
$$

Also, the angular frequency $\omega$ when n=1 is as shown in Eq. (38) and the angular frequency $\omega$ when n=2 is as shown in Eq. (39).

$$
\omega = \sqrt{1 - \frac{1}{2}} \times \frac{R_S}{L_S} \approx 14.1 \text{kHz} \tag{38}
$$

$$
\omega = \sqrt{2^2 - \frac{1}{2}} \times \frac{R_S}{L_S} \approx 37.4 \text{kHz} \tag{39}
$$

Figure 8:
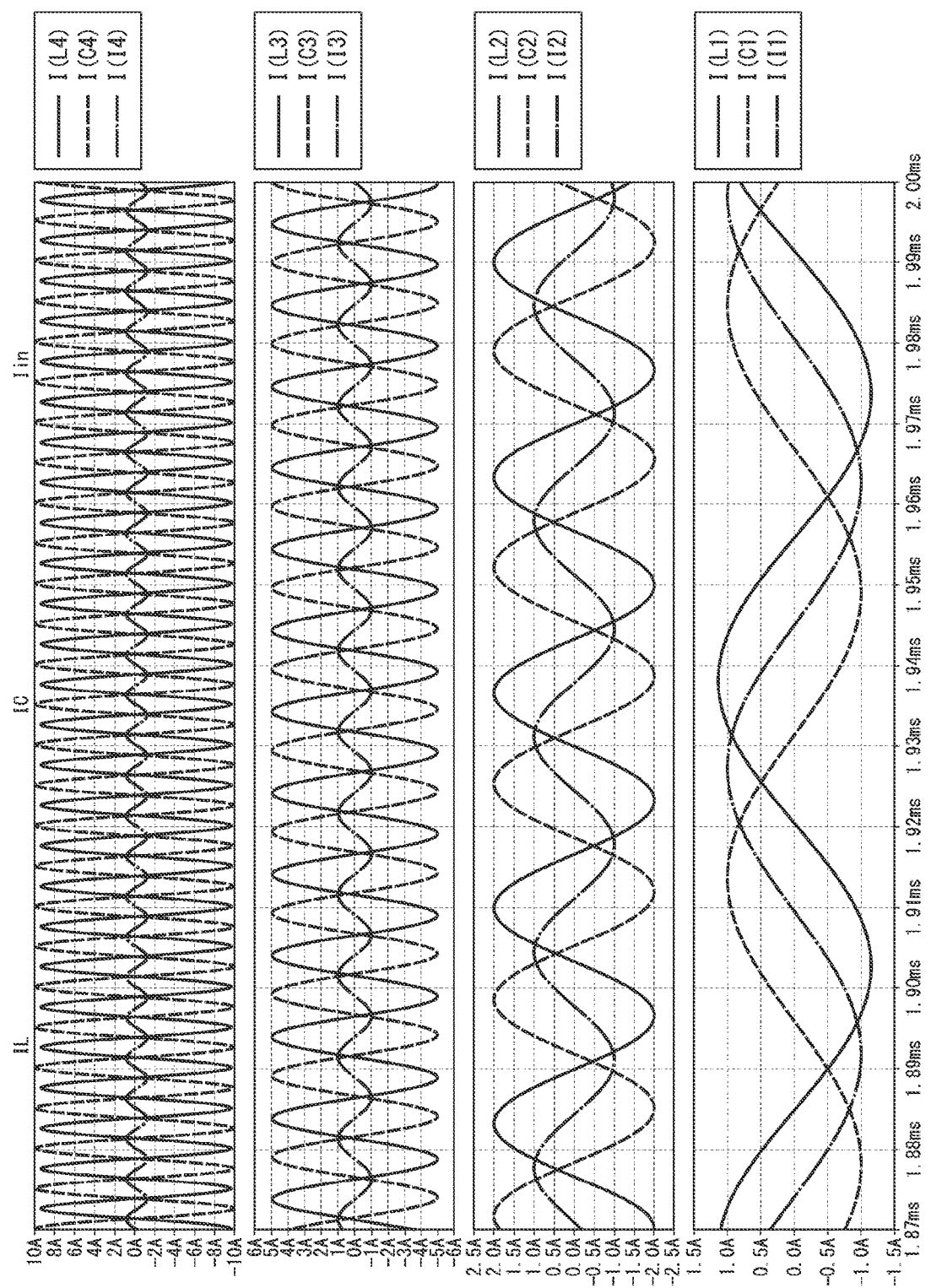
FIG. 8 is a diagram showing electric current waveforms of parts for each value (n=1, 2, 5, 10) of the capacitance of the capacitor.

FIG. 8 is a diagram showing current waveforms of parts for each value (n=1, 2, 5, 10) of the capacitance of the capacitor $C_P$. The vertical axis represents a current [A] and the horizontal axis represents time [ms]. From the lowest drawing to the upper drawing of FIG. 8, when $C_P = C_P 00 = 79.6$ [μF], the current IL=Iin×1.15 [A] and the frequency f=14.1 [KHz]. When $C_P = C_P 00/2^2 = 19.9$ [μF], the current IL=Iin×2.07 [A] and the frequency f=37.4 [KHz]. When $C_P = C_P 00/5^2 = 3.18$ [μF], the current IL=Iin×5.03 [A] and the frequency f=99.0 [KHz]. When $C_P = C_P 00/10^2 = 796$ [nF], the current IL=Iin×10.01 [A] and the frequency f=14.1 [kHz].

Here, resonance at a high frequency will be described. In the case of the application to a hybrid electric vehicle (HEV), an electric vehicle (EV), or the like, in the characteristics of the secondary battery, a resistance component has several milliohms [mΩ] per single cell and an inductance component has several tens of nanohenries [nH]. In the entire battery pack, generally, the resistance component has about 100 [mΩ] to 500 [mΩ] and the inductance component has about 1 [μH] to 10 [μH]. The input capacitor of the PCU is connected in parallel to the secondary battery and is approximately 100 [μF] or more. In this application example, it is desirable to perform a resonating process at a high frequency.

That is, the resonance frequency is 11.3 [KHz] as shown in Eqs. (40) under the condition that $R_S$=100 [mΩ], $L_S$=10 [μH], and $C_P$=100 [μF]. At this time, the magnification of the current is a factor of 1.15 as shown in Eq. (41). The effect of increasing the current flowing through the secondary battery with respect to the input current is small.

$$\omega = \sqrt{\frac{2L_S - C_P R_S^2}{2C_P L_S^2}}$$ (40)

$$= \sqrt{\frac{2 \times 1 \times 10^{-6} - 100 \times 10^{-6} \times 0.1^2}{2 \times 100 \times 10^{-6} \times (1 \times 10^{-6})^2}}$$

$$= \frac{1}{\sqrt{2}} 10^5$$

$$f = \frac{1}{2\pi\sqrt{2}} 10^5 = 11.25 \text{kHz}$$

$$\frac{|IL|}{|Iin|} = \frac{2L_S / R_S}{\sqrt{(4L_S - C_P R_S^2)C_P}}$$ (41)

$$= \frac{2 \times 1 \times 10^{-6} / 0.1}{\sqrt{(4 \times 1 \times 10^{-6} - 100 \times 10^{-6} \times 0.1^2)100 \times 10^{-6}}}$$

$$= \frac{2 \times 10^{-5}}{\sqrt{(4 \times 10^{-6} - 1 \times 10^{-6}) \times 10^{-4}}} = \frac{2 \times 10^{-5}}{\sqrt{3 \times 10^{-10}}} = \frac{2}{\sqrt{3}}$$

$$= 1.1547$$

Also, the operating frequency of the PCU is often about 15 [kHz] or higher avoiding the audible range, and the above-described resonance frequency is less than the operating frequency and unintended resonance occurs in a normal operation. In order to suppress the resonant current, it is conceivable to increase the capacitance of the input capacitor of the PCU or to increase the inductance by adding a reactor. However, this case is not preferable because the resonance frequency decreases. That is, when the frequency of the AC current applied to the secondary battery is low, the charge/discharge reaction inside of the battery increases, such that the current amplitude must be suppressed from the viewpoint of preventing overcharging and overdischarging of the secondary battery and the effect of heating the secondary battery decreases.

Therefore, a secondary battery having characteristics that a resistance component value of the impedance of the secondary battery decreases as the frequency of the AC current flowing through the secondary battery rises from the low frequency and that a resistance component value increases as a distance from a frequency at which the resistance component is minimum to a high-frequency side increases may be used and an AC current of a frequency of a high-frequency band higher than the frequency at which the resistance component is minimum may be allowed to flow through the secondary battery.

Also, it is preferable to decrease a change in the voltage of the entire battery group by dividing a group of batteries connected in series into a plurality of blocks, causing a high-frequency current to flow through the secondary battery of each block using a high-frequency current generation circuit connected to each block, and making a phase of the high-frequency current for each block different. This will be described in the third embodiment.

Then, it becomes easy to perform a resonating process in a high-frequency range of 100 [KHz] or higher by combining a small capacity capacitor of several microfarads [μF] with a secondary battery of an actual HEV or EV as described above.

Figure 9:
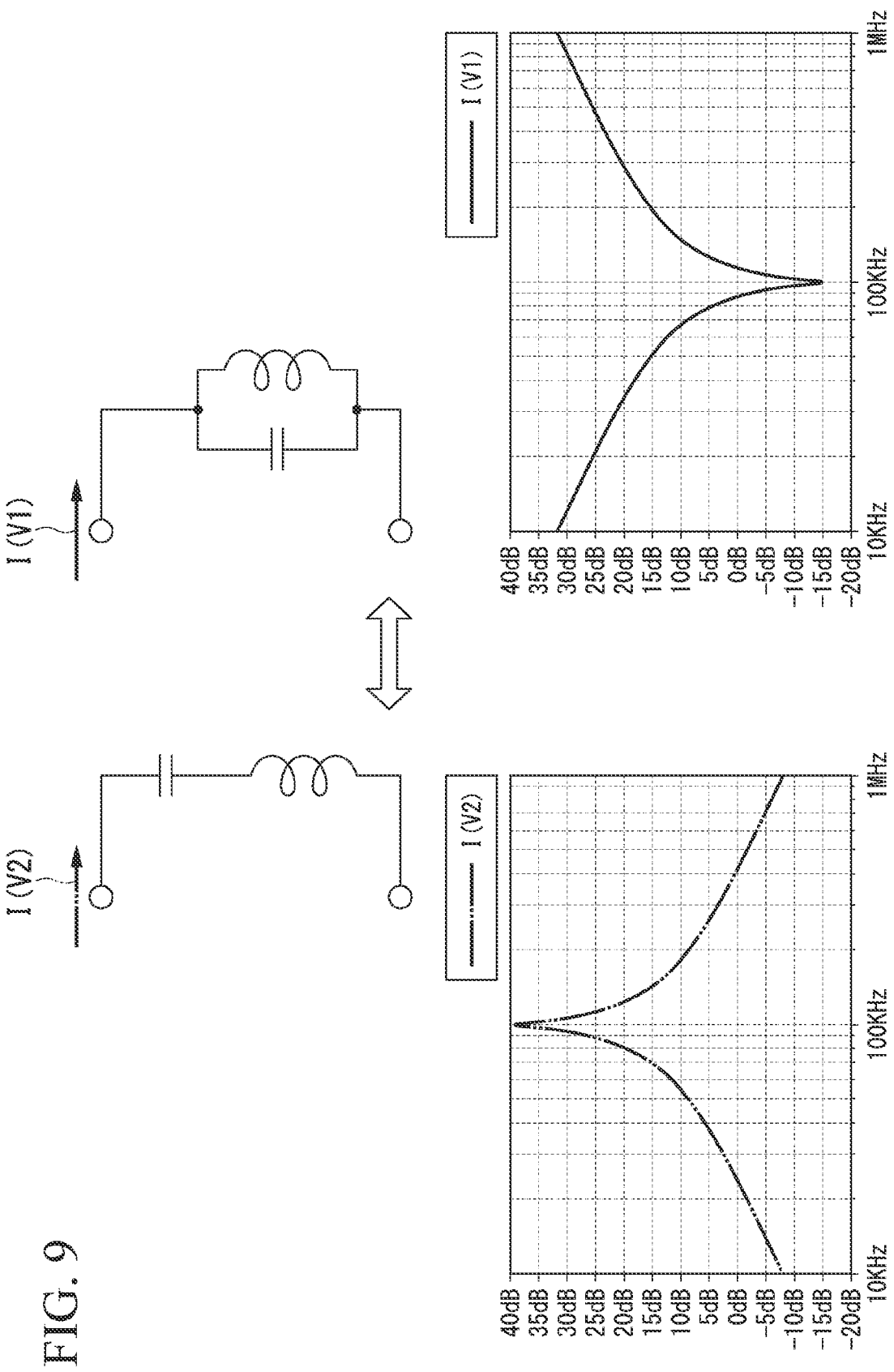
FIG. 9 is a diagram showing a comparison of impedance between an LC series circuit and an LC parallel circuit.

Here, a comparison between LC series resonance and LC parallel resonance will be described. FIG. 9 is a diagram showing an impedance comparison between an LC series circuit and an LC parallel circuit. As shown in the left drawing of FIG. 9, in the case of the LC series circuit, the impedance Z=0 at the resonance frequency. On the other hand, as shown in the right drawing of FIG. 9, in the case of the LC parallel circuit, the impedance Z=∞ (infinity) at the resonance frequency.

Figure 10:
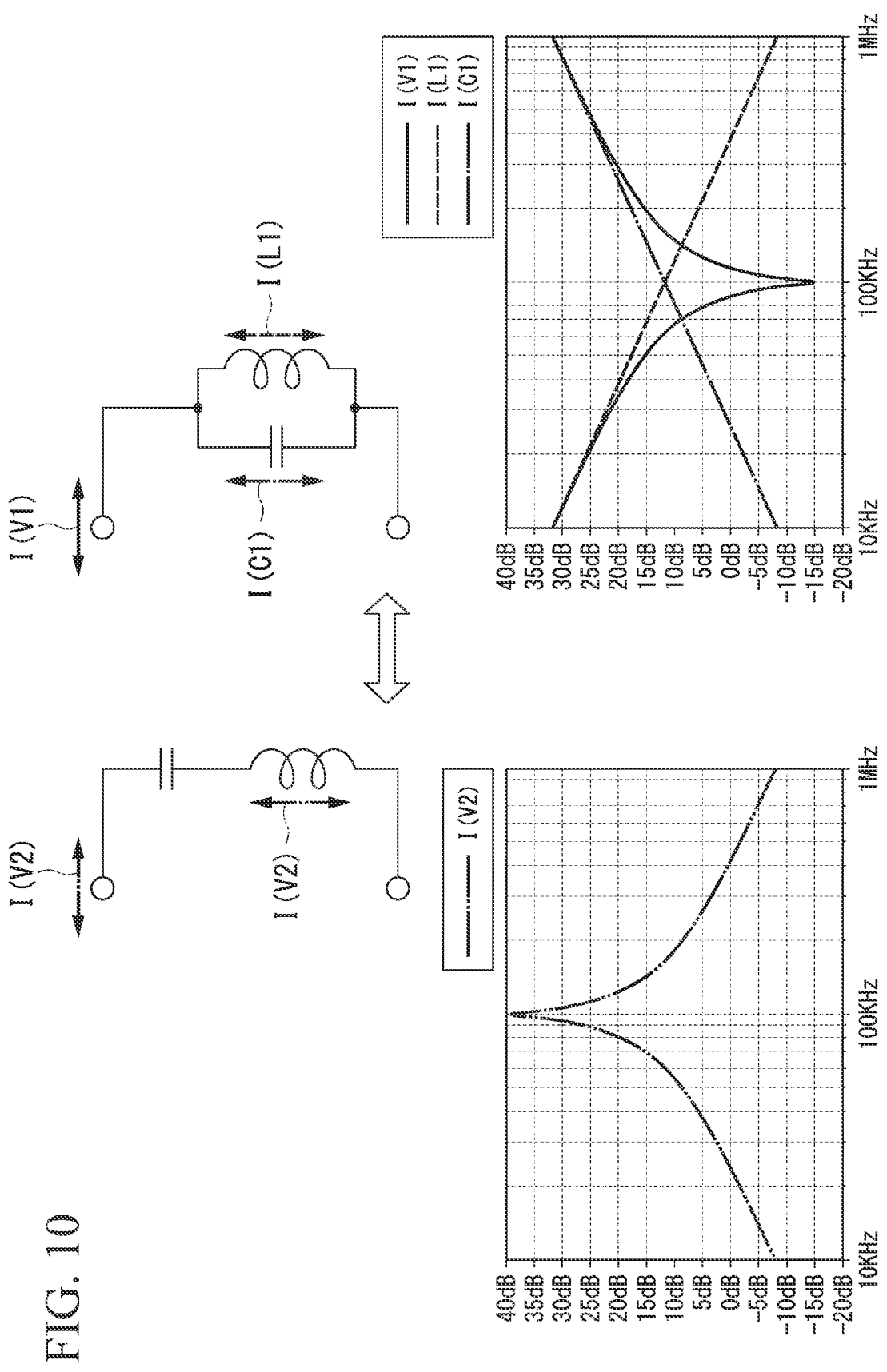
FIG. 10 is a diagram showing a comparison of electric current characteristics between an LC series circuit and an LC parallel circuit.

FIG. 10 is a diagram showing a current characteristic comparison between an LC series circuit and an LC parallel circuit. As shown in the left drawing of FIG. 10, in the case of the LC series circuit, the impedance Z=0 at the resonance frequency. Because of a series circuit, the input current and the current flowing through the coil are the same (I(V2)). On the other hand, as shown in the right drawing of FIG. 10, in the case of the LC parallel circuit, the impedance Z=∞ (infinity) at the resonance frequency. At the resonance frequency, the input current I(V1) hardly flows, but currents I(C1) and I(L1) circulate between the coil and the capacitor.

Figure 11:
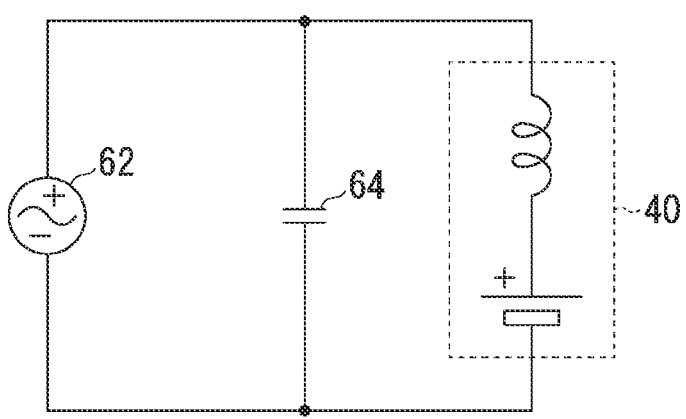
FIG. 11 is a diagram showing an example of a configuration of the first embodiment.

FIG. 11 is a diagram showing an example of a configuration of the first embodiment. When the secondary battery 40 and the capacitor 64 are connected in parallel and a ripple is applied from the AC power supply (also referred to as an "AC generation circuit") 62 to the parallel circuit, a small-amplitude ripple current causes a large-amplitude AC current between the secondary battery 40 and the capacitor 64 to be generated. The temperature of the secondary battery 40 can be raised by this large-amplitude AC current.

Figure 12:
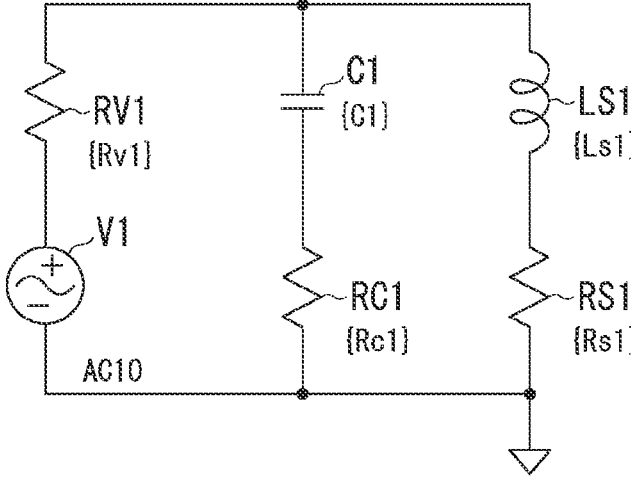
FIG. 12 is a diagram showing an example of an AC equivalent circuit of the first embodiment.

FIG. 12 is a diagram showing an example of an AC equivalent circuit according to the first embodiment. In relation to the circuit constants, for example, it is assumed that series inductance Ls1 of the secondary battery is 200 [nH], series resistance Rs1 of the secondary battery is 100 [mΩ], the capacitance of the parallel connection capacitor C1 is 3 [μF], the equivalent series resistance Rc1 of the capacitor is 1 [mΩ], and the output resistance Rv1 of the AC power supply is 100 [mΩ].

Figure 13:
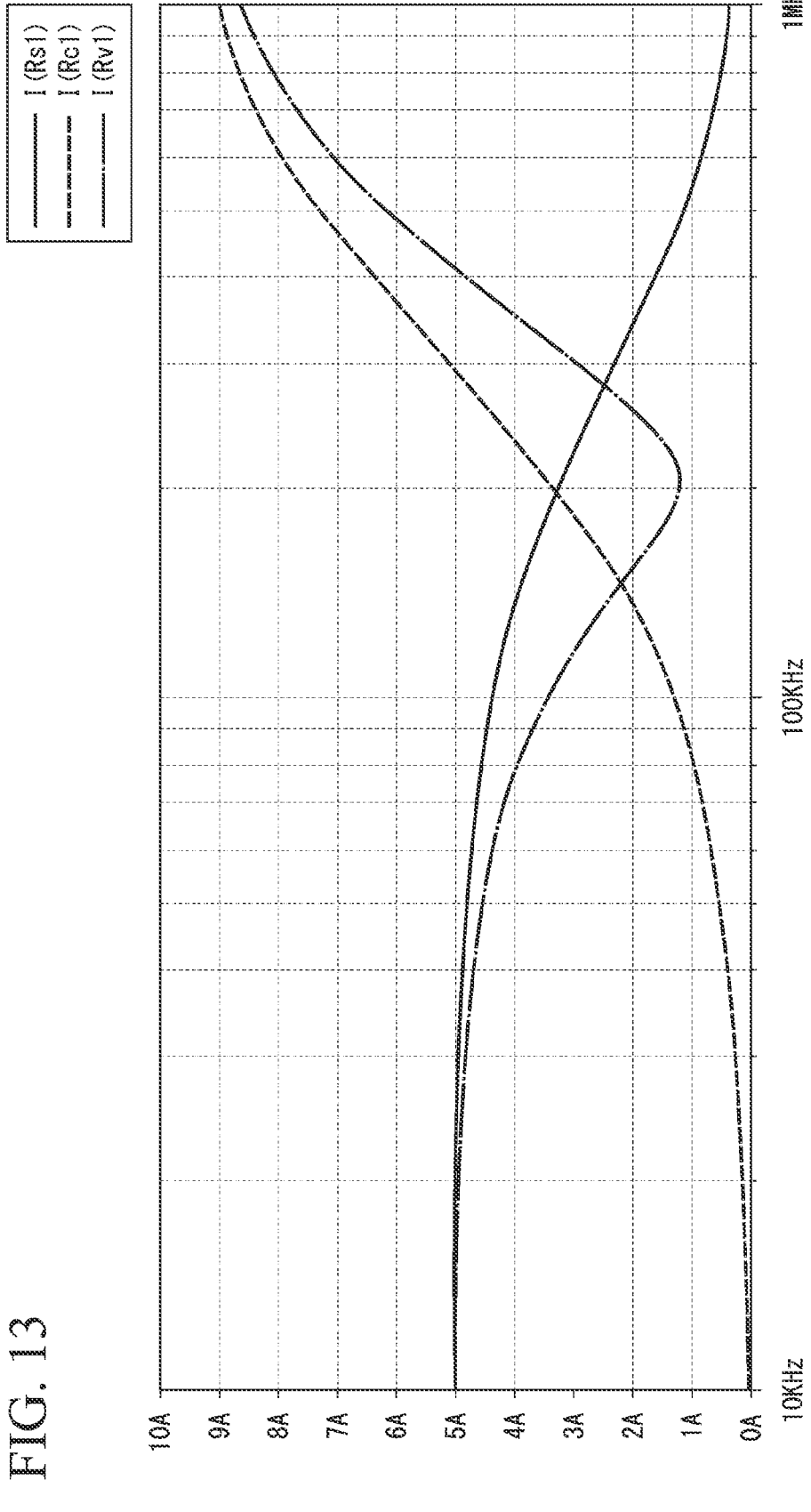
FIG. 13 is a diagram showing changes in electric current amplitudes of parts according to a frequency when an AC power supply outputs a sinusoidal wave voltage with an amplitude of 1 [V].

FIG. 13 is a diagram showing a change in a current amplitude of each part due to a frequency when the AC power supply outputs a sinusoidal voltage having an amplitude of 1 [V]. As shown in FIG. 13, a current flowing through the AC power supply V1 is denoted by I(Rv1), a current flowing through the capacitor C1 is denoted by I(Rc1), and a current flowing through the coil LS1 is denoted by I(Rs1). The resonance frequency in this case is shown in Eq. (42).

$$\frac{1}{2\pi\sqrt{Ls1 \cdot C1}} = \frac{1}{2\pi\sqrt{200 \times 10^{-9} 3 \times 10^{-6}}}$$ (42)

$$= 205,468 \text{Hz}$$

Figure 14:
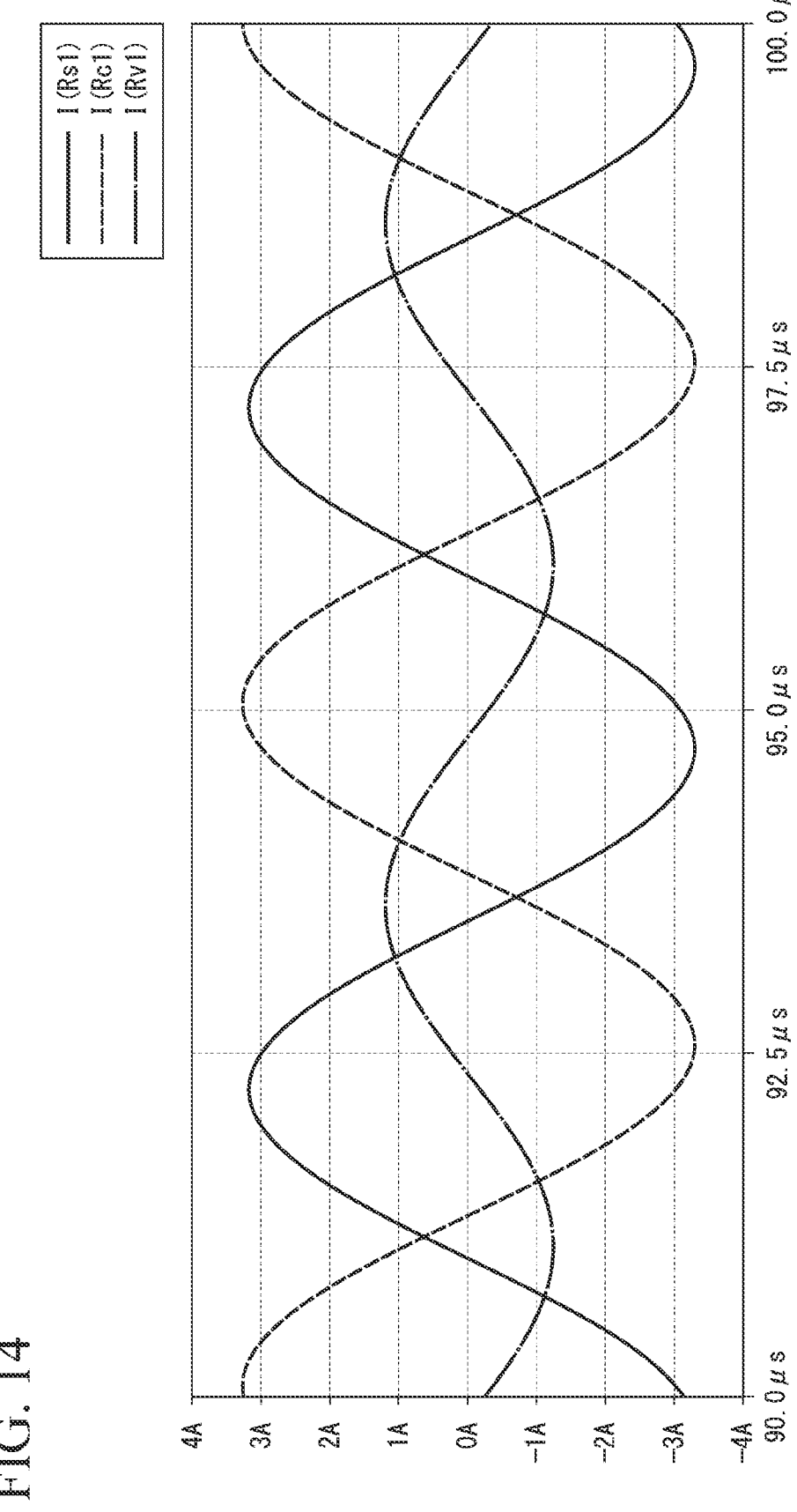
FIG. 14 is a diagram showing electric current waveforms of parts when an AC voltage having an amplitude of 1 [V] is applied at 200 [kHz] from an AC power supply.

FIG. 14 is a diagram showing a current waveform of each part when an AC voltage having an amplitude of 1 [V] is applied at 200 [KHz] from the AC power supply V1. Also, in relation to the positive and negative values of the current, the current is positive in the downward direction in the AC equivalent circuit of FIG. 12. According to FIG. 14, it can be seen that, in the vicinity of the resonance frequency, an AC current I(Rs1) larger than the AC current I(Rv1) output by the AC power supply V1 flows through the secondary battery.

Figure 15:
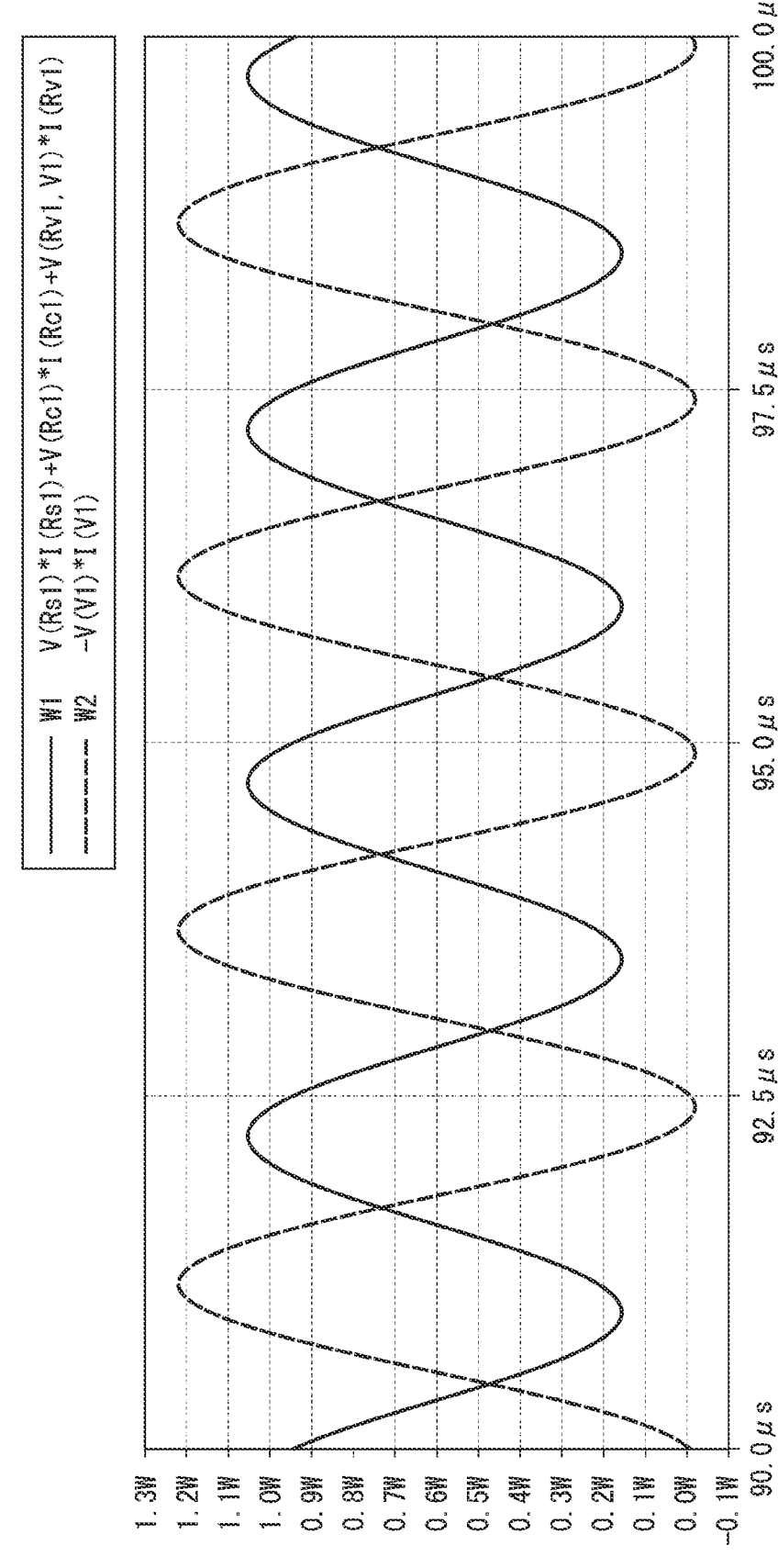
FIG. 15 is a diagram for describing a state in which a battery is not charged/discharged and a state of charge (SOC) does not change.

FIG. 15 is a diagram for describing a state in which the secondary battery is not charged/discharged and the SOC does not change. In a state in which the secondary battery is not charged/discharged and the SOC does not change, according to the law of conservation of energy, total heat generation work W1 generated by resistance components of constituent elements and electric power W2 output by the AC power supply have substantially equal values on average.

Figure 16:
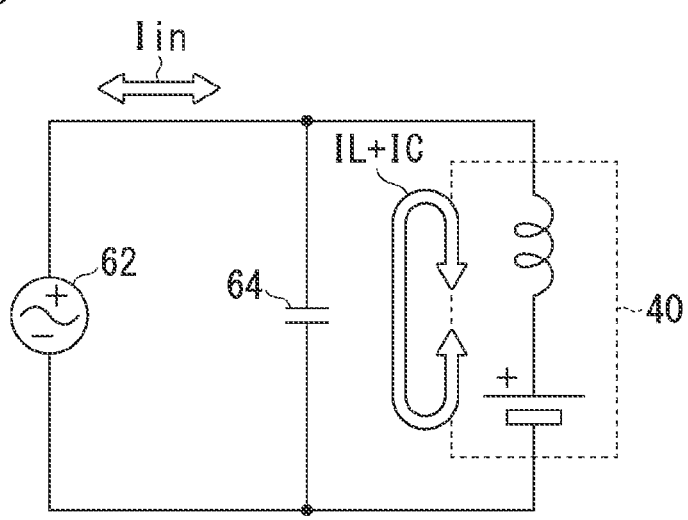
FIG. 16 is a diagram for describing an effect of the first embodiment.

FIG. 16 is a diagram for describing the effect of the first embodiment. According to the first embodiment, there are provided a parallel circuit including a capacitor 64 connected in parallel to the secondary battery 40 of a temperature raising target and an AC power supply 62 connected to the parallel circuit. When the capacitance of the capacitor 64 denoted by $C_P$, the inductance component of the secondary battery 40 is denoted by $L_S$, and the resistance component of the secondary battery 40 is denoted by $R_S$, $C_P$ satisfies Inequality (1) and an angular frequency ω of the AC generation unit satisfies Eq. (2). Thereby, the AC current (IL+IC) becomes larger than the input current Iin. In other words, a large value of IL can be obtained at a small value of Iin. Thus, the secondary battery 40 can be heated by the AC current IL flowing through the secondary battery 40. Also, because a resonating process can be performed at a high frequency, the generation of an unintended resonant current can be suppressed and the temperature of the secondary battery 40 can be raised more efficiently.

Second Embodiment

Figure 17:
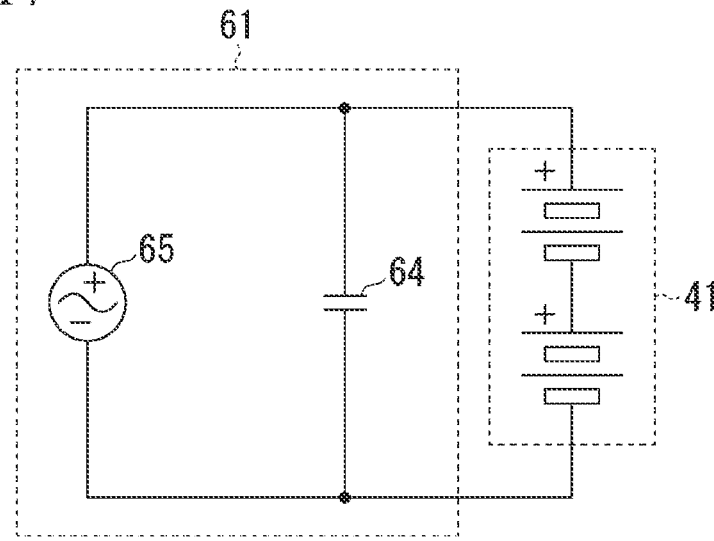
FIG. 17 is a diagram showing an example of a configuration of a second embodiment.

FIG. 17 is a diagram showing an example of a configuration of a second embodiment. A temperature raising device 61 according to the second embodiment is connected to a secondary battery 41 having prescribed impedance characteristics. The temperature raising device 61 includes, for example, a capacitor 64 connected in parallel to the secondary battery 41 and a generation circuit 65 connected in parallel to the capacitor 64 and configured to generate a ripple current. The generation circuit 65 configured to generate this ripple current is an example of an "AC generation circuit" in the claims. The ripple current flows between a parallel circuit including the secondary battery 41 and the capacitor 64 and the generation circuit 65. Due to this ripple current, an AC current that flows back and forth between secondary battery 41 and the capacitor 64 inside of the parallel circuit is generated. When this AC current flows through the secondary battery 41, the secondary battery 41 is heated.

Figure 18:
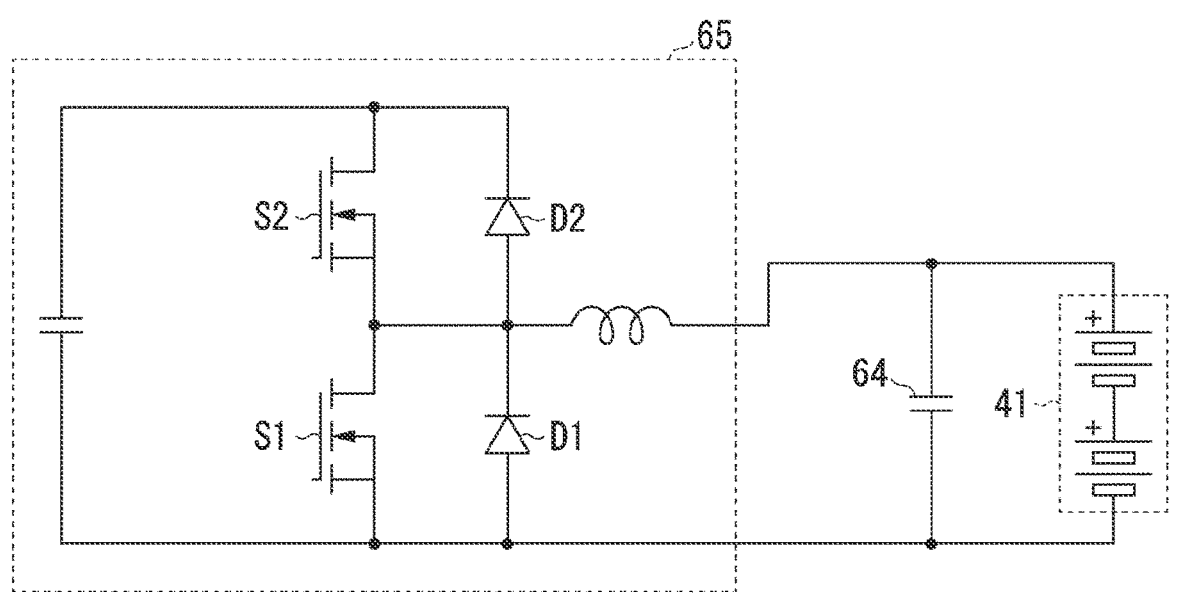
FIG. 18 is a diagram showing an example of a more specific configuration of the second embodiment.

FIG. 18 is a diagram showing a more specific configuration example of the second embodiment. The generation circuit 65 that generates the ripple current includes, for example, a first rectification element D1, a first switching element S1 connected in parallel to the first rectification element D1, a second rectification element D2 connected in series with the first rectification element D1, and a second switching element S2 connected in parallel to the second rectification element D2.

Figure 19:
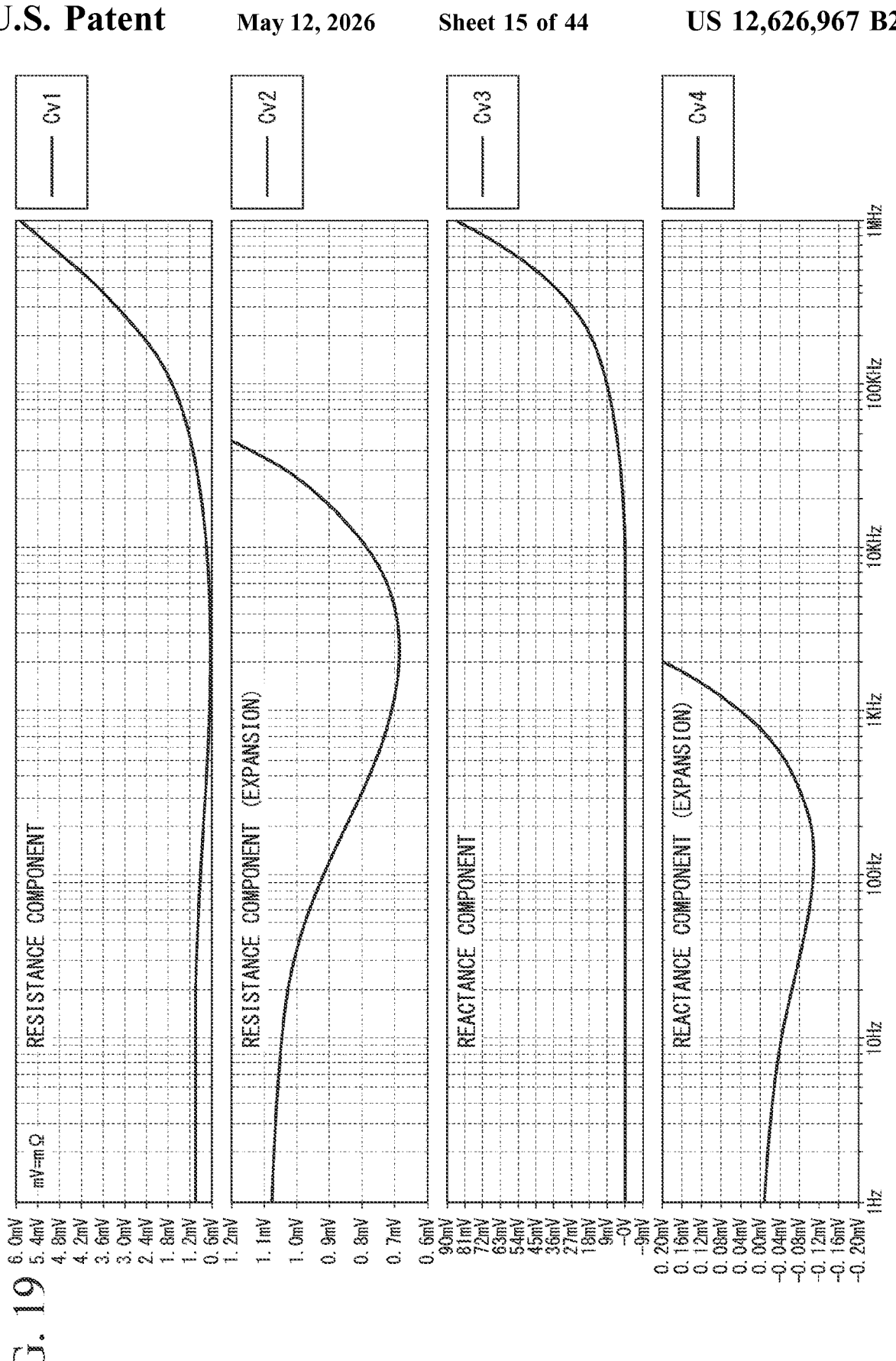
FIG. 19 is a diagram showing an example of frequency characteristics of the impedance of a single cell.

FIG. 19 is a diagram showing an example of frequency characteristics for the impedance of a single cell. In FIG. 19, a characteristic curve Cv1 indicates a resistance component, a characteristic curve Cv2 indicates the expansion of the resistance component, a characteristic curve Cv3 indicates a reactance component, and a characteristic curve Cv4 indicates the expansion of the reactance component.

Figure 20:
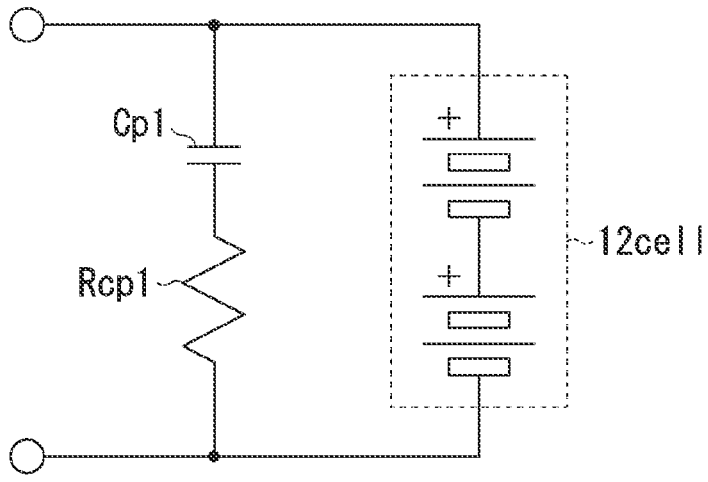
FIG. 20 is a diagram showing a part of an AC equivalent circuit of the second embodiment.
Figure 21:
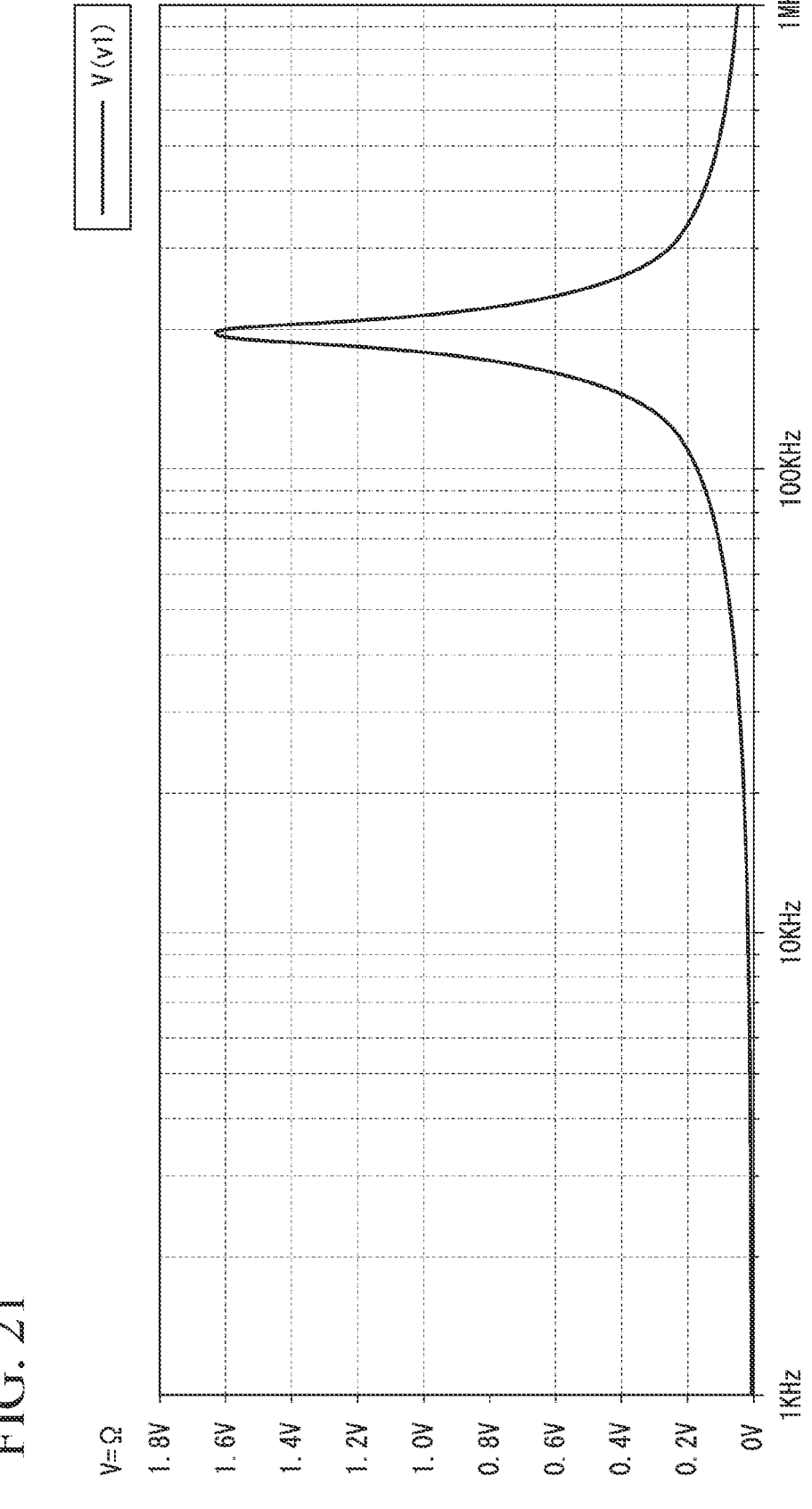
FIG. 21 is a diagram showing an example of impedance characteristics in the part of the AC equivalent circuit of FIG. 20.

FIG. 20 is a diagram showing a part of the AC equivalent circuit of the second embodiment. In relation to circuit constants, for example, it is assumed that the number of cells of the secondary battery is 12, the capacitance of the parallel connection capacitor Cp1 is 3.6 [μF], and the equivalent series resistance Rcp1 of the capacitor is 1 [mΩ]. FIG. 21 is a diagram showing an example of impedance characteristics in a part of the AC equivalent circuit of FIG. 20. There is a resonance point around 200 [KHz] and the impedance is maximized.

Figure 22:
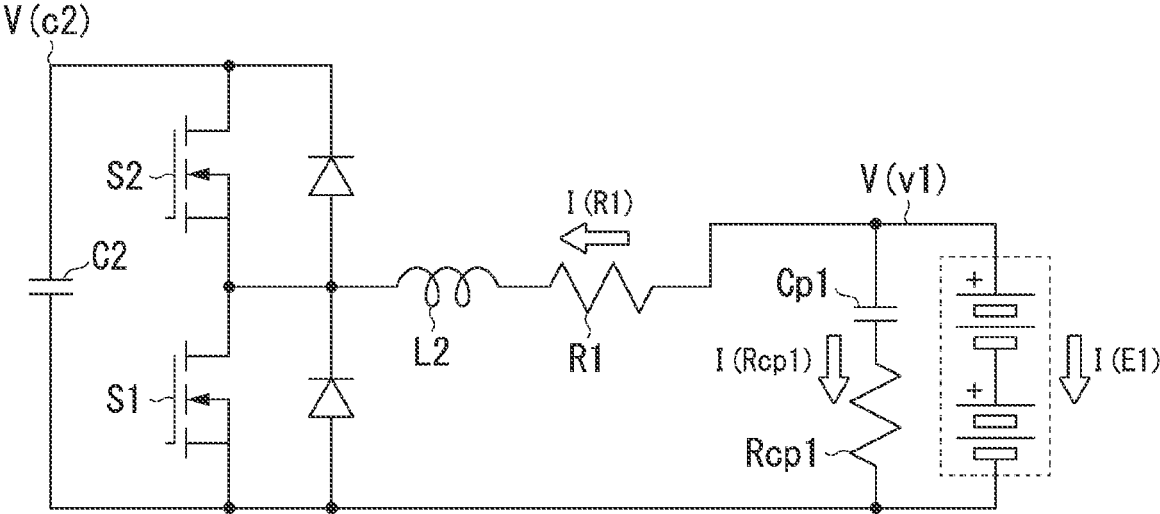
FIG. 22 is a diagram showing an example of an AC equivalent circuit of the second embodiment.

FIG. 22 is a diagram showing an example of an AC equivalent circuit according to the second embodiment. In relation to circuit constants, for example, it is assumed that the number of cells of the secondary battery is 12, the battery voltage is 3.7×12=44.4 [V], the capacitance of the parallel connection capacitor Cp1 is 3.6 [μF], the equivalent series resistance Rcp1 of the capacitor is 1 [mΩ], the resistance of the resistor R1 is 0.1 [Ω], the inductance of the coil L2 is 3 [H], the capacitance of the capacitor C2 is 1 [μF], the switching frequency is 200 [KHz], and the duty ratio of switching is 50%.

Figure 23:
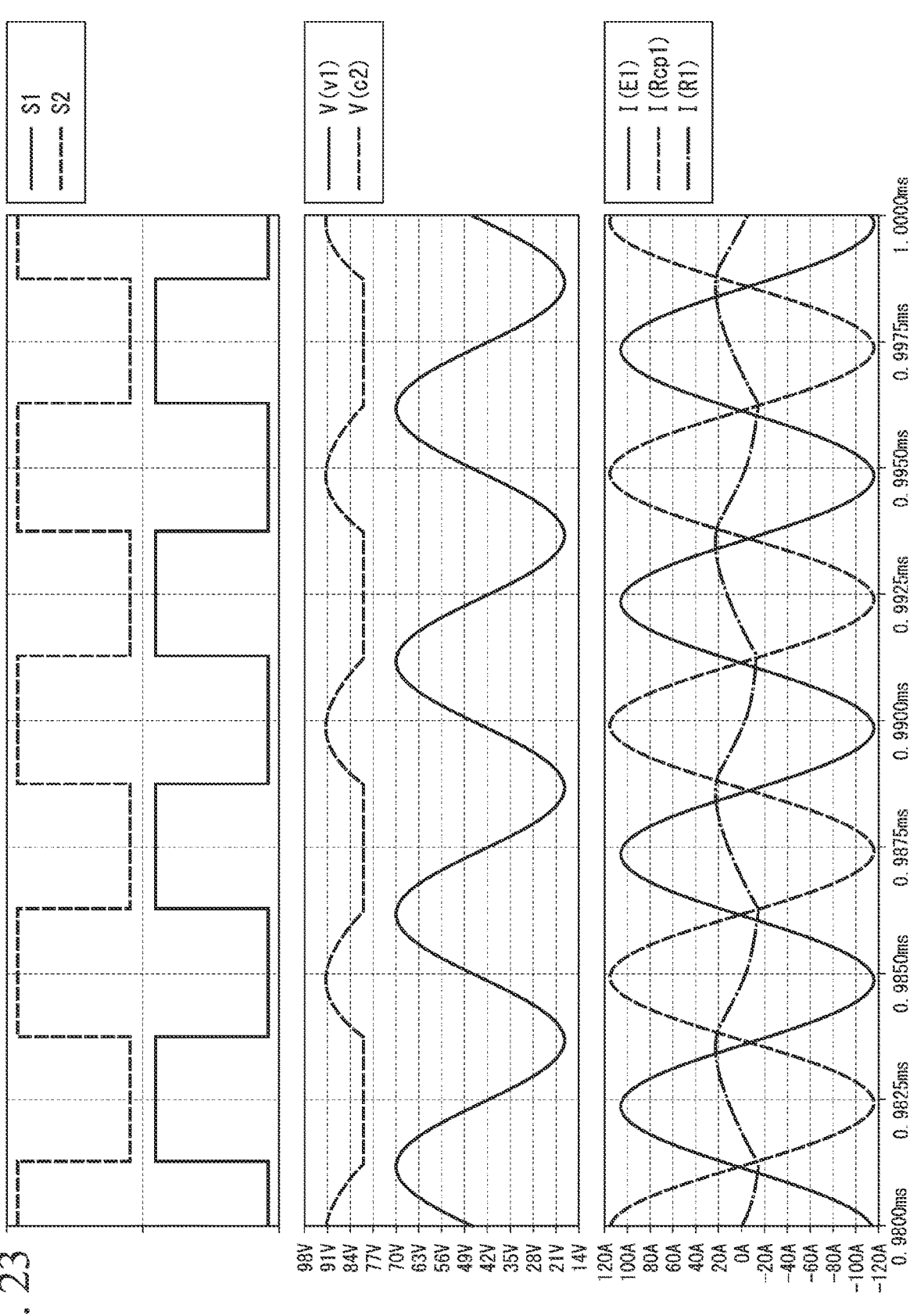
FIG. 23 is a diagram showing switching timings, voltage changes, and current changes.

FIG. 23 is a diagram showing switching timings, voltage changes, and current changes. The current I(R1) of the generation circuit 65 configured to generate the ripple current has an amplitude of a fraction of the battery current I(E1). Accordingly, heat generation by the switching elements S1 and S2 provided in the generation circuit 65 can be suppressed. Although the current I(E1) flows back and forth between the capacitor Cp1 and the secondary battery connected in parallel, the configuration can be simplified because the switching element is not included in this current path.

Figure 24:
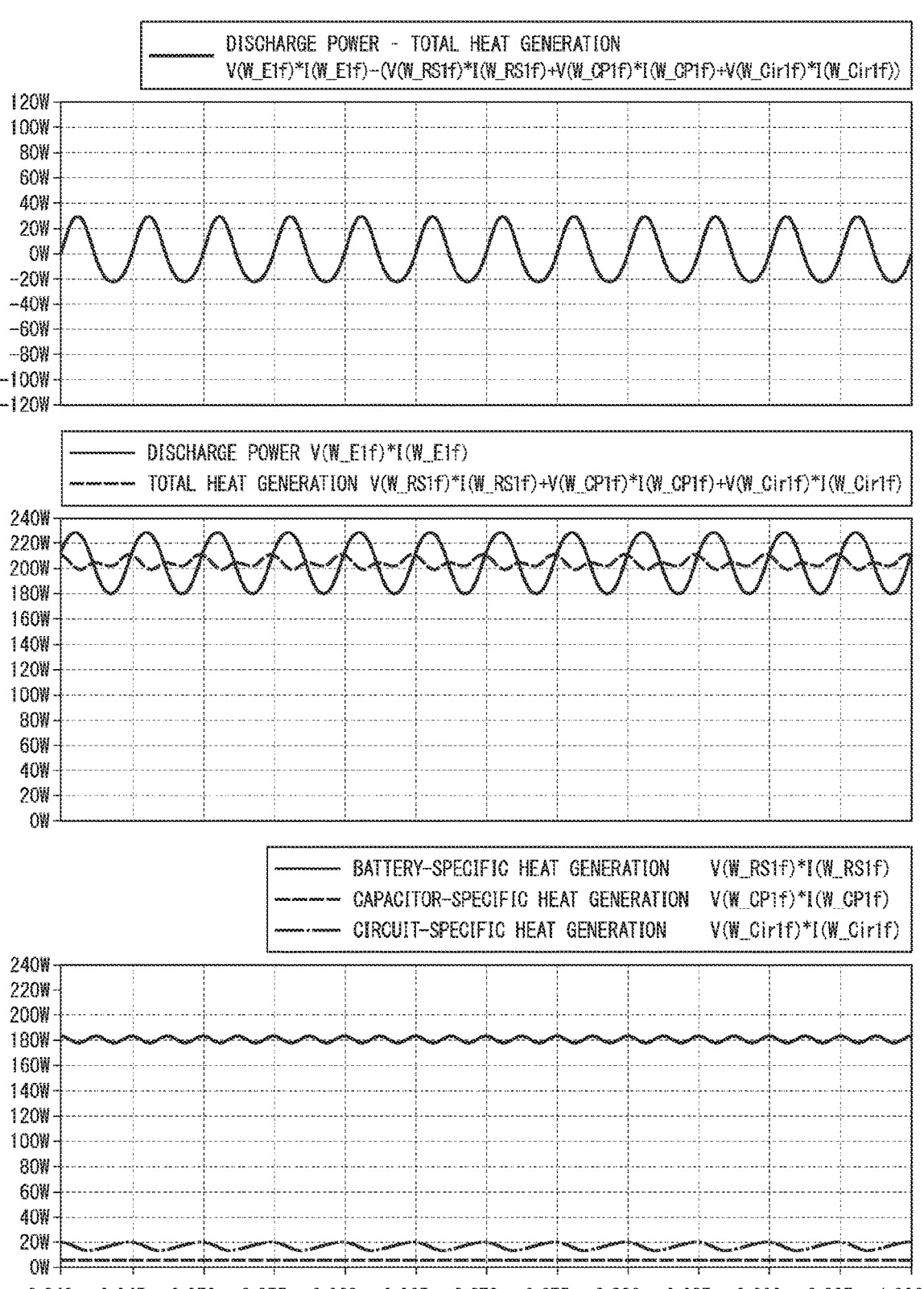
FIG. 24 is a diagram showing discharge power and heat generation work of each part after passing through a low-pass filter (LPF) of, for example, 1 [kHz].

FIG. 24 is a diagram showing discharge power and heat generation work of each part after passing through an LPF of, for example, 1 [kHz]. The lower drawing of FIG. 24 shows battery-specific heat generation, capacitor-specific heat generation, and circuit-specific heat generation. The vertical axis represents power [W] and the horizontal axis represents time [ms]. A sum of the battery-specific heat generation, the capacitor-specific heat generation, and the circuit-specific heat generation is "total heat generation." The middle diagram of FIG. 24 shows discharge power and total heat generation. The upper drawing of FIG. 24 is obtained by subtracting the total heat generation from the discharge power. According to the law of conservation of energy, total heat generation work of the constituent elements (the secondary battery, the parallel connection capacitor, and the ripple current generation circuit) and electric power that is supplied when the secondary battery is discharged have equal values on average.

Figure 25:
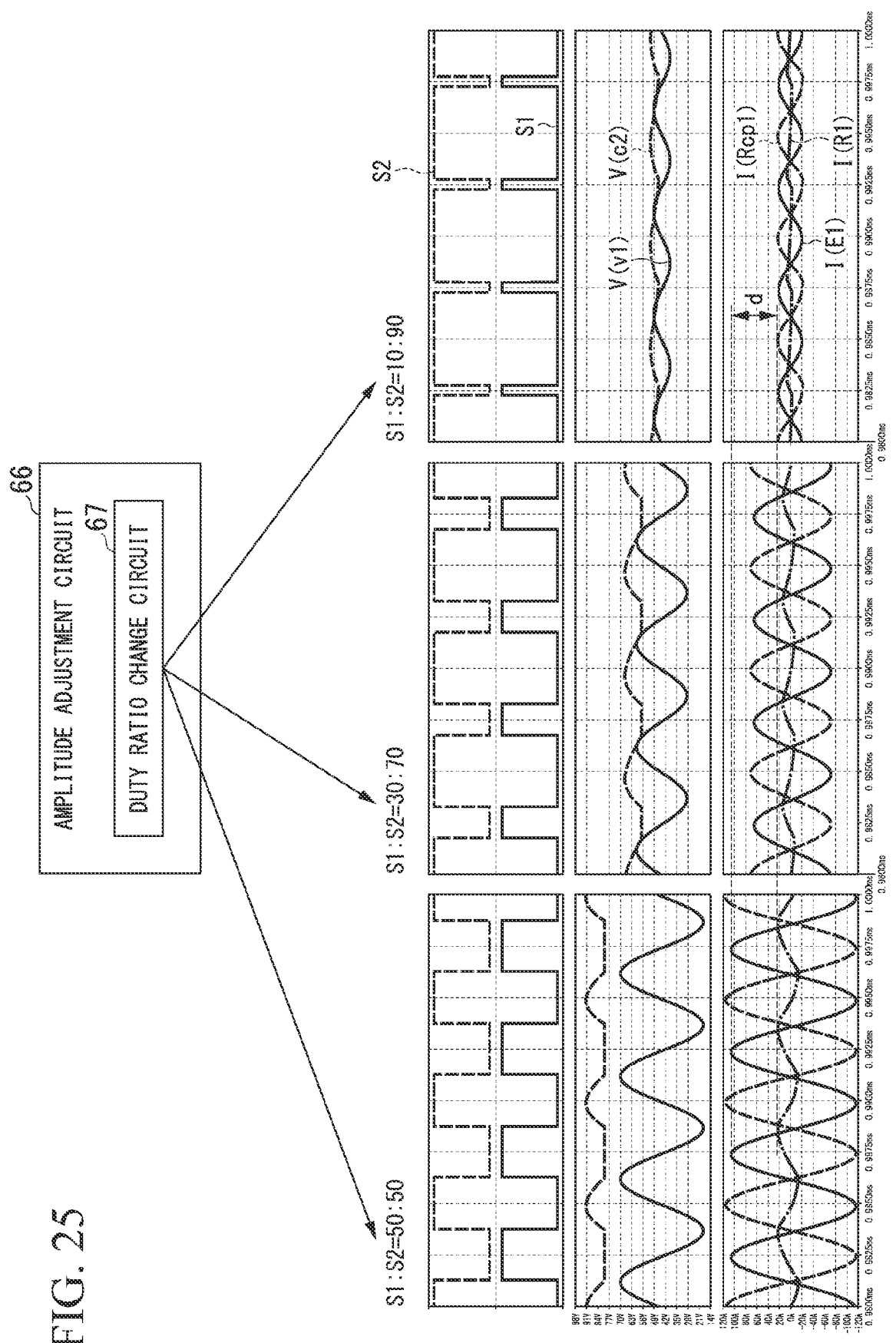
FIG. 25 is a diagram for describing an amplitude adjustment based on a duty ratio.
Figure 26:
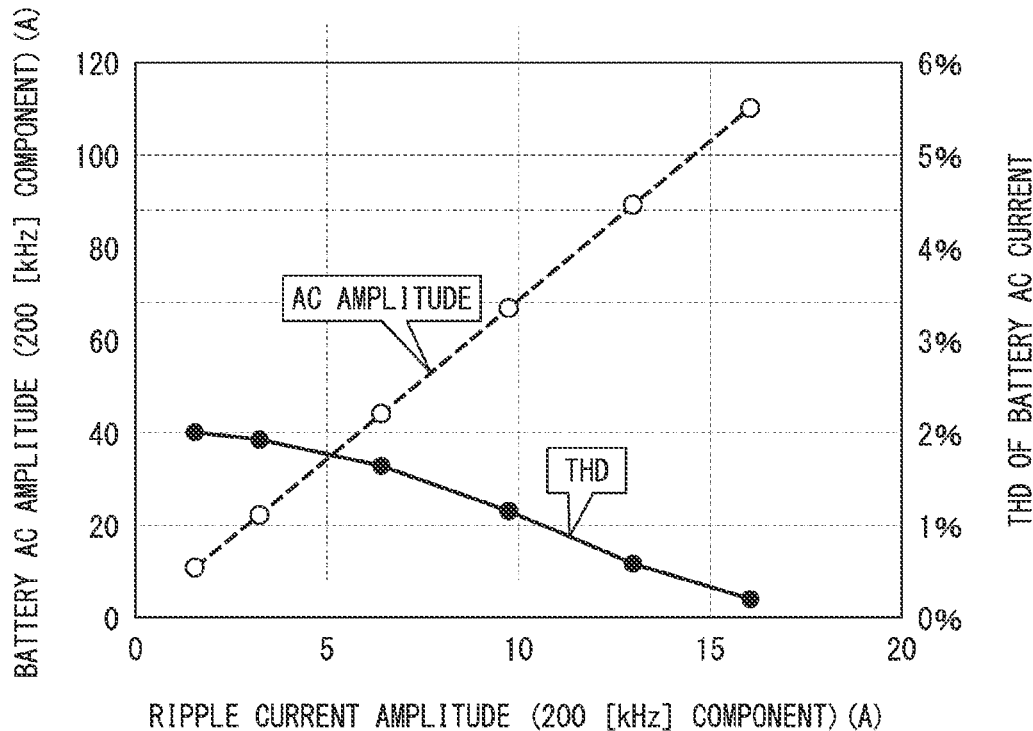
FIG. 26 is a characteristic diagram showing a ripple current amplitude, a battery AC amplitude, and total harmonic distortion (THD) of a battery AC current.
Figure 27:
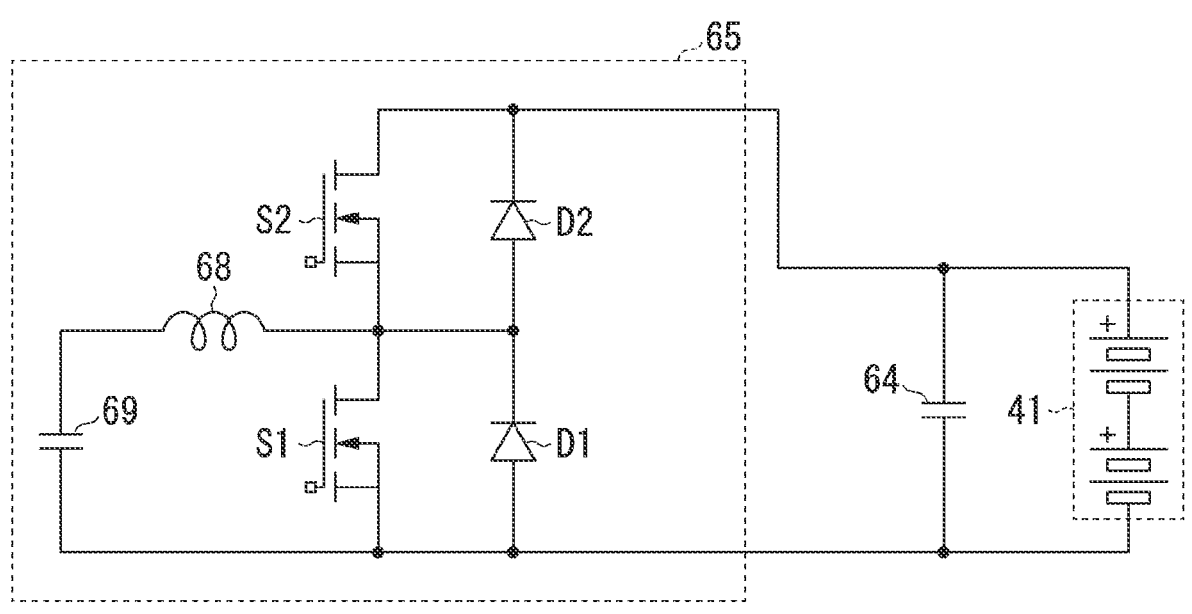
FIG. 27 is a diagram showing various modified examples of a ripple current generation circuit.
Figure 28:
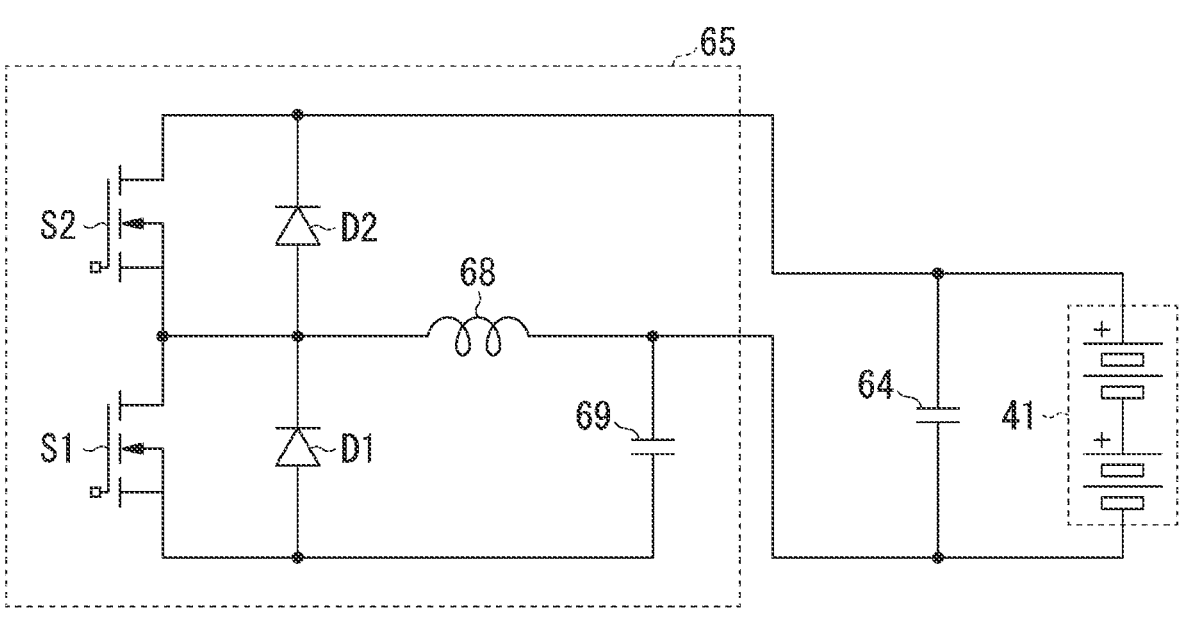
FIG. 28 is a diagram showing various modified examples of the ripple current generation circuit.
Figure 29:
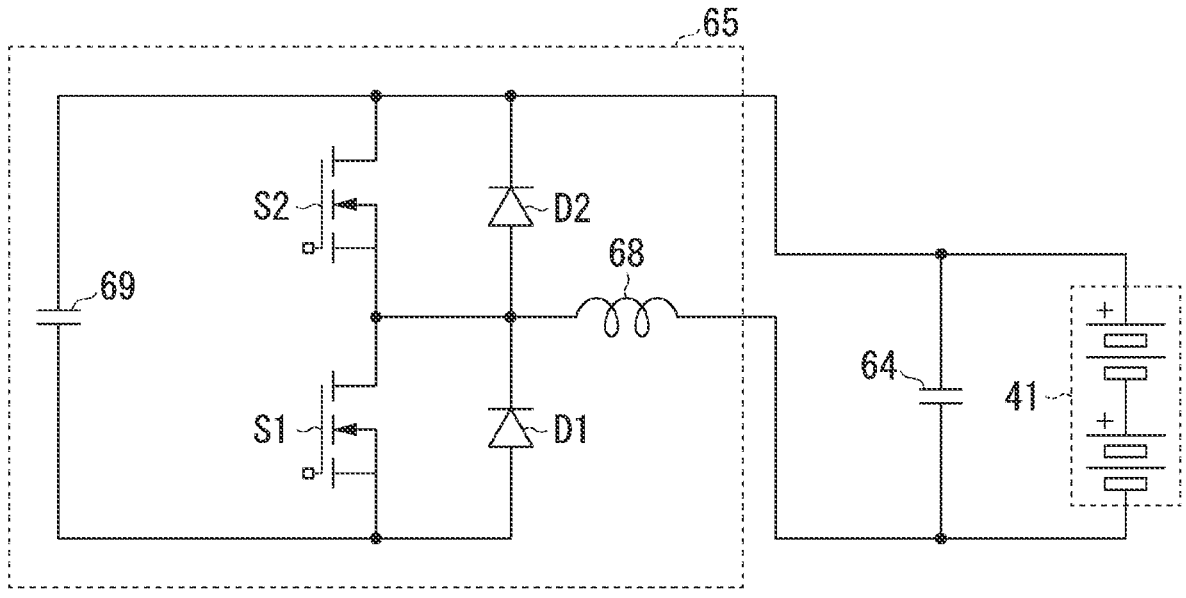
FIG. 29 is a diagram showing various modified examples of the ripple current generation circuit.
Figure 30:
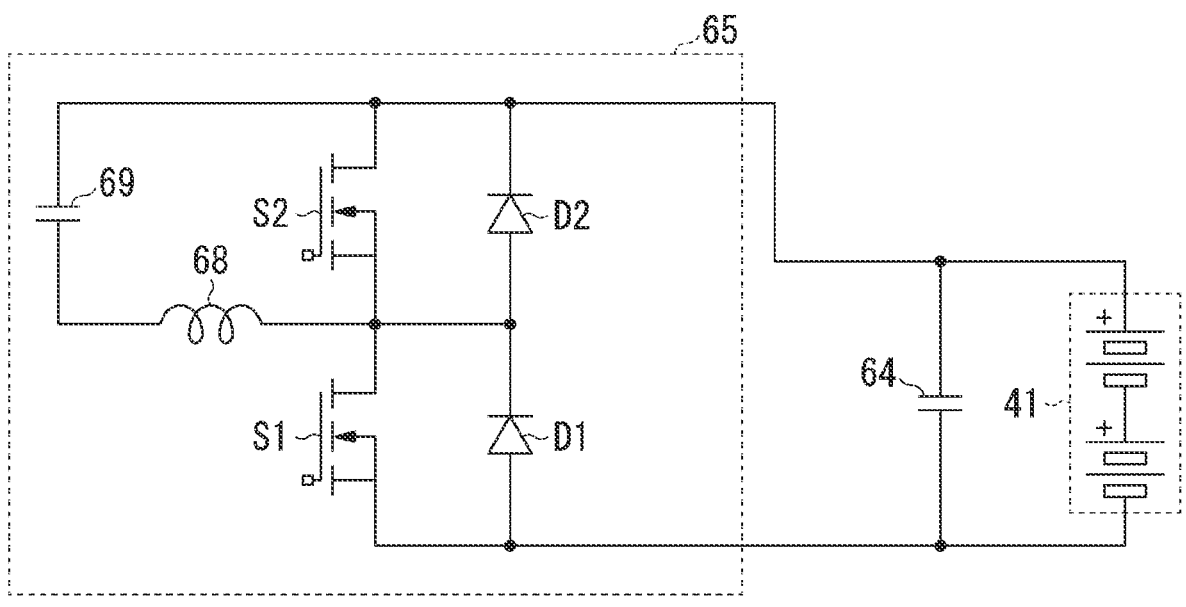
FIG. 30 is a diagram showing various modified examples of the ripple current generation circuit.
Figure 31:
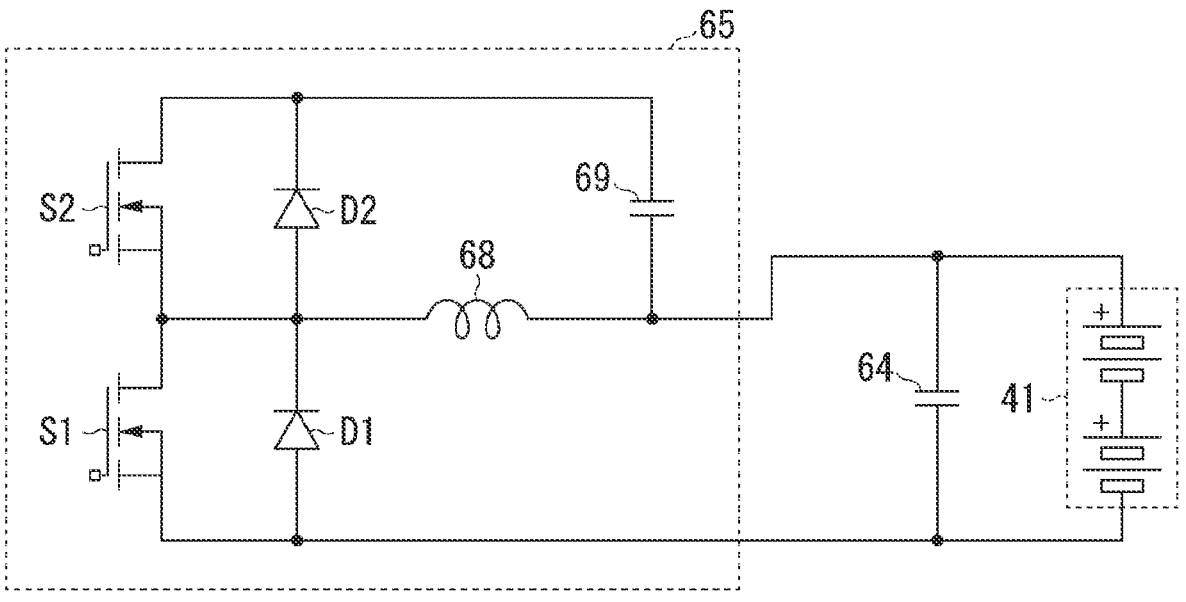
FIG. 31 is a diagram showing various modified examples of the ripple current generation circuit.

FIG. 25 is a diagram for showing an amplitude adjustment based on a duty ratio. In the temperature raising device 60 according to the second embodiment, an amplitude adjustment circuit 66 for adjusting the amplitude of the ripple current may be further provided. The amplitude adjustment circuit 66 may include, for example, a change circuit 67 configured to change the duty ratio between the first switching element S1 and the second switching element S2. The left drawing of FIG. 25 shows a case where the change circuit 67 sets the duty ratio between the switching element S1 and the switching element S2 to 50:50, the middle drawing of FIG. 25 shows a case where the change circuit 67 changes the duty ratio between the switching element S1 and the switching element S2 to 30:70, and the lower drawing of FIG. 25 shows a case where the change circuit 67 changes the duty ratio between the switching element S1 and the switching element S2 to 10:90. When the duty ratio is changed from 50:50 to 10:90, the amplitude of the ripple current changes and hence the amplitude of the battery AC current is decreased by d. That is, there is a prescribed relationship between the ripple current and the amplitude of the AC current flowing through the secondary battery. FIG. 26 is a characteristic diagram showing a ripple current amplitude, a battery AC amplitude, and THD of a battery AC current. It can be seen that, because the ripple current contains a number of harmonic components, when a fundamental wave component of the ripple current (200 [KHz] in the present example) and a fundamental wave component of the battery AC component have a proportional relationship as shown in FIG. 26 when they are extracted and compared. For the extraction of the fundamental wave component, it is only necessary to use a Fourier transform process or the like. Thus, the amplitude of the AC current flowing through the secondary battery may be adjusted by adjusting the amplitude of the ripple current.

As shown in FIG. 26, it can be seen that the THD of the battery AC current is approximately 2% or less and the battery AC current is substantially a sinusoidal wave.

FIGS. 27 to 31 are diagrams showing various modified examples of a ripple current generation circuit 65. Differences from the configuration shown in FIG. 18 will be mainly described. In the modified example of FIG. 27, a coil 68 and a capacitor 69 are connected in series and connected in parallel to the switching element S1. In the modified example of FIG. 28, the coil 68 and the capacitor 69 are connected in series and connected in parallel to the rectification element D1 and a connection point between the coil 68 and the capacitor 69 is connected to one end of the capacitor 64. In the modified example of FIG. 29, both terminals of the capacitor 64 are connected in parallel to both terminals of the rectification element D2 via the coil 68. In the modified example of FIG. 30, the coil 68 and the capacitor 69 are connected in series and connected in parallel to the switching element S2. In the modified example of FIG. 31, the coil 68 and the capacitor 69 are connected in series and connected in parallel to the rectification element D2 and a connection point between the coil 68 and the capacitor 69 is connected to one end of the capacitor 64.

Figure 32:
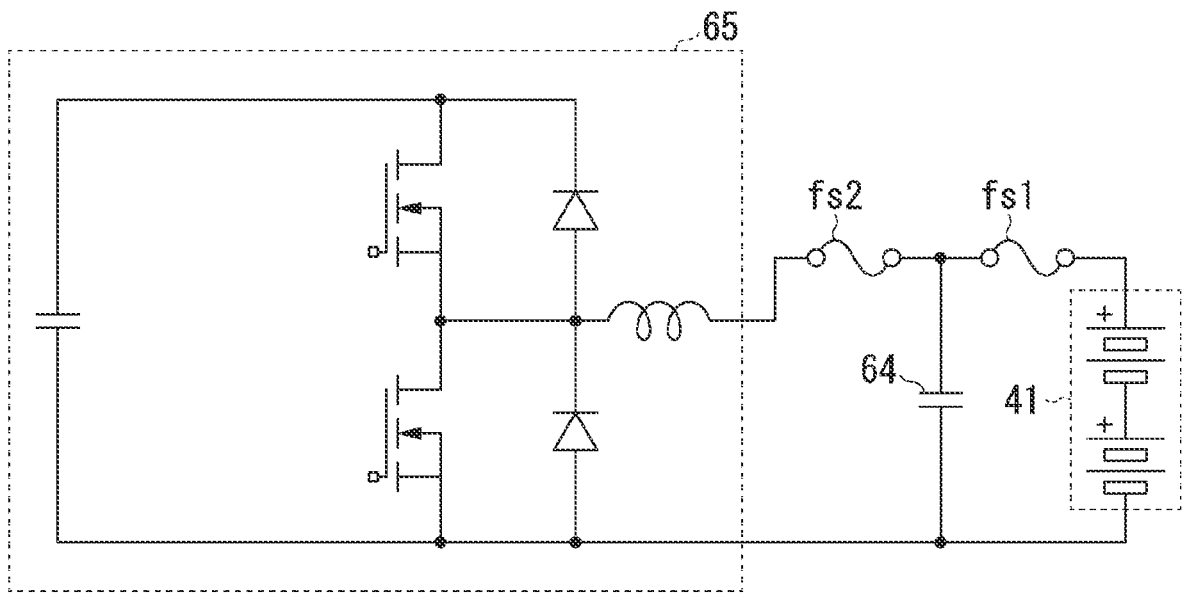
FIG. 32 is a diagram showing a first modified example of the second embodiment.

FIG. 32 is a diagram showing a first modified example of the second embodiment. The first modified example includes, for example, a first current limiting element fs1 connected between the secondary battery 41 and the capacitor 64 and a second current limiting element fs2 between the capacitor 64 and the ripple current generation circuit (AC generation circuit) 65, in the configuration of the second embodiment. In this first modified example, the rated capacity of the first current limiting element fs1 and the rated capacity of the second current limiting element fs2 may be different. Specifically, the rated capacity of the first current limiting element fs1 may be greater than the rated capacity of the second current limiting element fs2. Each of the first current limiting element fs1 and the second current limiting element fs2 may be specifically a fuse or a positive temperature coefficient (PTC) element.

Figure 33:
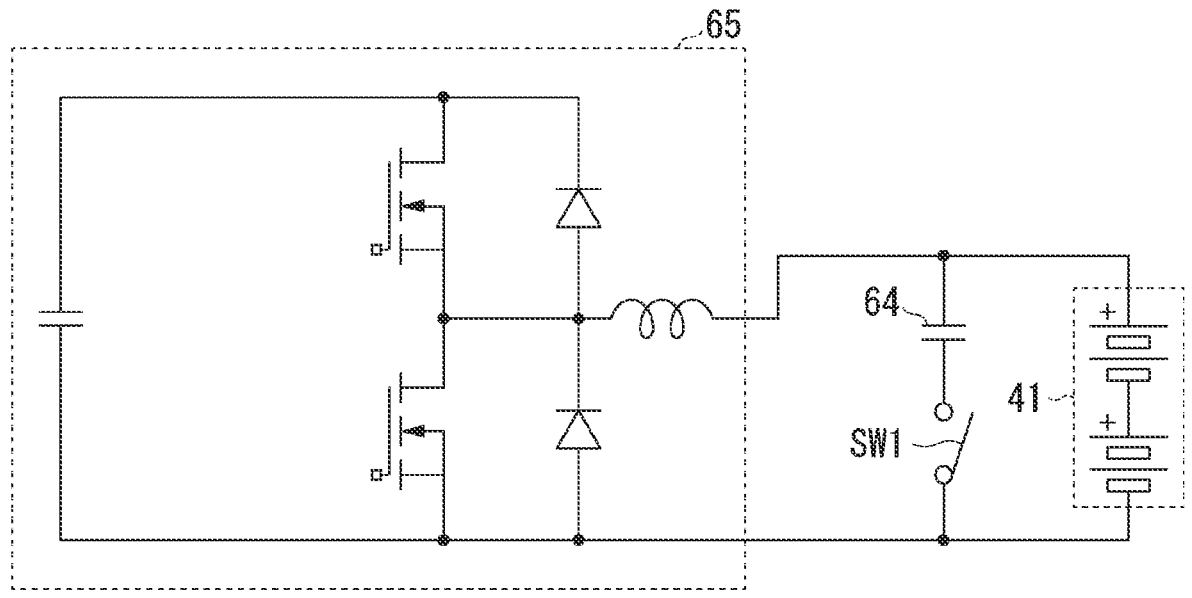
FIG. 33 is a diagram showing a second modified example of the second embodiment.

FIG. 33 is a diagram showing a second modified example of the second embodiment. The second modified example includes, for example, a current cutoff element SW1 connected between a negative terminal of the secondary battery 41 and the capacitor 64, in the configuration of the second embodiment. The current cutoff element SW1 maintains an off state of the current cutoff element SW1 when heating of the secondary battery 41 is unnecessary. According to the second modified example, when heating of the secondary battery 41 is unnecessary, it is possible to prevent an unnecessary resonant current from being generated due to mixing of noise or the like.

Figure 34:
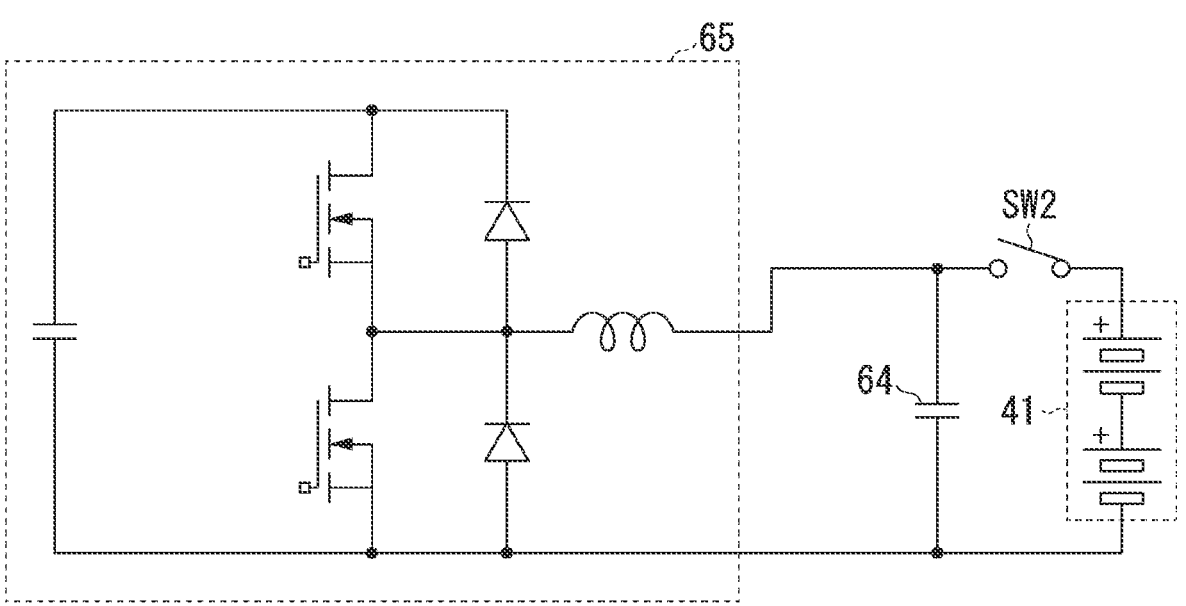
FIG. 34 is a diagram showing a third modified example of the second embodiment.
Figure 35:
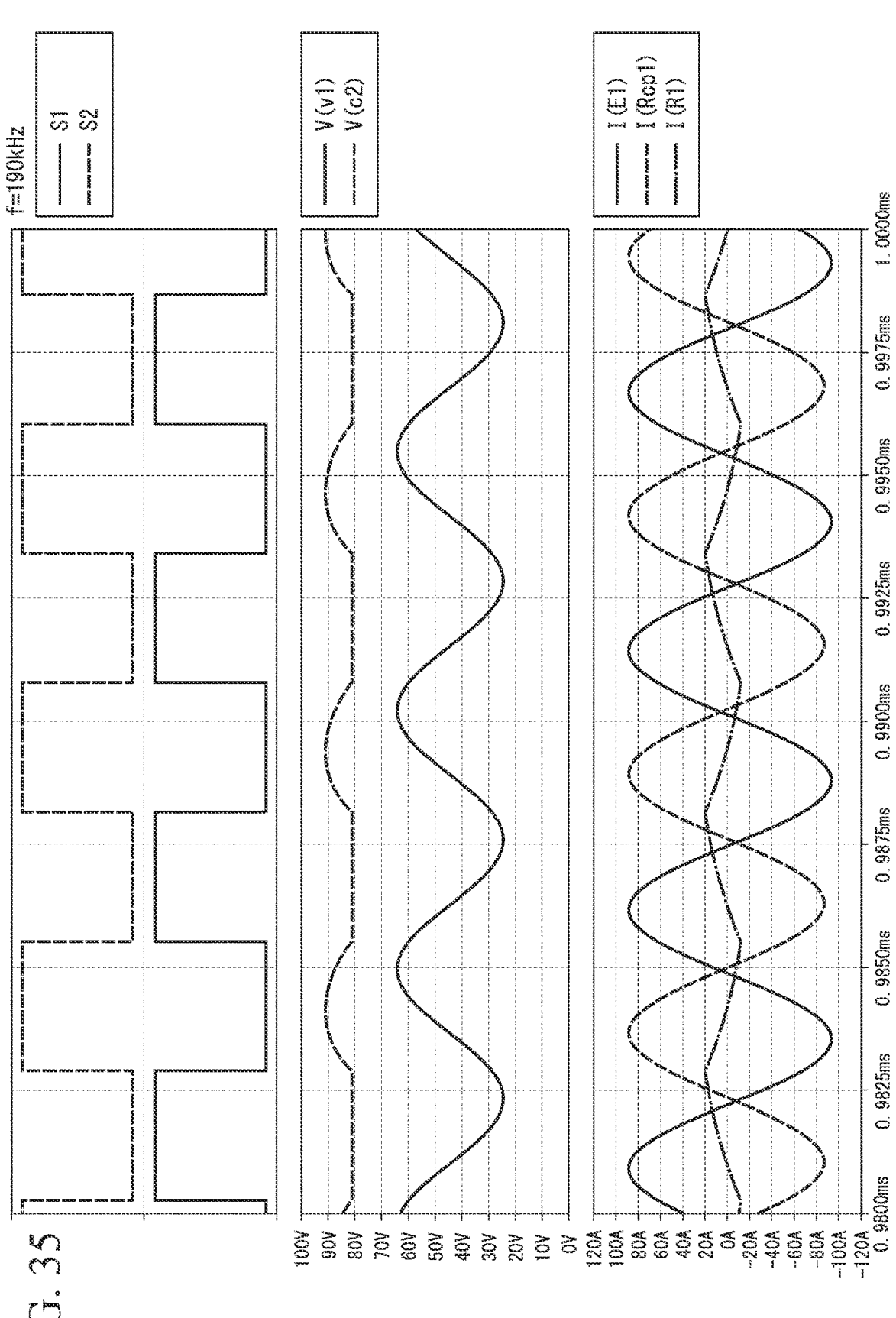
FIG. 35 is a diagram (part 1) for describing an amplitude adjustment based on a frequency of a ripple current.
Figure 36:
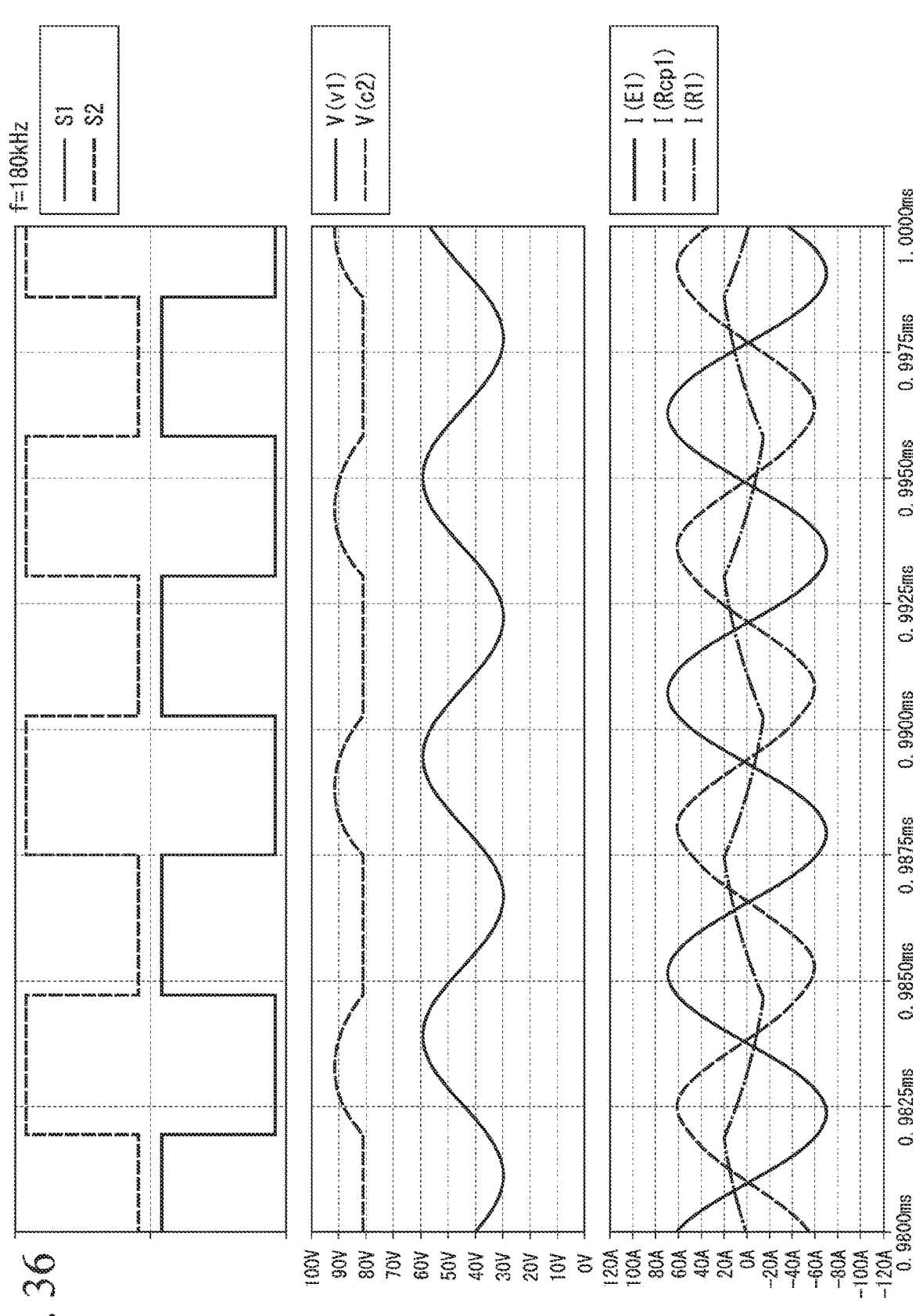
FIG. 36 is a diagram (part 2) for describing an amplitude adjustment based on a frequency of a ripple current.
Figure 37:
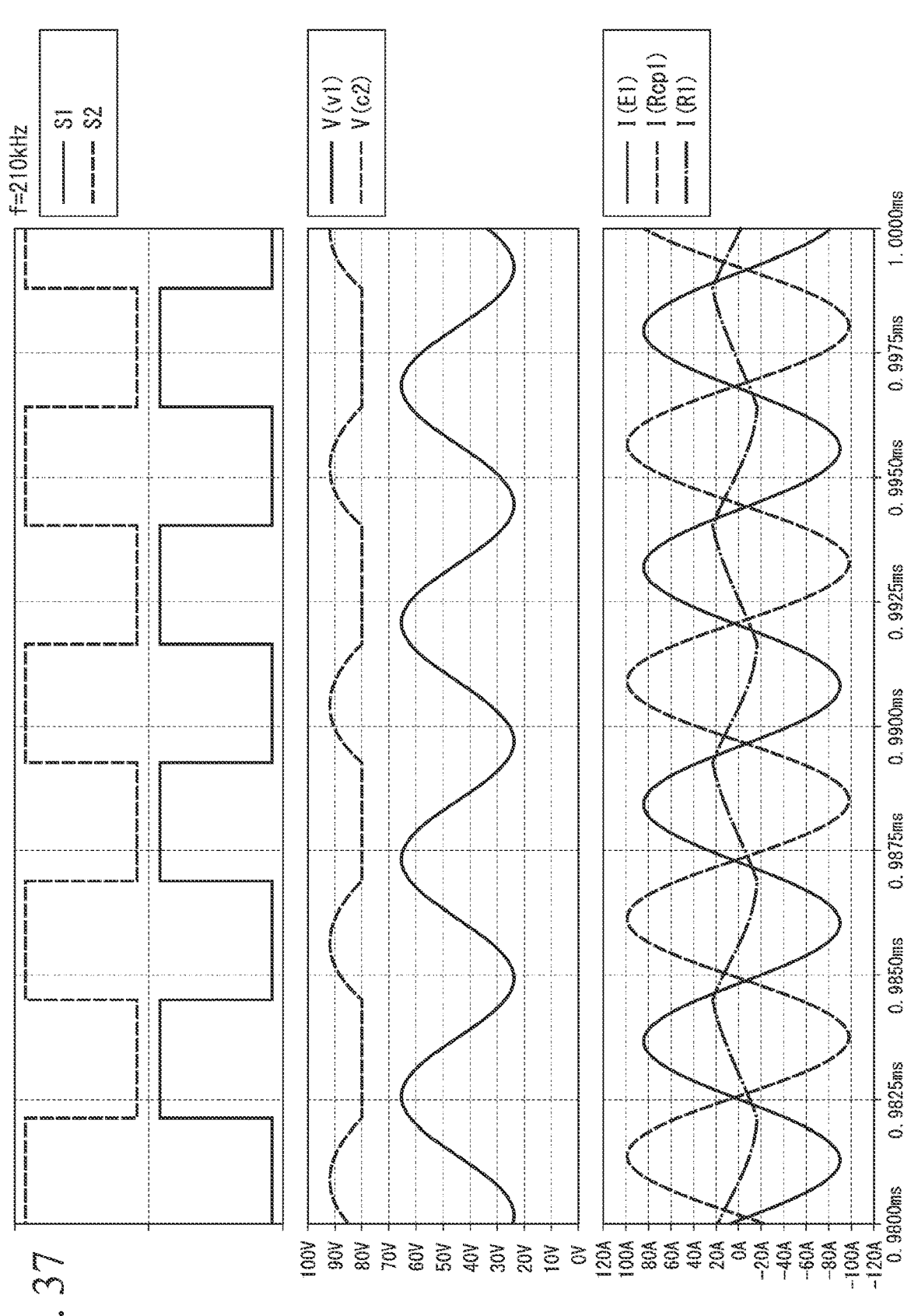
FIG. 37 is a diagram (part 3) for describing an amplitude adjustment based on a frequency of a ripple current.
Figure 38:
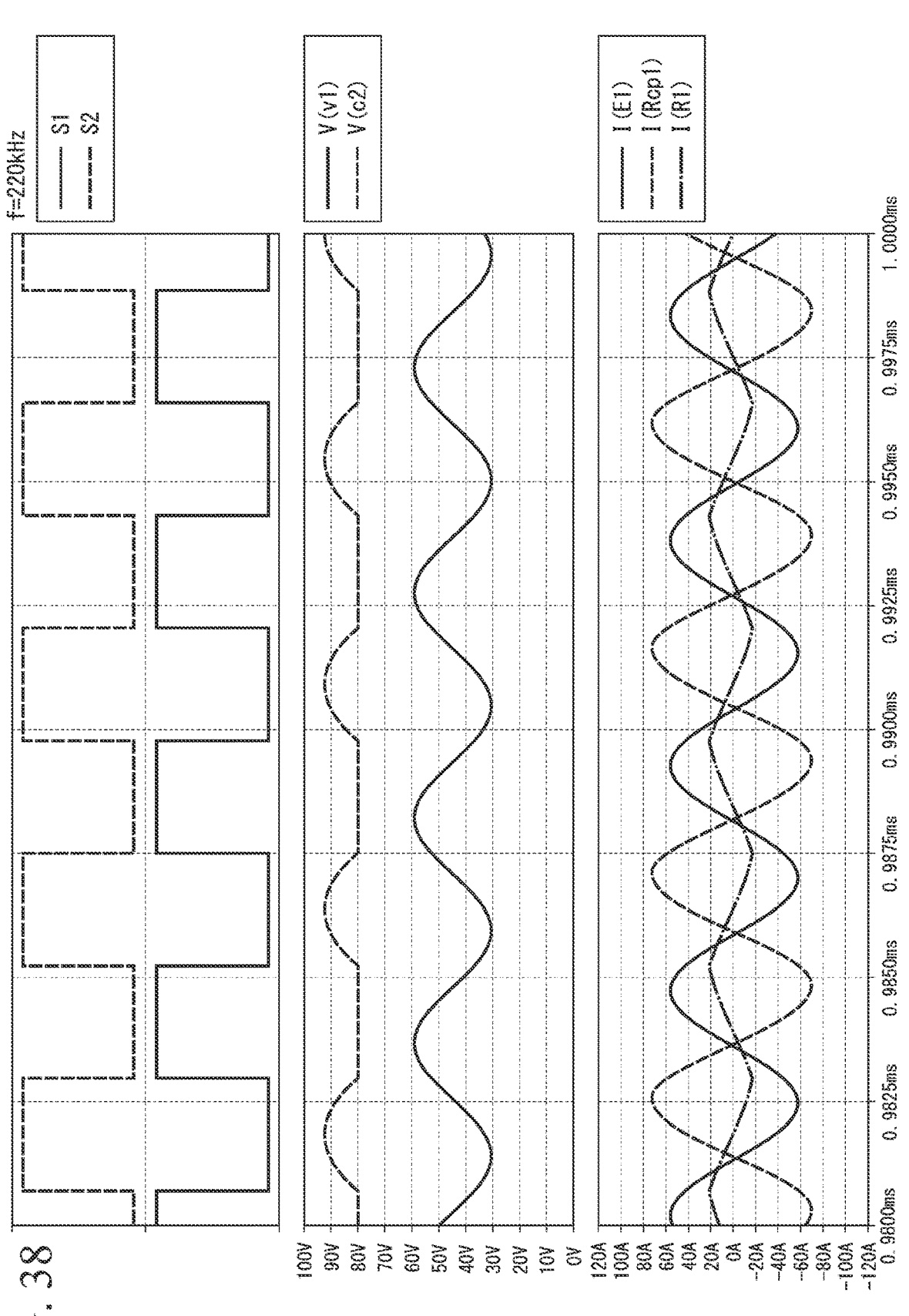
FIG. 38 is a diagram (part 4) for describing an amplitude adjustment based on a frequency of a ripple current.

FIG. 34 is a diagram showing a third modified example of the second embodiment. The third modified example includes, for example, a current cutoff element SW2 connected between the positive terminal of the secondary battery 41 and the capacitor 64, in the configuration of the second embodiment. The current cutoff element SW2 maintains the off state of the current cutoff element SW2 when heating of the secondary battery 41 is unnecessary. According to the third modified example, when heating of the secondary battery 41 is unnecessary, it is possible to prevent an unnecessary resonant current from being generated due to mixing of noise or the like.

Hereinafter, a fourth modified example of the second embodiment will be described. The amplitude adjustment circuit 66 may adjust the amplitude of the ripple current by adjusting the frequency of the ripple current while maintaining the duty ratio at, for example, 50%, without adjusting the amplitude of the ripple current according to the duty ratio. Thereby, the THD of the battery AC current of a case where the amplitude is controlled so that the amplitude is reduced can be reduced.

As a performance requirement of the temperature raising device 60, it is desirable that the current gain (the above-described magnification) be greater than 1. From FIG. 6, $|Y_{LR}|>|Y_{LR}+Y_C|$ is required so that the current gain is greater than 1. That is, when Inequality (43) is satisfied, the current gain becomes greater than 1.

$$\omega C_P < 2\omega \frac{L_S}{R_S^2 + \omega^2 L_S^2} \tag{43}$$

$$R_S^2 + \omega^2 L_S^2 < \frac{2L_s}{C_P}$$

$$\omega^2 < \frac{2L_S}{C_P L_S^2} - \frac{R_S^2}{L_S^2} = \frac{2L_S - C_P R_S^2}{C_P L_S^2}$$

$$\omega < \sqrt{\frac{2L_s - C_P R_S^2}{C_P L_S^2}}$$

Here, when $\omega$ having a current gain of 1 is $\omega_1$, Eq. (44) is established. Because $\omega_0$ having a maximum current gain is represented by Eq. (45) and $\omega_1 = \omega_0 \times \sqrt{2}$, a range of $\omega$ having a current gain greater than 1 is represented by Eq. (46).

$$\omega_1 = \sqrt{\frac{2L_S - C_P R_S^2}{C_P L_S^2}} \tag{44}$$

$$\omega_0 = \sqrt{\frac{2L_S - C_P R_S^2}{2C_P L_S^2}} \tag{45}$$

$$\omega < \omega_1 = \sqrt{\frac{2}{L_S C_P} - \frac{R_S^2}{L_S^2}} = \omega_0 \times \sqrt{2} \tag{46}$$

FIGS. 35 to 38 are diagrams for showing an amplitude adjustment based on a frequency of a ripple current. These drawings show the waveforms of parts at each frequency when the frequency of the ripple current is changed while maintaining the duty ratio at 50% with respect to FIG. 23 with the frequency of the ripple current set to 200 [kHz]. By changing the frequency upward or downward from 200 [KHz], it can be seen that the amplitude of the battery AC current is suppressed.

Figure 39:
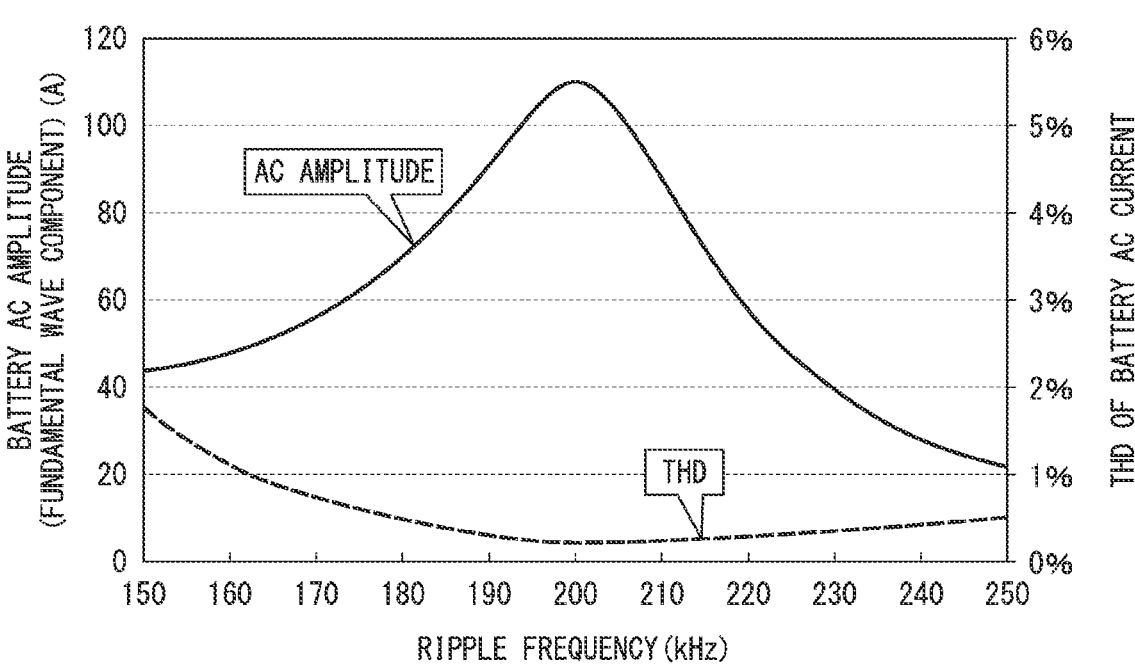
FIG. 39 is a diagram showing an amplitude of a battery AC current and THD of the battery AC current when the frequency of the ripple current is changed while the duty ratio is kept at 50%.
Figure 40:
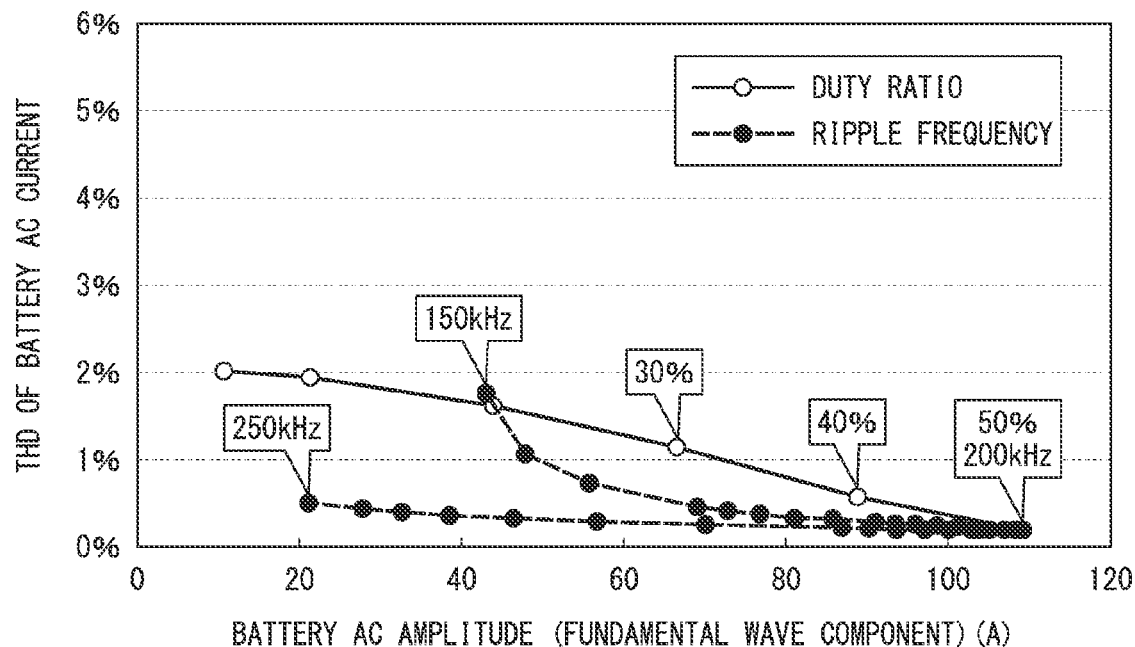
FIG. 40 is a diagram for comparing THDs of battery AC currents between a case where the amplitude of the battery AC current is adjusted by the duty ratio and a case where the amplitude of the battery AC current is adjusted by the ripple frequency.
Figure 41:
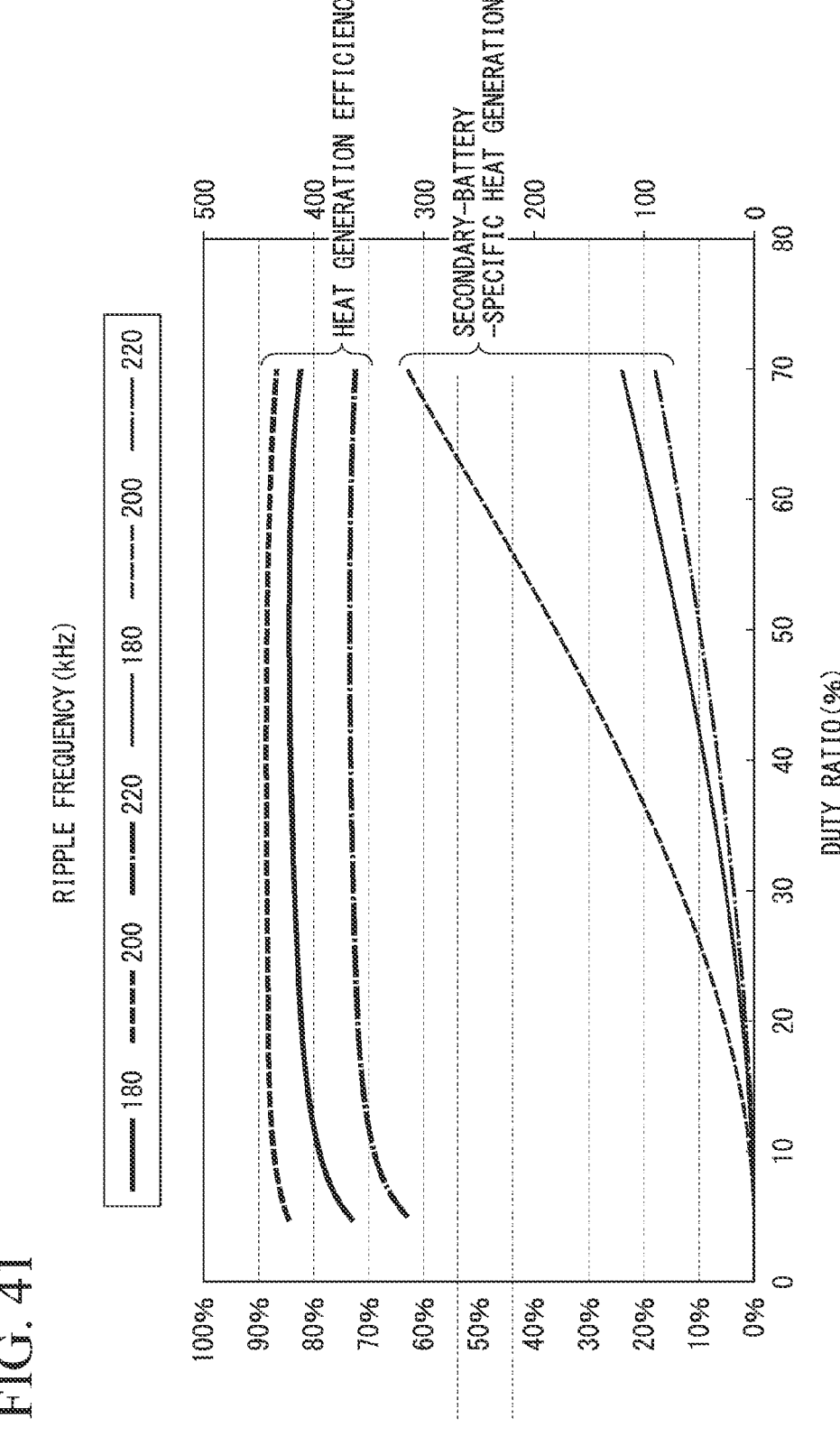
FIG. 41 is a diagram showing an example of characteristics of heat generation efficiency and heat generation of the secondary battery when the duty ratio is adjusted to adjust the amplitude of the AC current flowing through the secondary battery.

FIG. 39 is a diagram showing the amplitude of the battery AC current and the THD of the battery AC current when the frequency of the ripple current is changed while the duty ratio is kept at 50%. Also, FIG. 40 is a diagram for comparing THDs of battery AC currents between a case where the amplitude of the battery AC current is adjusted by the duty ratio and a case where the amplitude of the battery AC current is adjusted by the ripple frequency. It can be seen that the THD of the battery AC current can be further reduced by adjusting the amplitude of the battery AC current by the ripple frequency than adjusting the amplitude of the battery AC current by the duty ratio. Further, FIG. 41 is a diagram showing an example of characteristics of the heat generation efficiency and the heat generation of the secondary battery when the amplitude of the alternating current flowing through the secondary battery is adjusted by adjusting the duty ratio. The heat generation efficiency is a ratio of the heat generation of the secondary battery to the discharge power of the secondary battery. By adjusting the duty ratio, the heat generation of the secondary battery is adjusted and the change in heat generation efficiency becomes small. At the ripple frequency close to the resonance frequency, the heat generation efficiency is high and the heat generation of the secondary battery is also large. When the ripple frequency is away from the resonance frequency, both the heat generation efficiency and the heat generation of the secondary battery decrease. However, even if the ripple frequency is away from the resonance frequency, the change in heat generation efficiency due to the adjustment of the duty ratio is small.

Third Embodiment

Figure 42:
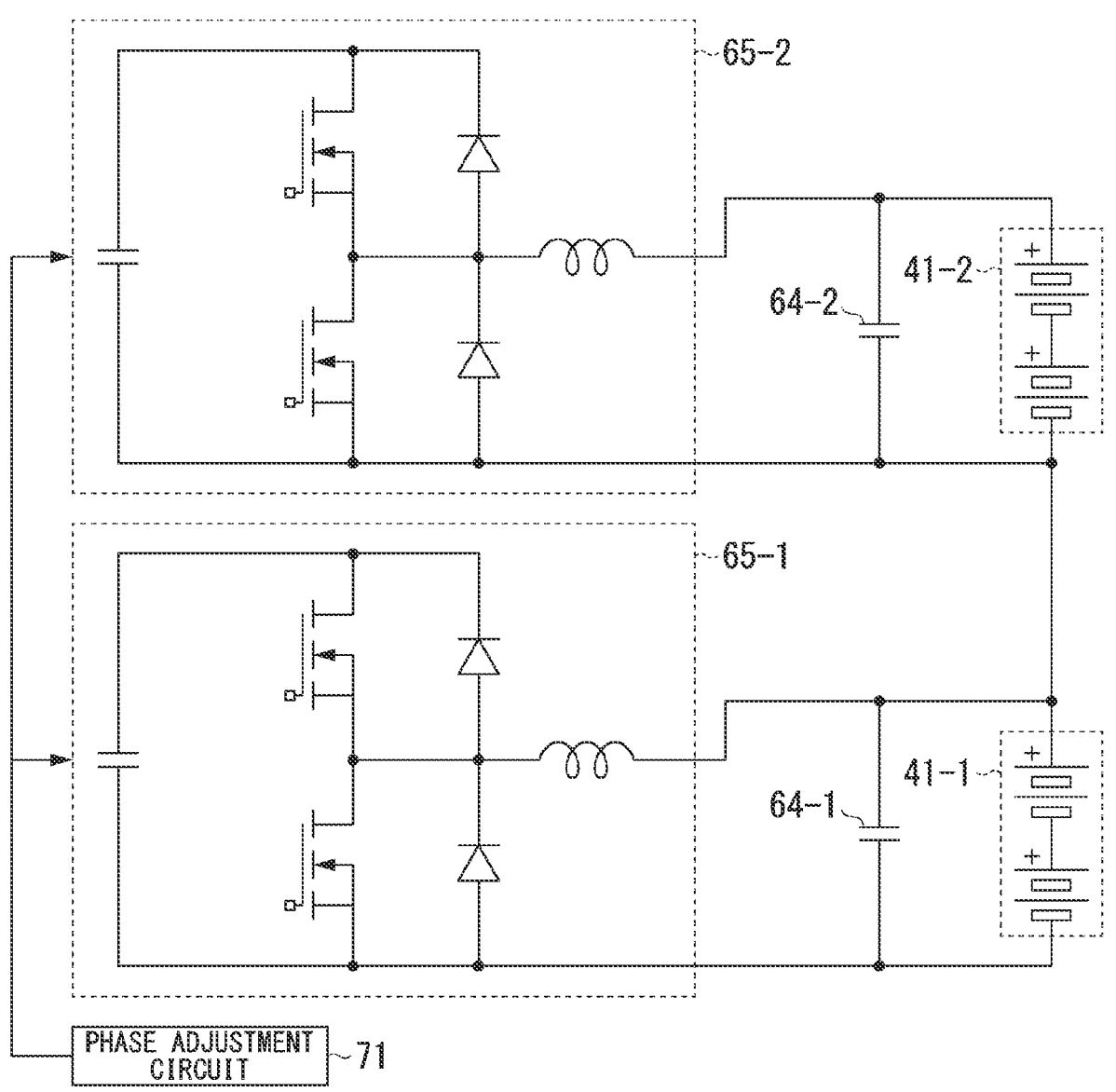
FIG. 42 is a diagram showing an example of a configuration of a third embodiment.

In a third embodiment, differences from the second embodiment will be mainly described. FIG. 42 is a diagram showing an example of a configuration of the third embodiment. The secondary battery according to the third embodiment includes, for example, a first battery 41-1 and a second battery 41-2 connected in series with the first battery 41-1. The capacitor according to the third embodiment includes, for example, a first capacitor 64-1 connected in parallel to the first battery 41-1 and a second capacitor 64-2 connected in parallel to the second battery 41-2. The AC generation circuit according to the third embodiment includes, for example, a first generation circuit 65-1 connected to a first parallel circuit including the first battery 41-1 and the first capacitor 64-1 and configured to generate a first ripple current and a second generation circuit 65-2 connected to a second parallel circuit including the second battery 41-2 and the second capacitor 64-2 and configured to generate a second ripple current. Also, the configuration of the third embodiment includes a phase adjustment circuit 71 configured to provide a phase difference between the first ripple current and the second ripple current.

When two battery modules (41-1 and 41-2) are connected in series as in the example of FIG. 42, the phase adjustment circuit 71 provides, for example, a phase difference of 180 degrees between the first ripple current from the first generation circuit 65-1 and the second ripple current from the second generation circuit 65-2.

Figure 43:
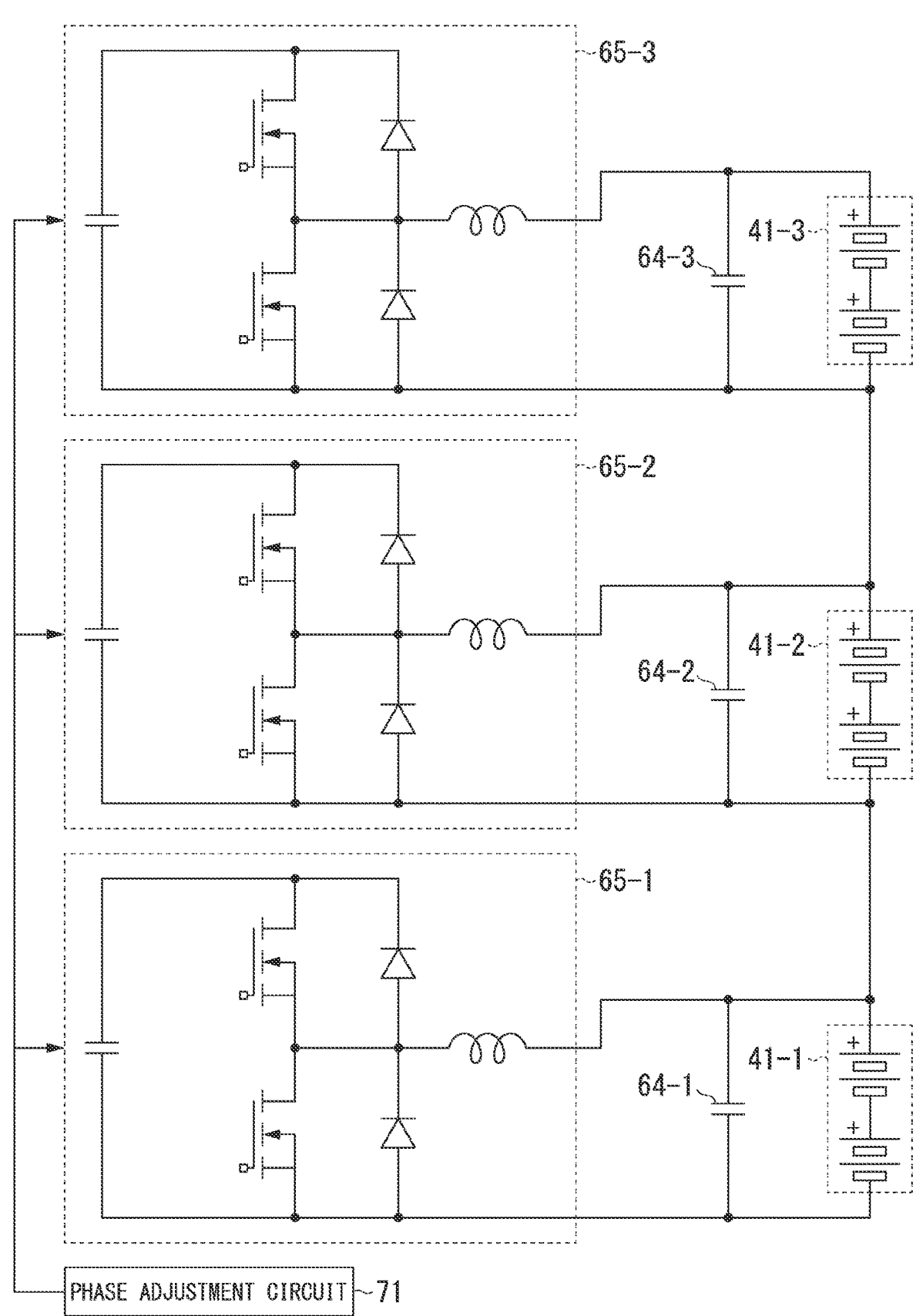
FIG. 43 is a diagram showing another example of the configuration of the third embodiment.

FIG. 43 is a diagram showing another example of the configuration of the third embodiment. A secondary battery according to the other example of the third embodiment includes, for example, a first battery 41-1, a second battery 41-2 connected in series with the first battery 41-1, and a third battery 41-3 connected in series with the second battery 41-2. The capacitor according to the third embodiment includes, for example, a first capacitor 64-1 connected in parallel to the first battery 41-1, a second capacitor 64-2 connected in parallel to the second battery 41-2, and a third capacitor 64-3 connected in parallel to the third battery 41-3. The AC generation circuit according to the third embodiment includes, for example, a first generation circuit 65-1 connected to a first parallel circuit including the first battery 41-1 and the first capacitor 64-1 and configured to generate a first ripple current, a second generation circuit 65-2 connected to a second parallel circuit including the second battery 41-2 and the second capacitor 64-2 and configured to generate a second ripple current, and a third generation circuit 65-3 connected to a third parallel circuit including the third battery 41-3 and the third capacitor 64-3 and configured to generate a third ripple current. In the configuration of the third embodiment, the phase adjustment circuit 71 provides phase differences between the first ripple current, the second ripple current, and the third ripple current.

When three battery modules (41-1, 41-2, and 41-3) are connected in series as in the example of FIG. 43, the phase adjustment circuit 71 provides, for example, phase differences of 120 degrees between the first ripple current from the first generation circuit 65-1, the second ripple current from the second generation circuit 65-2, and the third ripple current from the third generation circuit 65-3.

According to the third embodiment, in relation to an assembled battery in which a plurality of battery modules (41-1, 41-2, and the like) are connected in series, capacitors (64-1, 64-2, and the like) and ripple current generation circuits (65-1, 65-2, and the like) are connected in parallel to the battery modules and the phase adjustment circuit 71 adjusts phases of a plurality of ripple currents, such that the voltage fluctuation of the entire assembled battery can be suppressed.

Figure 44:
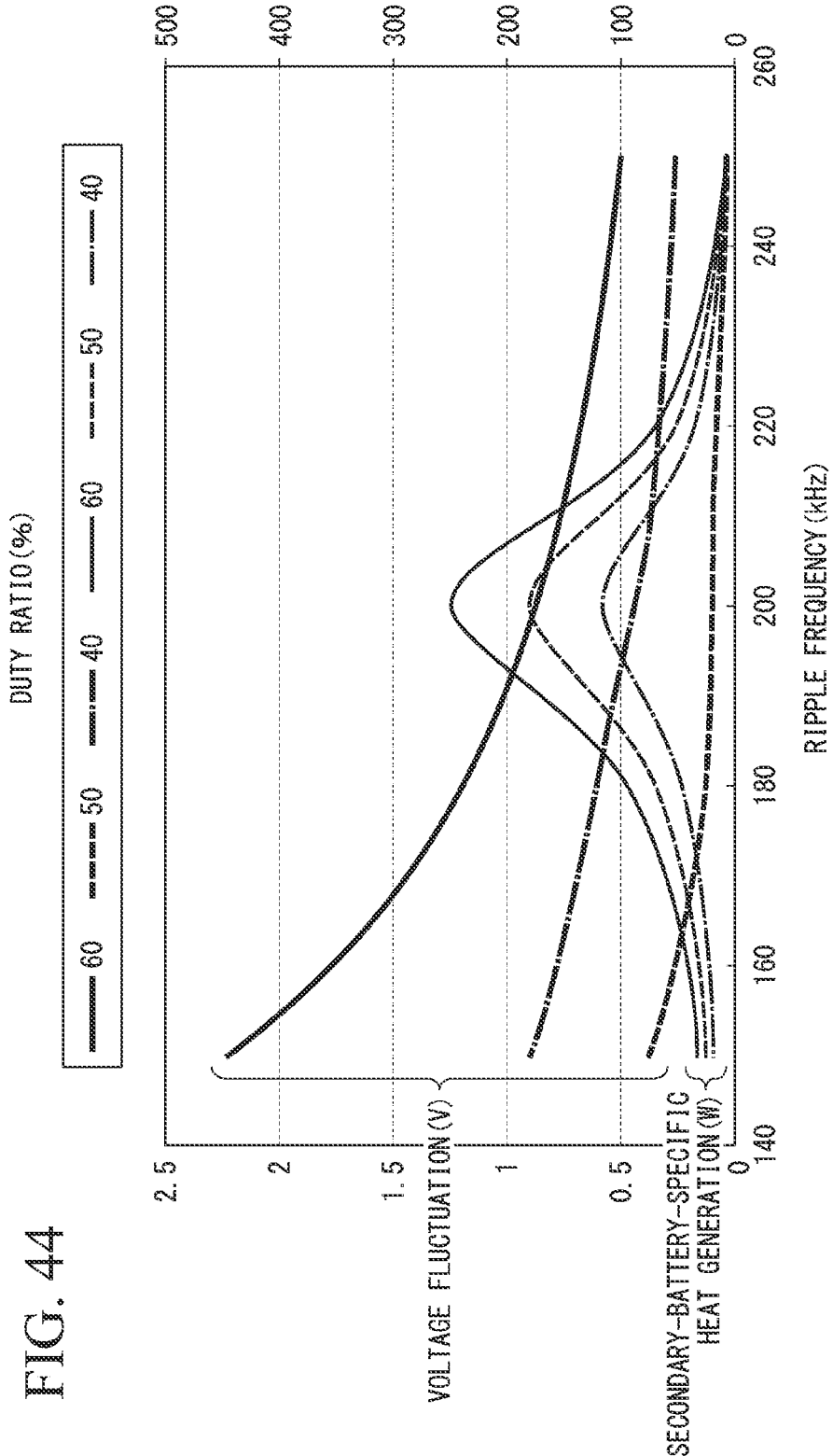
FIG. 44 is a diagram showing an example of characteristics of voltage fluctuation of the entire battery and heat generation of the secondary battery when the amplitude of the AC current flowing through the secondary battery is adjusted by adjusting a ripple frequency.
Figure 45:
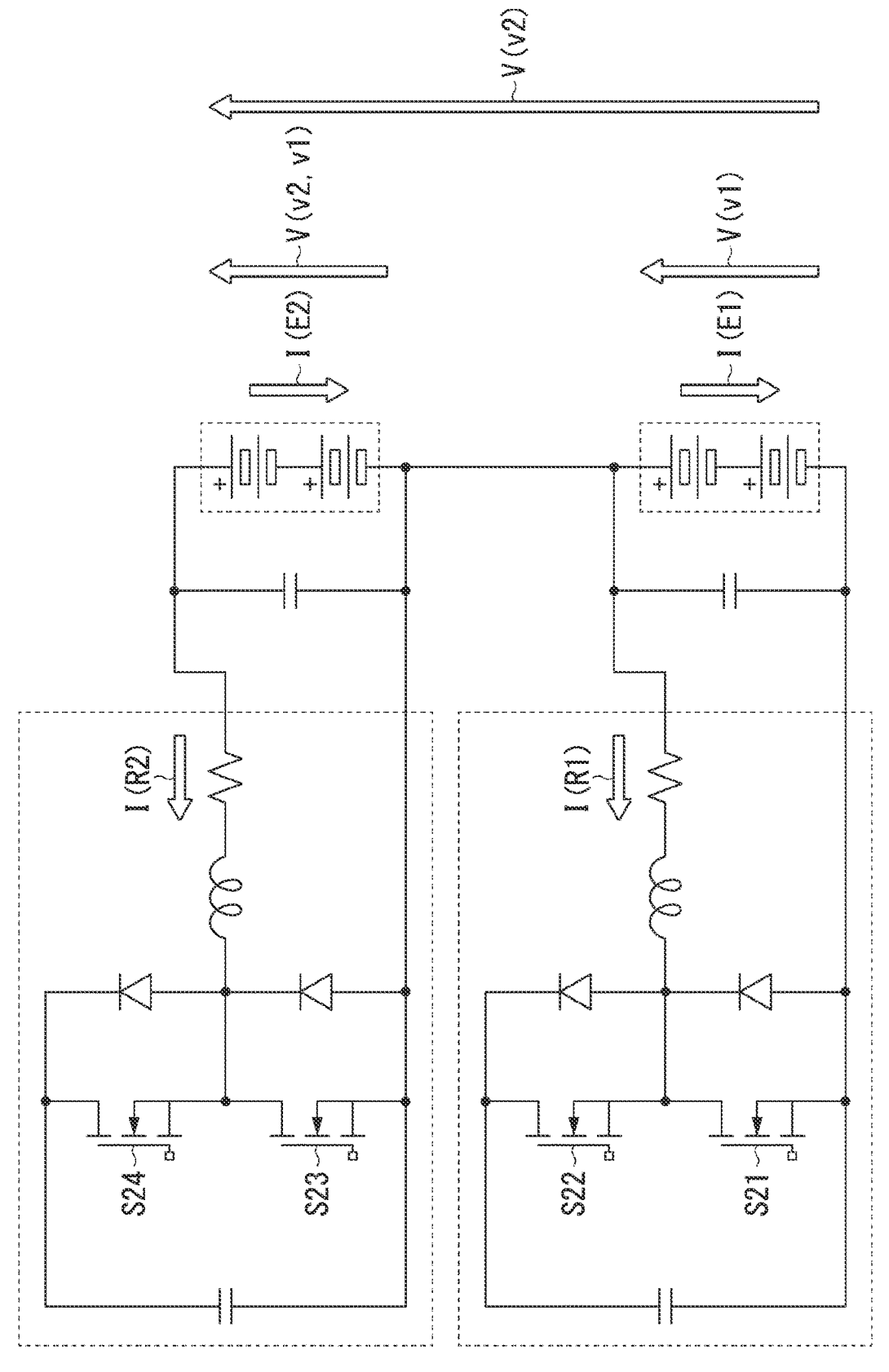
FIG. 45 is a diagram defining a current and a voltage applied to each part in FIG. 42.
Figure 46:
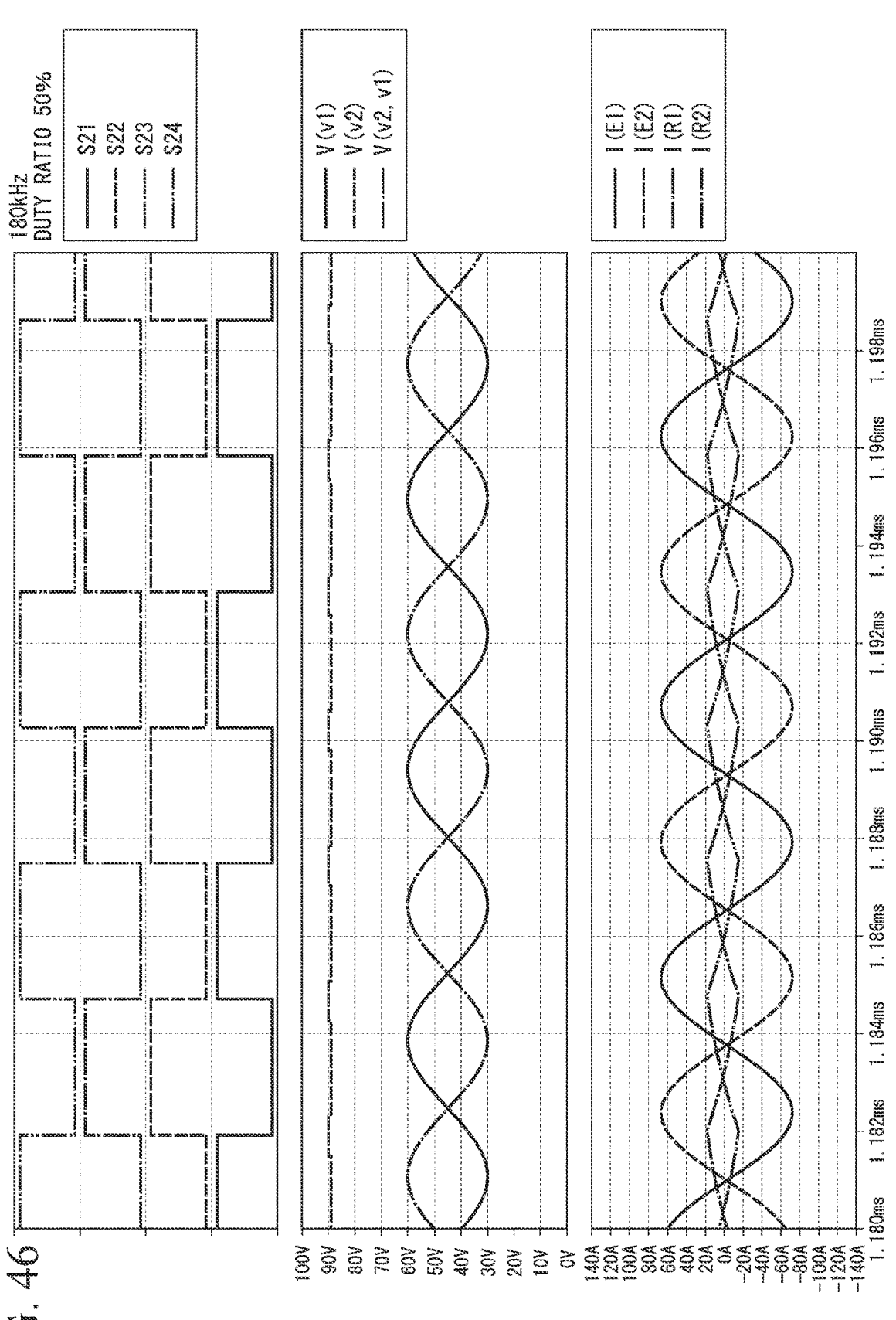
FIG. 46 is a diagram (part 1) showing waveforms of a current and a voltage.
Figure 47:
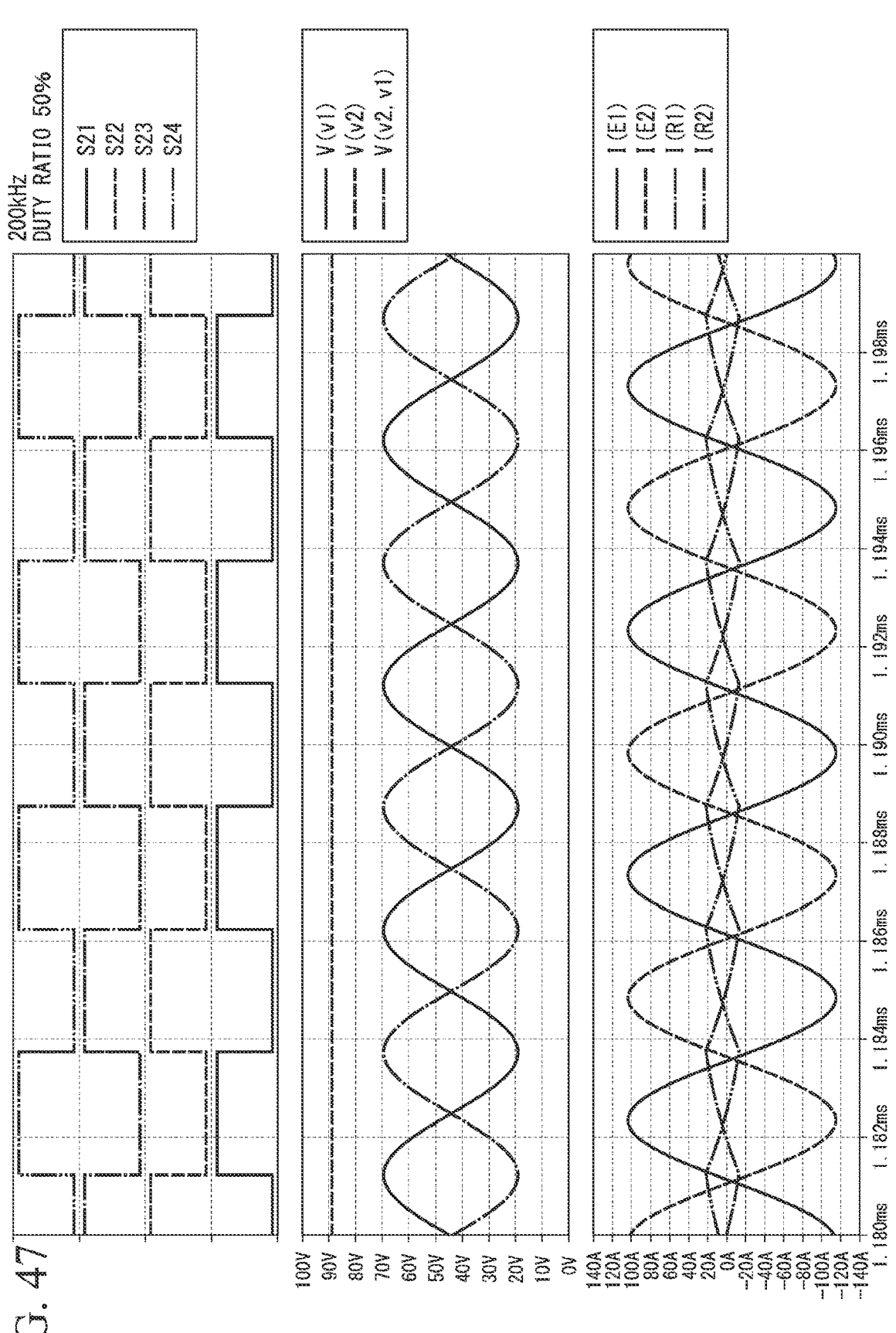
FIG. 47 is a diagram (part 2) showing waveforms of a current and a voltage.
Figure 48:
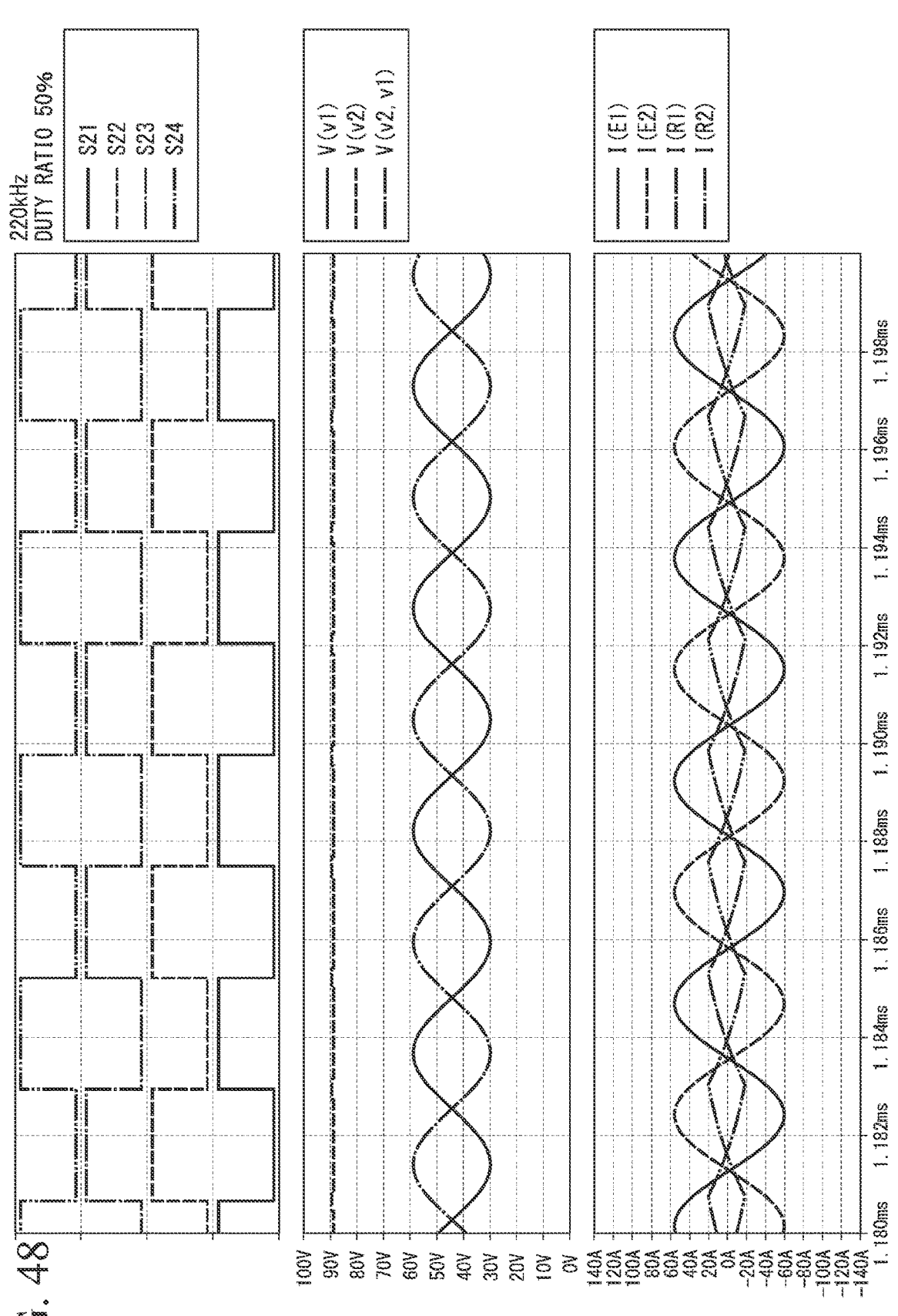
FIG. 48 is a diagram (part 3) showing waveforms of a current and a voltage.
Figure 49:
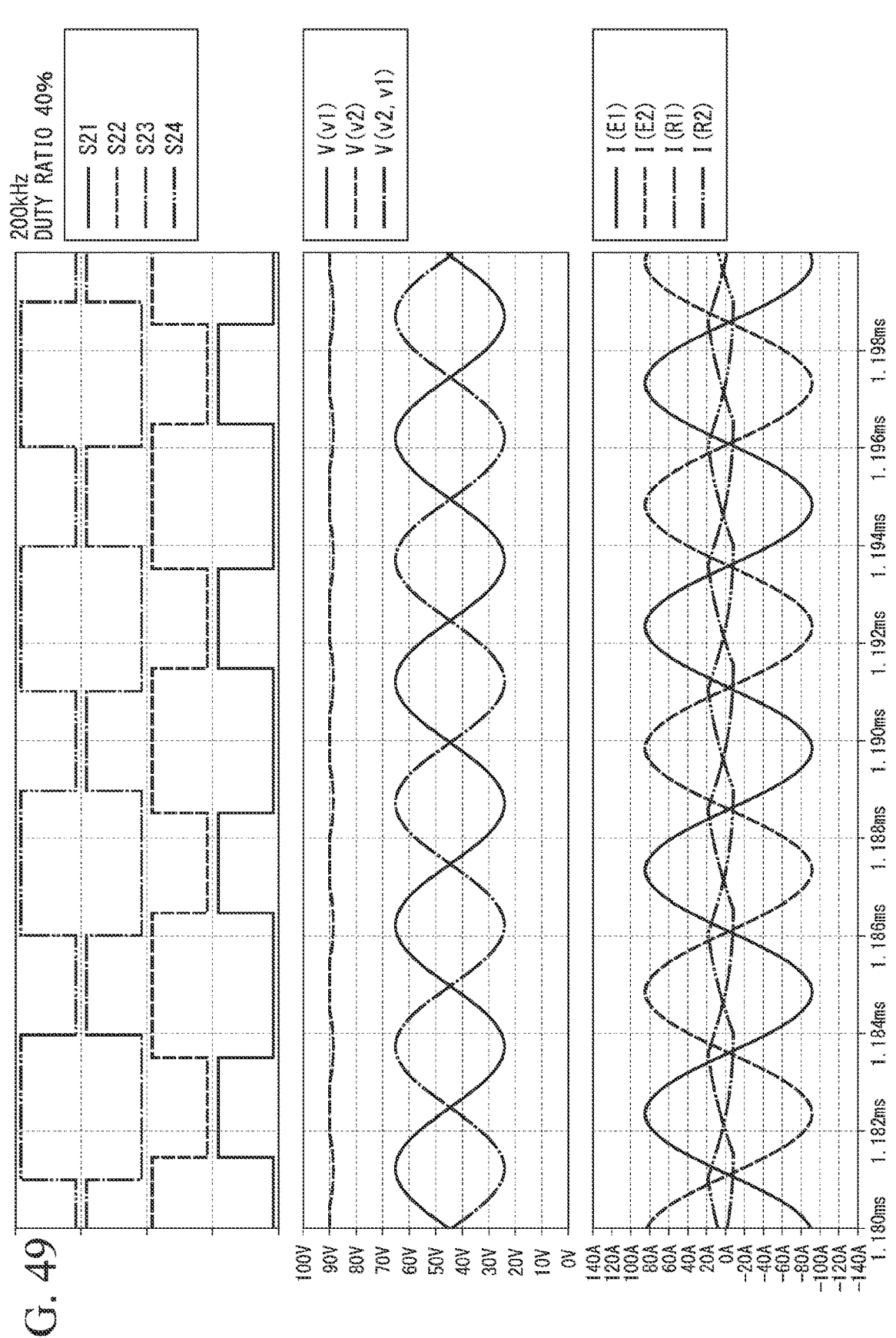
FIG. 49 is a diagram (part 4) showing waveforms of a current and a voltage.
Figure 50:
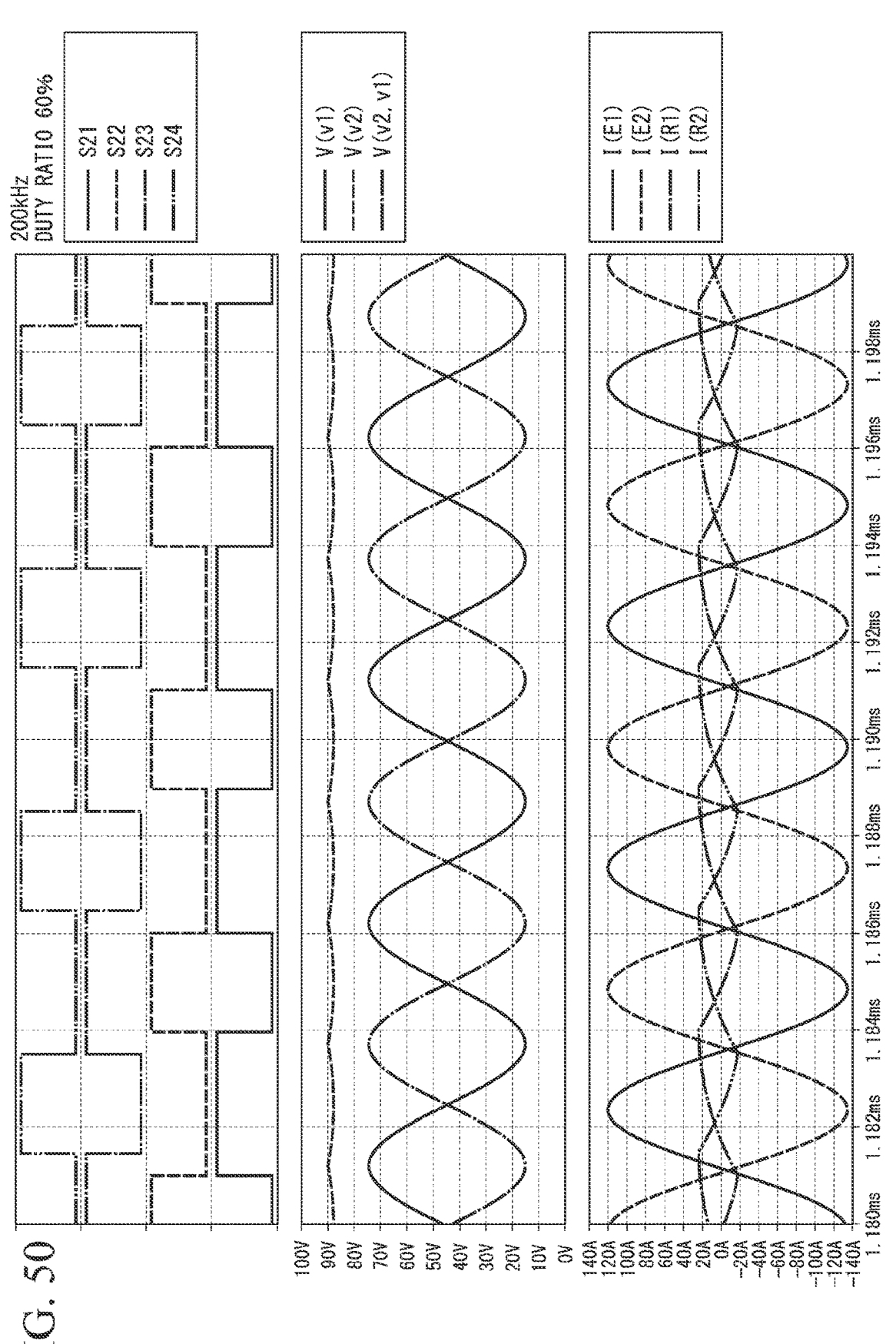
FIG. 50 is a diagram (part 5) showing waveforms of a current and a voltage.

In the third embodiment, the first generation circuit 65-1 and the second generation circuit 65-2 may also adjust the amplitude of the ripple current by adjusting the frequency of the ripple current. FIG. 44 is a diagram showing an example of characteristics of voltage fluctuation of the entire battery and heat generation of the secondary battery when the amplitude of the AC current flowing through the secondary battery is adjusted by adjusting the ripple frequency. The voltage fluctuation of the entire battery is a fluctuation range occurring in the voltage between the negative electrode of the first battery 41-1 and the positive electrode of the second battery 41-2. Here, the phase difference between the first ripple current from the first generation circuit 65-1 and the second ripple current from the second generation circuit 65-2 is 180 degrees. By adjusting the ripple frequency, the heat generation of the secondary battery is adjusted. In particular, when the duty ratio is 50%, the THD becomes small, such that the AC current flowing in the secondary battery is close to a sinusoidal wave and two currents having a phase difference of 180 degrees flow and therefore the voltage fluctuation of the entire battery is suppressed. When the duty ratio moves away from 50%, the voltage fluctuation increases. If the ripple frequency is adjusted at the higher-frequency side than the resonance frequency, the voltage fluctuation tends to be suppressed. When the voltage and
current applied to each part in FIG. 42 are defined as shown
in FIG. 45, their waveforms are shown in FIGS. 46 to 50.

Figure 51:
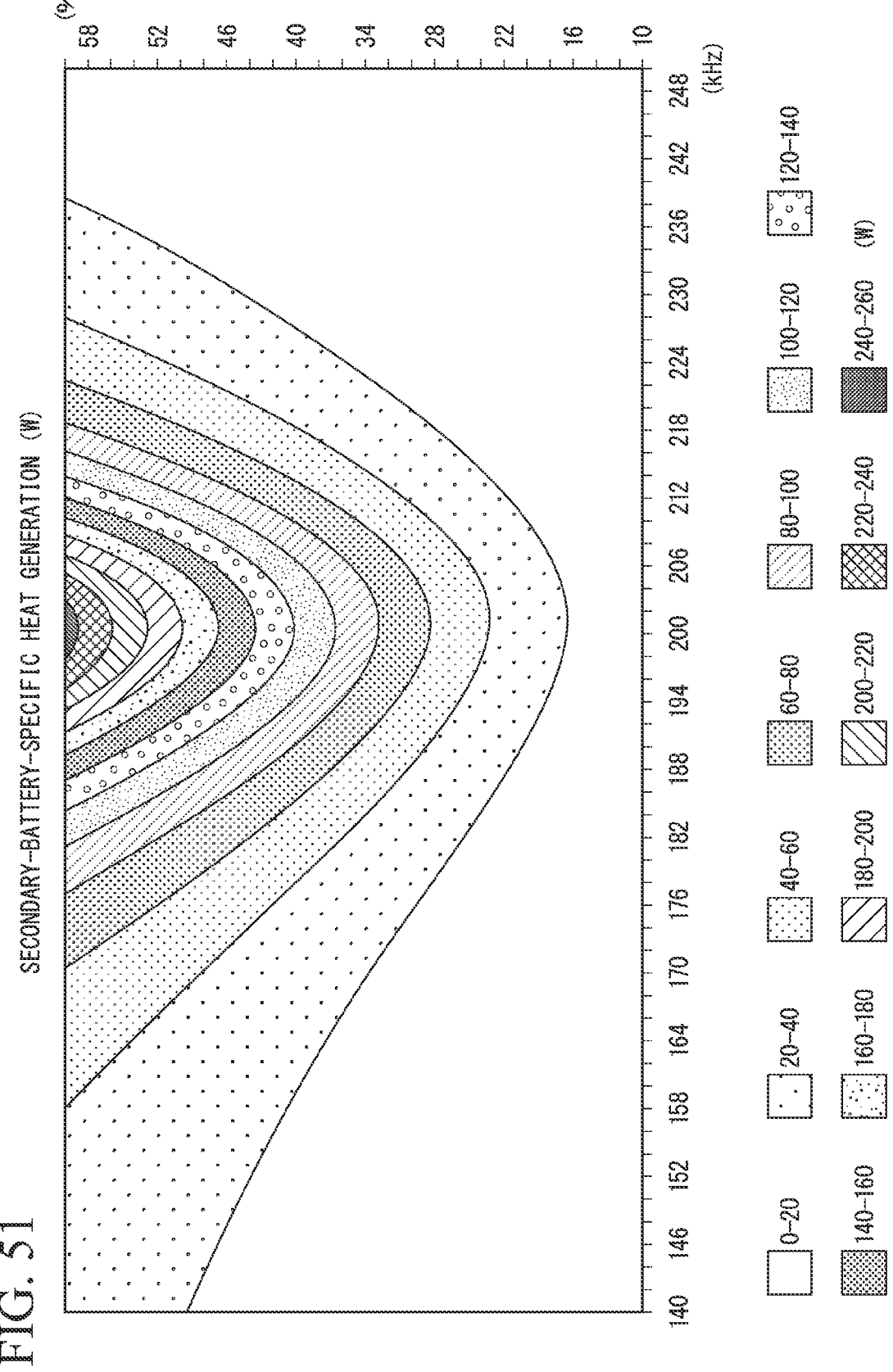
FIG. 51 is a contour diagram of heat generation (W) of the secondary battery with the vertical axis representing a duty ratio and the horizontal axis representing a ripple frequency.
Figure 52:
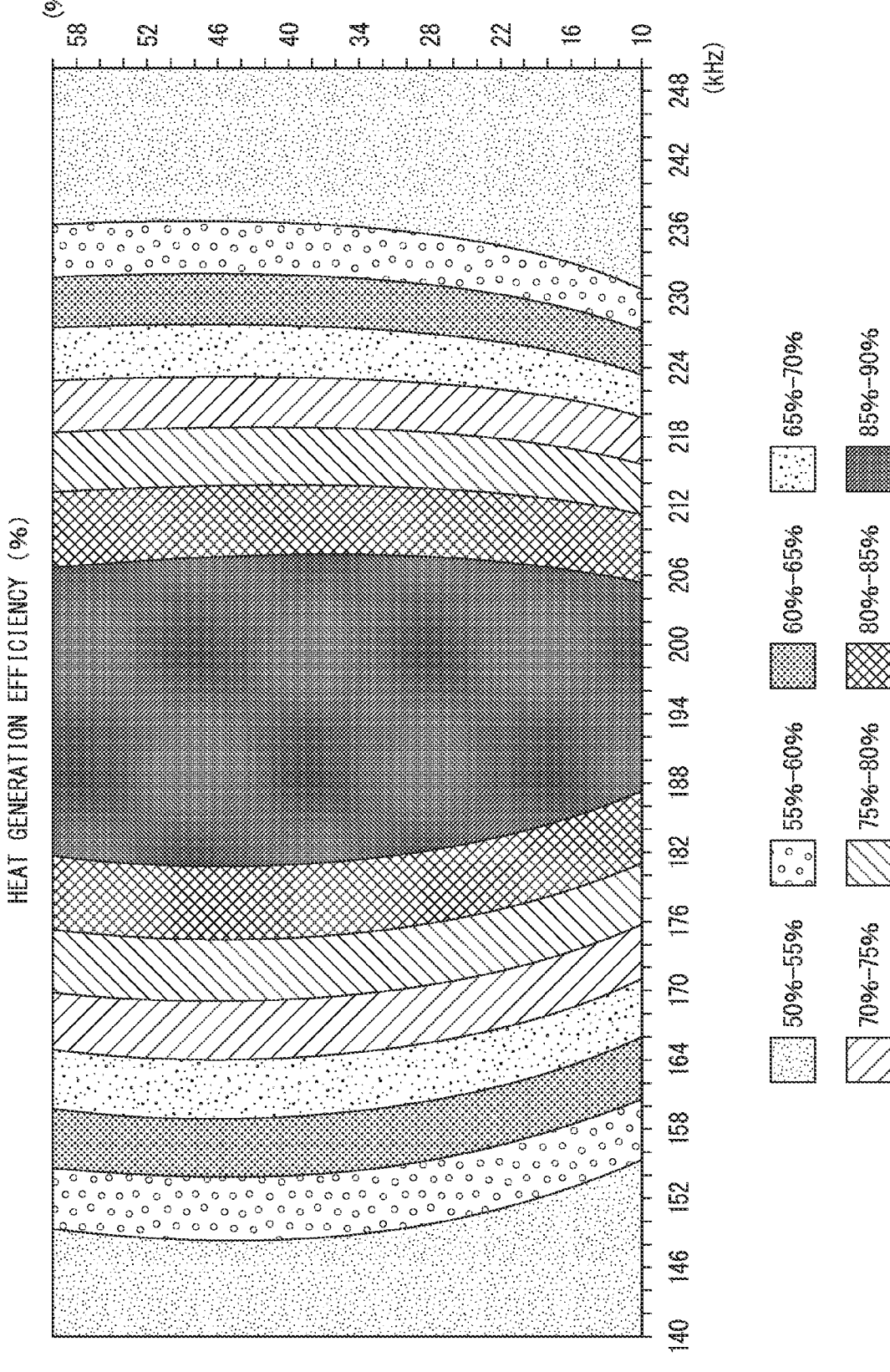
FIG. 52 is a contour diagram of heat generation efficiency (%) with the vertical axis representing a duty ratio and the horizontal axis representing a ripple frequency.
Figure 53:
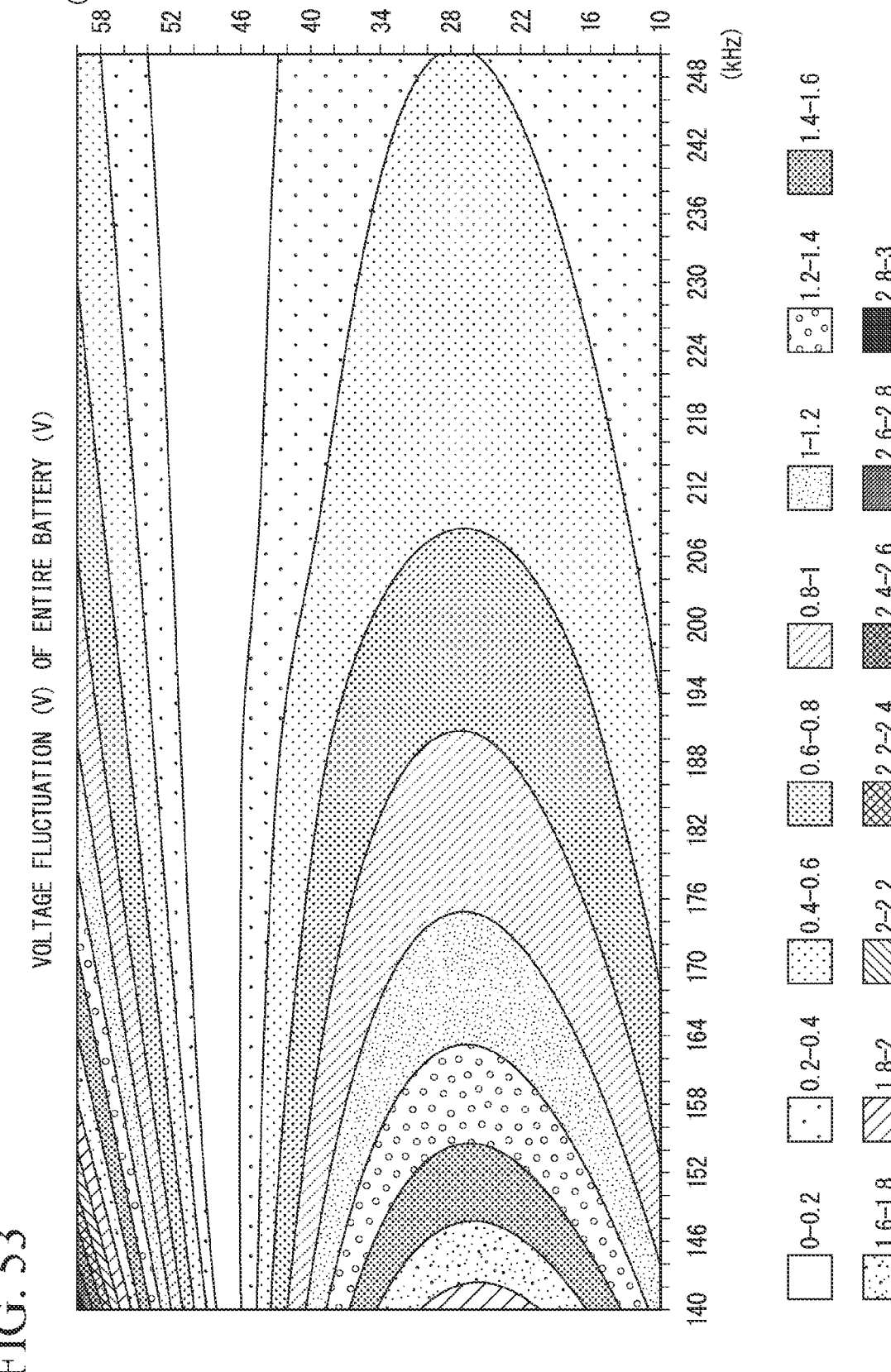
FIG. 53 is a contour diagram of voltage fluctuation (V) of the remaining battery power with the vertical axis representing a duty ratio and the horizontal axis representing a ripple frequency.

Also, FIG. 51 is a contour diagram of heat generation (W)
of the secondary battery with the vertical axis representing
a duty ratio and the horizontal axis representing a ripple
frequency, FIG. 52 is a contour diagram of heat generation
efficiency (%) on the same axis, and FIG. 53 is a contour
diagram of voltage fluctuation (V) of the entire battery on
the same axis. Thus, heat generation of the secondary
battery, beat generation efficiency, and voltage fluctuation of
the entire battery can be adjusted by adjusting the duty ratio
and the ripple frequency.

Also, the number of battery modules described above is
not limited to 2 or 3 as exemplified.

What is claimed is:

1. A temperature raising device comprising:
a parallel circuit including a capacitor connected in parallel to a battery that is a temperature raising target; and
an alternating current (AC) generation circuit connected
to the parallel circuit,
wherein, when capacitance of the capacitor is denoted by
$C_P$, an inductance component of the battery is denoted
by $L_S$, and a resistance component of the battery is
denoted by $R_S$, $C_P$ satisfies Inequality (1) and an
angular frequency $\omega$ of the AC generation circuit
satisfies Eq. (2)

$$C_P < \frac{2L_S}{R_S^2} \quad (1)$$

$$\omega = \sqrt{\frac{2L_S - C_P R_s^2}{2C_P L_S^2}} . \quad (2)$$

2. The temperature raising device according to claim 1,
wherein the AC generation circuit includes a generation
circuit configured to generate a ripple current, and
wherein the ripple current generated by the generation
circuit flows through the parallel circuit.

3. The temperature raising device according to claim 2,
wherein the generation circuit includes:
a first rectification element;
a first switching element connected in parallel to the first
rectification element;
a second rectification element connected in series with the
first rectification element; and
a second switching element connected in parallel to the
second rectification element.

4. The temperature raising device according to claim 3,
further comprising an amplitude adjustment circuit configured to adjust an amplitude of the ripple current.

5. The temperature raising device according to claim 4,
wherein the amplitude adjustment circuit adjusts the amplitude of the ripple current by changing a duty ratio between
the first switching element and the second switching element.

6. The temperature raising device according to claim 1,
wherein the battery includes
a first battery; and
a second battery connected in series with the first battery,
wherein the capacitor includes
a first capacitor connected in parallel to the first battery;
and
a second capacitor connected in parallel to the second
battery, wherein the AC generation circuit includes
a first generation circuit connected to a first parallel circuit
including the first battery and the first capacitor and
configured to generate a first ripple current; and
a second generation circuit connected to a second parallel
circuit including the second battery and the second
capacitor and configured to generate a second ripple
current, and
wherein the temperature raising device further comprises
a phase adjustment circuit configured to provide a
phase difference between the first ripple current and the
second ripple current.

7. The temperature raising device according to claim 1,
further comprising:
a first current limiting element connected between the
battery and the capacitor; and
a second current limiting element connected between the
capacitor and the AC generation circuit and having a
rated capacity different from that of the first current
limiting element.

8. The temperature raising device according to claim 1,
further comprising a current cutoff element connected
between the battery and the capacitor.

9. The temperature raising device according to claim 1,
wherein a ratio of an electric current of the inductance
component to an electric current input to the parallel circuit
by the AC generation circuit exceeds 1.

10. A temperature raising device comprising:
a parallel circuit including a capacitor connected in parallel to a battery that is a temperature raising target; and
an AC generation circuit connected to the parallel circuit,
wherein, when capacitance of the capacitor is denoted by
$C_P$, an inductance component of the battery is denoted
by $L_S$, and a resistance component of the battery is
denoted by $R_S$, $C_P$ satisfies Inequality (1) and an
angular frequency $\omega$ of the AC generation circuit
satisfies Inequality (47)

$$C_P < \frac{2L_S}{R_S^2} \quad (1)$$

$$\omega < \sqrt{\frac{2L_S - C_P R_S^2}{C_P L_S^2}} \quad (47)$$

11. The temperature raising device according to claim 10,
wherein the AC generation circuit includes a generation
circuit configured to generate a ripple current,
wherein the ripple current generated by the generation
circuit flows through the parallel circuit,
wherein the temperature raising device further comprises
an amplitude adjustment circuit configured to adjust an
amplitude of the ripple current, and
wherein the amplitude adjustment circuit adjusts the
amplitude of the ripple current by changing a frequency
of the ripple current.

12. The temperature raising device according to claim 10,
wherein the AC generation circuit includes a generation
circuit configured to generate a ripple current, and
wherein the ripple current generated by the generation
circuit flows through the parallel circuit.

13. The temperature raising device according to claim 12,
wherein the generation circuit includes:
a first rectification element;
a first switching element connected in parallel to the first
rectification element;

a second rectification element connected in series with the first rectification element; and a second switching element connected in parallel to the second rectification element.

14. The temperature raising device according to claim 13, further comprising an amplitude adjustment circuit configured to adjust an amplitude of the ripple current.

15. The temperature raising device according to claim 14, wherein the amplitude adjustment circuit adjusts the amplitude of the ripple current by changing a duty ratio between the first switching element and the second switching element.

16. The temperature raising device according to claim 12, further comprising a current cutoff element connected between the battery and the capacitor.

17. The temperature raising device according to claim 10, wherein the battery includes a first battery; and a second battery connected in series with the first battery, wherein the capacitor includes a first capacitor connected in parallel to the first battery; and a second capacitor connected in parallel to the second battery, wherein the AC generation circuit includes a first generation circuit connected to a first parallel circuit including the first battery and the first capacitor and configured to generate a first ripple current; and a second generation circuit connected to a second parallel circuit including the second battery and the second capacitor and configured to generate a second ripple current, and wherein the temperature raising device further comprises a phase adjustment circuit configured to provide a phase difference between the first ripple current and the second ripple current.

18. The temperature raising device according to claim 10, further comprising:

a first current limiting element connected between the battery and the capacitor; and a second current limiting element connected between the capacitor and the AC generation circuit and having a rated capacity different from that of the first current limiting element.

19. The temperature raising device according to claim 10, wherein a ratio of an electric current of the inductance component to an electric current input to the parallel circuit by the AC generation circuit exceeds 1.

* * * * *